(12) United States Patent
Ashiura

(10) Patent No.: US 9,870,526 B2
(45) Date of Patent: Jan. 16, 2018

(54) BARCODE EVALUATION DEVICE, BARCODE IMAGE GENERATION SYSTEM, BARCODE EVALUATION METHOD, BARCODE IMAGE GENERATION METHOD AND BARCODE EVALUATION PROGRAM

(71) Applicant: NEC PLATFORMS, LTD, Kawasaki-shi, Kanagawa (JP)

(72) Inventor: Osamu Ashiura, Kanagawa (JP)

(73) Assignee: NEC PLATFORMS, LTD., Kawasaki-shi, Kanagawa (JP)

( * ) Notice: Subject to any disclaimer, the term of this patent is extended or adjusted under 35 U.S.C. 154(b) by 0 days.

(21) Appl. No.: 15/528,340

(22) PCT Filed: Sep. 28, 2015

(86) PCT No.: PCT/JP2015/077327
§ 371 (c)(1),
(2) Date: May 19, 2017

(87) PCT Pub. No.: WO2016/084469
PCT Pub. Date: Jun. 2, 2016

(65) Prior Publication Data
US 2017/0316296 A1 Nov. 2, 2017

(30) Foreign Application Priority Data
Nov. 28, 2014 (JP) .................. 2014-240881

(51) Int. Cl.
G06K 19/06 (2006.01)
(52) U.S. Cl.
CPC . *G06K 19/06075* (2013.01); *G06K 19/06028* (2013.01)

(58) Field of Classification Search
None
See application file for complete search history.

(56) References Cited

FOREIGN PATENT DOCUMENTS

| CN | 102779264 A | 11/2012 |
|---|---|---|
| JP | 2002-117372 A | 4/2002 |
| JP | 2003-115025 A | 4/2003 |
| JP | 2005-301939 A | 10/2005 |
| JP | 2006-252053 A | 9/2006 |
| JP | 2010-009182 A | 1/2010 |
| JP | 2010-288296 A | 12/2010 |

OTHER PUBLICATIONS

International Search Report of JP/2015/077327, dated Nov. 17, 2015 (PC/ISA/210).
Written Opinion of the International Searching Authority for PCT/JP2015/077327, dated Nov. 11, 2015 (PCT/ISA/237).
Communication dated Oct. 10, 2017, issued by the State Intellectual Property Office of the P.R.C., in corresponding Chinese Application No. 201580063306.4.

*Primary Examiner* — Kristy A Haupt
(74) *Attorney, Agent, or Firm* — Sughrue Mion, PLLC

(57) ABSTRACT

A barcode evaluation device is configured to conduct an evaluation, which involves determining whether or not a barcode image is displayable on an image display device and determining whether or not the barcode image is readable with a barcode reading device. The evaluation is conducted based on specifics of the barcode image, specifications of the image display device, and specifications of the barcode reading device without actually displaying and reading the barcode image.

14 Claims, 20 Drawing Sheets

BARCODE EVALUATION DEVICE, BARCODE IMAGE GENERATION SYSTEM, BARCODE EVALUATION METHOD, BARCODE IMAGE GENERATION METHOD AND BARCODE EVALUATION PROGRAM

CROSS REFERENCE TO RELATED APPLICATIONS

This application is a National Stage of International Application No. PCT/JP2015/077327 filed Aug. 28, 2015, claiming priority based on Japanese Patent Application No. 2014-240881, filed Nov. 28, 2014, the contents of all of which are incorporated herein by reference in their entirety.

TECHNICAL FIELD

This invention relates to a barcode evaluation device, a barcode image generation system, a barcode evaluation method, a barcode image generation method, and a barcode evaluation program.

BACKGROUND ART

Barcodes are widely used as means for conveying various types of information. Barcodes in general are printed on paper media.

There is, however, an operational need for reading a barcode that is displayed on a screen of a terminal, instead of a barcode that is printed on a paper medium, with a barcode reading device (hereinafter also referred to as "barcode scanner" as necessary).

An example of the operational need is to provide some kind of service by displaying a barcode on a screen of a cellular phone or other terminal and by reading that barcode with the barcode scanner that is connected to a cash register or to a point of sales (POS) terminal at a shop or the like.

With a barcode displayed on a screen of a portable terminal in this manner, encoded information of the barcode can dynamically be changed and can be varied from one terminal displaying the barcode to another. In short, the barcode displayed on the screen of the portable terminal has a higher degree of freedom than that of a barcode printed on a paper medium. Further, displaying of the barcode on the screen of the portable terminal is expected to eliminate the trouble of printing the barcode and cut the cost of distribution.

When the barcode displayed on the screen of the portable terminal or the like is read with the barcode reading device, accurate reading of the displayed barcode naturally needs to be ensured each time. However, different portable terminal models have different specifications in terms of screen size, pixel counts in the longitudinal direction and the horizontal direction, and pixel density. Specifications also vary from one type of barcode scanner to another in terms of readable width and minimum resolution.

The resultant situation is that a barcode that can be read with the combination of one portable terminal model and one barcode scanner model cannot be read when a different portable terminal model and a different barcode scanner model are used in combination.

Technologies for preventing this situation are disclosed in, for example, Patent Document 1 and Patent Document 2.

In Patent Document 1, there are disclosed a barcode creating method for creating a barcode that can be displayed on a display of a mobile terminal and is readable with a barcode reading device, a barcode display device configured to display the barcode, and a barcode providing device configured to provide the barcode. The description of Patent Document 1 also includes taking into consideration the specifications of the display of the portable terminal on which the barcode is displayed, by varying the method of displaying the barcode from display to display.

In Patent Document 2, there is disclosed a barcode service providing system in which a table associating portable terminal model data and barcode image data with each other is prepared to display a barcode image that is associated with the portable terminal model of interest. In other words, taking into consideration the specifications of a display of the portable terminal on which the barcode is displayed, by varying the method of displaying the barcode from display to display, is included in Patent Document 2 as well.

PRIOR ART DOCUMENTS

Patent Document

Patent Document 1: JP-A-2002-117372
Patent Document 2: JP-A-2003-115025

SUMMARY OF THE INVENTION

Problem to be Solved by the Invention

As described above, the technologies disclosed in Patent Document 1 and Patent Document 2 involve adapting the manner of display to the type of a model on which the barcode is to be displayed.

However, the premise of those technologies is to read a barcode that is expected to be used and that has a given dot count and a given module width with a given barcode scanner that is expected to be used. The technologies merely define the manner of display under this premise.

In other words, the technologies do not anticipate a change in the dot count or module width of an actually displayed barcode, and reading with a barcode scanner that has other specifications than expected specifications.

Consequently, when an administrator/planner creates a barcode at his or her discretion, the use of those common technologies does not always ensure that the created barcode is displayed properly on the screens of different types of portable terminals and is readable with different types of barcode scanners.

It is therefore a perpetual issue to find a way to verify whether a barcode created by an administrator/planner at his or her discretion can be displayed properly on the screens of different types of portable terminals and is readable with different types of barcode scanners, or a way to compare the adequacy of the created barcode.

It will be assumed that an administrator/planner individually creates a barcode to be displayed on screens of cellular phones and other similar terminals, and provides/distributes all portable terminals on which the barcode is to be displayed and all barcode scanners with which the barcode is to be read. If this can be arranged, the administrator/planner can employ portable terminals and barcode scanners that are compatible with the barcode to be used, and can verify the adequacy of the operation in advance, or can design the operation appropriately.

However, portable terminals and barcode scanners that are actually used are designed individually and exist for their own purposes. For instance, the main purpose of a screen of a portable terminal is to display other types of information than barcodes, and is not to display barcodes. In addition, the main purpose of barcode scanners in general is to read barcodes printed on paper, and is not to read barcodes displayed on screens of portable terminals.

In other words, an administrator/planner who creates a barcode has no control that allows the administrator/planner to optimize the specifications of portable terminals and barcode scanners to the specifications of the barcode that the administrator/planner wishes to use. The reality is that an administrator/planner who creates a barcode has no way of knowing in advance whether the barcode of his or her creation can actually be displayed and, if displayable, whether the barcode can be read with barcode scanners.

To summarize, there has been no means of quantitative verification on whether a barcode displayed on a terminal screen is readable with a barcode scanner, and there has been no index for verification in advance on whether the overall operation itself is viable, i.e., whether the barcode can be displayed on a terminal screen as expected and is readable with barcode scanners.

With verification in advance not being an option, there is no other way than to prepare every actual terminal model that is expected to be used in the operation and actually check whether or not the barcode is readable with every barcode scanner model that is expected to be used.

Specifically, an actual readability test needs to be conducted on a continuous basis for every combination of a portable terminal model, a created barcode, and a barcode scanner model by obtaining every portable terminal model on the market, displaying every created barcode on each obtained portable terminal, and reading the barcodes with every barcode scanner model that can be used. Such a readability test requires a huge cost and a huge amount of verification time.

Spending that much money and verification time is difficult in practice. Even if the huge cost and huge amount of verification time are spent, the cycle of releasing a new model is relatively short for cellular phones and other similar terminals, and screen specifications are also diverse in terms of screen size, pixel counts in the longitudinal direction and the horizontal direction, and pixel density. This leads not only to the inability to uniformly specify conditions under which the barcode is displayed but also to a significant issue from the viewpoint of continuous operation.

It is therefore an object of this invention to provide a barcode evaluation device, a barcode image generation system, a barcode evaluation method, a barcode image generation method, and a barcode evaluation program with which whether the relation among a barcode, a barcode scanner, and a terminal is suitable for displaying and reading the barcode can be evaluated quantitatively, without conducting verification that uses actual scanners and terminals.

Means to Solve the Problem

According to a first aspect of this invention, there is provided a barcode evaluation device, which is configured to conduct an evaluation, which involves determining whether or not a barcode image is displayable on an image display device and determining whether or not the barcode image is readable with a barcode reading device, the evaluation being conducted based on specifics of the barcode image, specifications of the image display device, and specifications of the barcode reading device without actually displaying and reading the barcode image.

According to a second aspect of this invention, there is provided a barcode image generation system, comprising: a barcode image generation requesting device, and the barcode evaluation device of the first aspect of this invention, wherein the barcode image generation requesting device is configured to request the barcode evaluation device to generate a barcode image that has given specifics, and wherein the barcode evaluation device is configured to generate, based on the given specifics of the barcode image requested to be generated and on a result of the evaluation, a barcode image that is displayable on a given image display device and that is readable with a given barcode reading device.

According to a third second aspect of this invention, there is provided a barcode evaluation method, which is executed by a barcode evaluation device, the method comprising conducting an evaluation, which involves determining whether or not a barcode image is displayable on an image display device and determining whether or not the displayed barcode image is readable with a barcode reading device, the evaluation being conducted based on specifics of the barcode image, specifications of the image display device, and specifications of the barcode reading device without actually displaying and reading the barcode image.

According to a fourth aspect of this invention, there is provided a barcode evaluation program for causing a computer to function as a barcode evaluation device configured to conduct an evaluation, which involves determining whether or not a barcode image is displayable on an image display device and determining whether or not the displayed barcode image is readable with a barcode reading device, the evaluation being conducted based on specifics of the barcode image, specifications of the image display device, and specifications of the barcode reading device without actually displaying and reading the barcode image.

According to a fifth aspect of this invention, there is provided a barcode image generation method, which is executed by a system including a barcode image generation requesting device and a barcode evaluation device, the barcode image generation method including: requesting, by the barcode image generation requesting device, the barcode evaluation device to generate a barcode image that has given specifics; conducting, by the barcode evaluation device, an evaluation, which involves determining whether or not a barcode image is displayable on an image display device and determining whether or not the displayed barcode image is readable with a barcode reading device, the evaluation being conducted based on specifics of the barcode image, specifications of the image display device, and specifications of the barcode reading device without actually displaying and reading the barcode image; and generating, by the barcode evaluation device, based on the given specifics of the barcode image requested to be generated and on a result of the evaluation, a barcode image that is displayable on a given image display device and that is readable with a given barcode reading device.

Advantageous Effect of Invention

According to this invention, whether the relation among a barcode, a barcode scanner, and a terminal is suitable for displaying and reading the barcode can be evaluated quantitatively without conducting verification that uses actual scanners and terminals.

BRIEF DESCRIPTION OF THE DRAWINGS

FIG. 2-1 is a diagram (1/2) for illustrating in more detail the proper area in FIG. 1 and other areas.

FIG. 2-2 is a diagram (2/2) for illustrating in more detail the proper area in FIG. 1 and other areas.

FIG. 15-1 is a flow chart (1/3) for illustrating basic operation in the fifth example embodiment of this invention.

FIG. 15-2 is a flow chart (2/3) for illustrating basic operation in the fifth example embodiment of this invention.

FIG. 15-3 is a flow chart (3/3) for illustrating basic operation in the fifth example embodiment of this invention.

Figure 1:
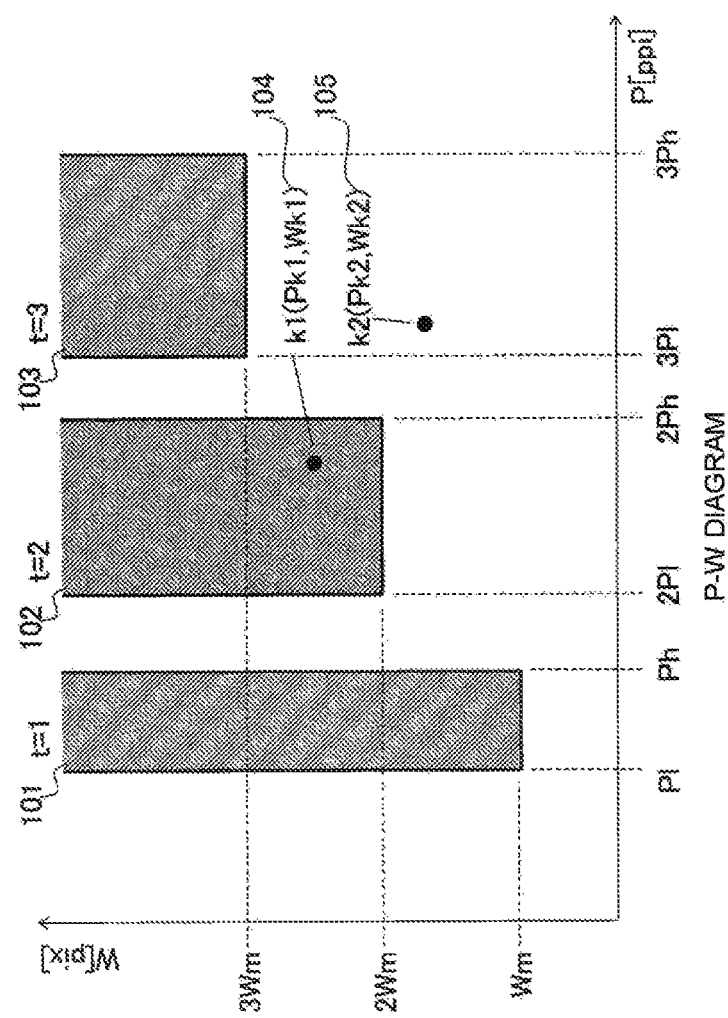
FIG. 1 is a P-W diagram for illustrating an example of the relation between a proper area and terminal screen specifications in an example embodiment of this invention.

REFERENCE SIGNS LIST 10 evaluation device
11 CPU
12 group of storage devices
13 image output unit
14 I/O
15 bus line
21 display device
22 input device
30 group of terminals
31 terminal k
41 first business operator server
42 second business operator server
50 barcode generating server
60 switching network
100 barcode system

MODES FOR EMBODYING THE INVENTION

Example embodiments of this invention will be outlined first.

Example embodiments of this invention are capable of quantitatively evaluating whether a "barcode to be displayed" on a screen of a portable terminal or the like can be displayed and is readable with a barcode scanner, i.e., whether the barcode scanner and the terminal are "in a suitable relation" with the barcode. This evaluation is made based on the module width of the "barcode to be displayed" on a screen of a portable terminal or the like, the specifications of a barcode scanner used to read the barcode, and a portable terminal that is expected to be used, namely, screen specifications (pixel width and pixel density) of an image display device.

In the example embodiments of this invention, the module width of a "barcode to be displayed" that can be displayed on a terminal and that is readable with a barcode scanner can also be derived from the screen specifications of the terminal and the specifications of the barcode scanner, by applying the method of this evaluation.

The example embodiments of this invention are further capable of determining the specifications of a barcode scanner that are necessary to read a "barcode to be displayed", by applying the method of this evaluation.

This concludes the outline of the example embodiments of this invention.

The specifics of the method of this evaluation will be described next as a premise for a specific description on the example embodiments of this invention.

1. Basic Concept (1) Definitions

Terms used in the following description are first defined.

A black-and-white (bar-and-space) pattern portion included in a bar code is referred to as "barcode symbol". The barcode symbol and necessary margins to the left and right of the barcode symbol are together referred to as "barcode".

The minimum width unit of the barcode symbol is referred to as "minimum module width". The module width of the whole barcode is referred to as "total module width". The size of the total module width is expressed as "total width ∘∘ modules (mods)" by using the minimum module width as reference.

A barcode image generated by imaging a barcode has a total width that is calculated by multiplying the constituent dot count per module and the total module width. For example, a barcode image that is generated by imaging a barcode having a total width of 100 modules at a rate of 1 dot per module has a total width of 100 dots.

The total module width of a "barcode to be displayed" is given as $W_m$. The module width $W_m$ is determined by the type of the barcode to be used (i.e., the barcode to be displayed on a terminal screen), and the number of digits of a character string to be encoded. The module width $W_m$, which is the total module width, includes the width of the barcode symbol and the widths of necessary margins on the left and the right.

The constituent dot count per module is given as t (t is a positive integer). A value $t \cdot W_m$, which is obtained by multiplying the total module width $W_m$ of the "barcode to be displayed" by the constituent dot count per module t, equals the total dot width of the barcode image.

To give an example, when a 20-digit number is configured as a barcode called Code Set C of Code 128, $W_m$ is calculated by 11×20/2+55 as 165 mods. When the constituent dot count per module t is 2 dots/mod in this example, the barcode image width is calculated by 2 dots/mod×165 mods as 330 dots.

Code 128 is standardized as Standard Number: JIS X 0504 by Japanese Industrial Standards (JIS). A character string encoded in Code Set C of Code 128 has only numerical characters and is in units of two digits.

An upper limit width of a barcode that is readable with a barcode scanner is given as $W_s$ mm. A minimum resolution at which a barcode scanner can read a barcode, that is, a minimum width that can be detected by a barcode scanner, is given as $d_s$ mm. The values $W_s$ and $d_s$ are specification values of a barcode reading device.

In the following description, a device that includes a screen on which a barcode is to be displayed may be referred to as "terminal" as necessary. A barcode reading device may be referred to as "barcode scanner" as necessary.

To summarize the definitions given above, variables used herein are listed below. The units of the respective variables that are used here are ones commonly assumed for the variables.

$W_m$: The lateral module width of a barcode to be displayed. The value $W_m$ is measured in units of mods and is a positive integer.

t: The constituent dot count per module of a barcode image. The value t is measured in units of dots/mod and is a positive integer.

$W_s$: An upper limit to the width of a barcode that is readable with a barcode scanner. The value $W_s$ is measured in units of mm, and is a positive integer.

$d_s$: The minimum resolution of a barcode scanner. The value $d_s$ is measured in units of mm and is a positive integer.

(2) Conditions of "Proper Area"

When conditions under which a barcode can be displayed on a terminal screen and is readable with a barcode scanner are considered based on the definitions given above, all of the following three conditions need to be fulfilled:

First Condition: The width $t \cdot W_m$ of a barcode displayed on a terminal screen does not exceed the readable width $W_s$ of a barcode scanner.

Second Condition: The minimum module width of the barcode displayed on the terminal screen is equal to or more than the minimum resolution $d_s$ of the barcode scanner.

Third Condition: The width $t \cdot W_m$ of the barcode displayed on the terminal screen is contained within the screen width of the terminal on which the barcode is to be displayed.

The first condition will be discussed first.

When a pixel-to-pixel distance (also called dot pitch) on the terminal screen is given as d mm/pix, the width of the configured barcode is $t \cdot W_m \cdot d$ mm. The first condition is that $t \cdot W_m \cdot d$ not be wider than the readable width $W_s$ of a barcode scanner, and an expression $t \cdot W_m \cdot d \leq W_s$ is therefore established. Modifying this expression yields the following expression:

[Math. 1]
$$d \leq \frac{W_s}{t \cdot W_m}$$

From this expression, a maximum value $d_h$ that d can take is expressed as follows:

[Math. 2]
$$d_h = \frac{W_s}{t \cdot W_m}$$

For the pixel density of a terminal screen, a unit "ppi", which means the number of pixels per inch, is customarily used as a specification value. This unit is used here as follows.

A ppi value corresponding to the pixel-to-pixel distance d mm/pix is given as P, and 1 inch equals 25.4 mm. The following expression is therefore established:

[Math. 3]
$$P[ppi] = \frac{25.4[mm/inch]}{d[mm/pix]}$$

The expression is modified as follows:

[Math. 4]
$$d = \frac{25.4}{P}$$

[Math. 5]
$$d = \frac{25.4}{P}$$

[Math. 6]
$$d \leq \frac{W_s}{t \cdot W_m}$$

The expression of [Math. 5] is substituted into the expression of [Math. 6], and the inequality is organized to obtain Expression (A).

[Math. 7]
$$P \geq \frac{25.4 \cdot t \cdot W_m}{W_s} \qquad \text{Expression (A)}$$

When a minimum value that the pixel density P can take at the per-module constituent dot count t dots/mod of the barcode is given as $P_1(t)$ in this case, the following expression is obtained:

[Math. 8]
$$P_l(t) = \frac{25.4 \cdot t \cdot W_m}{W_s}$$

Now, $P_1$ is defined as the value of $P_1(t)$ when t is 1, and is expressed as follows:

[Math. 9]
$$P_l \equiv P_l(1) = \frac{25.4 \cdot W_m}{W_s}$$

Then $P_1(t)$ can be expressed as $P_1(t)=t \cdot P_1$, and Expression (A) can be expressed by Expression (A').

[Math. 10]
$$P \geq t \cdot P_1 \left( \text{where } P_1 = \frac{25.4 \cdot W_m}{W_s} \right) \quad \text{Expression (A')}$$

This is a condition of the terminal pixel density P ppi that keeps the barcode to be displayed, which has the width $W_m$, from exceeding the readable width $W_s$ of the barcode scanner.

It is understood from Expression (A') that $P_1$ depends on the module width $W_m$ of the barcode and the readable width $W_s$ of the barcode scanner.

The second condition will be discussed next.

When the pixel-to-pixel distance d on the terminal screen is expressed in units of mm/dot, the minimum module width of the barcode to be displayed is t·d mm. This value needs to be no less than the minimum resolution $d_s$ of the barcode scanner, and hence a relationship t·d≥ds needs to be satisfied.

This expression is transformed into a ppi value as in the discussion regarding the first condition.

[Math. 11]
$$d = \frac{25.4}{P}, (P > 0)$$

This expression is then substituted as follows:

[Math. 12]
$$t \cdot \frac{25.4}{P} \geq d_s$$

This expression is modified as follows:

[Math. 13]
$$t \cdot \frac{25.4}{d_s} \geq P$$

[Math. 14]
$$P \leq t \cdot \frac{25.4}{d_s} \quad \text{Expression (B)}$$

Expression (B) is obtained as a result.

When a maximum value that the pixel density P can take at the per-module constituent dot count t dots/mod is given as $P_h(t)$ in this case, $P_h(t)$ is as follows:

[Math. 15]
$$P_h(t) = t \cdot \frac{25.4}{d_s}$$

Now $P_h$ is defined as the value of $P_h(t)$ when t is 1, and is expressed as follows:

[Math. 16]
$$P_h \equiv P_h(1) = \frac{25.4}{d_s}$$

$$P_h(t)=t \cdot P_h \quad \text{[Math. 17]}$$

Then, $P_h(t)$ can be expressed as above and Expression (B) can be expressed as Expression (B').

[Math. 18]
$$P \leq t \cdot P_h \left( \text{where } P_h = \frac{25.4}{d_s} \right) \quad \text{Expression (B')}$$

This serves as a condition of the terminal pixel density P ppi that keeps the minimum module width from being less than the minimum resolution $d_s$ mm of the barcode scanner.

It is understood from Expression (B') that $P_h$ depends only on the minimum resolution $d_s$ of the barcode scanner.

This concludes the discussions of the first condition and the second condition. As a result, Expression (A') derived from the discussion of the first condition and Expression (B') derived from the discussion of the second condition are as follows:

[Math. 19]
$$P \geq t \cdot P_1 \left( \text{where } P_1 = \frac{25.4 \cdot W_m}{W_s} \right) \quad \text{Expression (A')}$$

[Math. 20]
$$P \leq t \cdot P_h \left( \text{where } P_h = \frac{25.4}{d_s} \right) \quad \text{Expression (B')}$$

That a relational expression $t \cdot P_1 \leq P \leq t \cdot P_h$ is established from the two expressions, Expression (A') and Expression (B'), is a condition that "gives P a value within a 'proper range'".

Now, a case will be discussed where the relational expression of Expression (A') and Expression (B') is not established for P and "a condition that puts P outside the 'proper range'", that is, a relationship $P_1>P_h$, is fulfilled.

[Math. 21]

$$P_i = \frac{25.4 \cdot W_m}{W_s}, P_h = \frac{25.4}{d_s}$$

[Math. 22]

$$\frac{25.4 \cdot W_m}{W_s} > \frac{25.4}{d_s} \to \frac{W_m}{W_s} > \frac{1}{d_s}$$

The expression of [Math. 22] is derived from the expressions of $P_1$ and $P_h$ of [Math. 21], and is solved for $W_m$ to derive the following expression:

[Math. 23]

$$W_m > \frac{W_s}{d_s}$$

This is the "condition that gives P an improper value".

This relational expression indicates that the barcode displayed on a screen of a terminal cannot be read with the barcode scanner irrespective of what screen specifications the terminal has, when the module width $W_m$ mods of the barcode to be displayed exceeds a value calculated by the following expression:

[Math. 24]

$$\frac{W_s}{d_s}$$

It also means that the "condition that gives P an improper value" depends only on the specification values of the barcode scanner. The barcode can accordingly be determined as "improper" by considering this condition, without comparing terminal screen specifications.

A relational expression inverse to the relational expression given above is as follows:

[Math. 25]

$$W_m \leq \frac{W_s}{d_s}$$

The expression of [Math. 25] serves as one of necessary conditions for the module width $W_m$ of the barcode to be within the "proper range".

[Math. 26]

$$\frac{W_s}{d_s}$$

Further, the expression of [Math. 26] can be interpreted as the module width of a barcode configured to fill up the entire maximum readable width $W_s$ of the barcode scanner that is the same module width as the minimum resolution $d_s$ of the barcode scanner.

[Math. 27]

$$\frac{W_s}{d_2}$$

In the case where $W_m$ exceeds a value calculated by the expression of [Math. 27], and the barcode is displayed on a terminal screen so that the minimum module width of the barcode is greater than the minimum resolution $d_s$ of the barcode scanner, the total width of the barcode displayed on the terminal screen exceeds the readable width $W_s$ of the barcode scanner. The barcode consequently cannot be read with the barcode scanner.

[Math. 28]

$$\frac{W_s}{d_2}$$

In the case where $W_m$ exceeds a value calculated by the expression of [Math. 28] and the barcode is instead displayed on a terminal screen so that the displayed barcode width is equal to or less than the readable width $W_s$ of the barcode scanner, the minimum module width of the displayed barcode is less than the minimum resolution $d_s$ of the barcode scanner. The barcode consequently cannot be read with the barcode scanner. In short, the barcode is not readable with the barcode scanner no matter what screen specifications the terminal has.

This means that the module width $W_m$ of the barcode is too large for the particular specifications of the barcode scanner. The barcode creator in this case needs to take action such as reducing the number of digits of encoded information that forms data, or switching to a barcode type that can have a small module width. Action that needs to be taken when the barcode creator chooses not to reduce the number of digits of encoded information or switch the barcode type is to switch the barcode scanner expected to be used to a model that has a large value calculated by the following expression:

[Math. 29]

$$\frac{W_s}{d_2}$$

The examples of the action may be used in combination. For instance, switching the barcode scanner model may be performed in addition to a reduction in the number of digits of encoded information that forms data or a barcode type switch.

The module width $W_m$ satisfies the following expression in some cases:

[Math. 30]

$$W_m = \frac{W_s}{d_2}$$

The module width $W_m$ that satisfies the expression of [Math. 30] is a limit to the total module width of the barcode that is to be kept when the barcode is configured.

For instance, when the specifications of the barcode scanner specify the readable width $W_s$ as 60 mm and the minimum resolution $d_s$ as 0.15 mm, the limit value of the module width $W_m$ is calculated by 60/0.15 as 400 mods. A barcode having a total module width that exceeds 400 mods is accordingly "unreadable with the barcode scanner" irrespective of what screen specifications the terminal that displays the barcode has. This is because the width of the barcode displayed on the screen of the terminal exceeds the maximum readable width of the barcode scanner, or the minimum module width of modules that make up the barcode is less than the minimum resolution of the barcode scanner.

To summarize, in designing the configuration of a barcode to be displayed on a terminal screen, the code type of the barcode, the number of digits of encoded information of the barcode, and the like need to be determined so that the module width $W_m$ of the barcode does not exceed this limit value.

Lastly, the third condition will be discussed.

That the module width $W_m$ (or $tW_m$) of the displayed barcode is contained within the screen width of a terminal on which the barcode is to be displayed means that the width $tW_m$ dots of the displayed barcode does not exceed the width W pix of the terminal screen, namely, that the barcode image can be displayed on the terminal screen without any part of the barcode image being out of the screen.

In other words, the module width of the barcode having a relationship of Expression (C) with the terminal screen width W pix is the third condition.

$$t \cdot W_m \leq W \rightarrow W \geq t \cdot W_m \quad \text{Expression (C)}$$

This concludes the description of the first condition, the second condition, and the third condition.

A description will be given next with reference to FIG. 1, which is a P-W diagram with a horizontal axis representing P ppi and a vertical axis representing W dots, on a P-W area where the first condition, second condition, and third condition described above are satisfied, namely, a P-W area where Expression (A'), Expression (B'), and Expression (C) are satisfied.

An area 101 illustrated in FIG. 1 corresponds to a "proper area", in which the width of a barcode to be displayed and the specifications of a barcode scanner both fall within a proper range when the barcode is configured under a condition that t is 1 dot/mod. Specifically, the area 101 indicates a range that is between the minimum pixel density $P_1$ ppi at which the module width $W_m$ of the barcode to be displayed does not exceed the readable width $W_s$ of the barcode scanner and the maximum terminal screen pixel density $P_h$ ppi at which the module width $W_m$ is not below the minimum resolution $d_s$ mm of the barcode scanner, and that is where the terminal screen width W is equal to or more than the module width $W_m$ of the barcode to be displayed.

Similarly, an area 102 of FIG. 1 represents a "proper area" when a barcode is configured under a condition that t is 2 dots/mod, and an area 103 of FIG. 1 represents a "proper area" when a barcode is configured under a condition that t is 3 dots/mod.

A screen width $W_k$ pix and a screen ppi value $P_k$ ppi, which are screen specifications of an arbitrary terminal k, are plotted onto the P-W diagram of FIG. 1. In short, $k=(P_k, W_k)$ is plotted.

When the screen specifications are plotted in this manner and $k=(P_k, W_k)$ is inside the area 101, the area 102, or the area 103 in FIG. 1, this indicates that the terminal k is within a "proper area", and that the barcode can be displayed on the terminal k and is readable with a barcode scanner having the expected specifications.

When the screen specifications are plotted in this manner and $k=(P_k, W_k)$ is in an area outside the area 101, the area 102, and the area 103 in FIG. 1, on the other hand, it can be determined that the terminal k is not in a "proper area", and that the barcode cannot be displayed on the terminal k, or can be displayed but is highly unlikely to be readable with a barcode scanner having the expected specifications.

In the case where the screen specifications of the terminal k, $k=(P_k, W_k)$, are inside one of the "proper areas" described above, this means that a condition for a barcode to be displayed on the screen of the terminal k needs to conform to the condition of t that is defined by the relevant "proper area". For instance, t needs to be 1 in the case where the terminal k is in the area 101, which is one of the "proper areas" described above.

When the screen specifications of the arbitrary terminal k, $k (P_k, W_k)$, are not in any "proper area", this does not just indicate that the arbitrary terminal k is not proper. This also indicates a factor that makes the terminal k improper, namely, an impropriety factor, based on the position of $k (P_k, W_k)$ plotted onto the P-W diagram.

This point will be described with reference to FIG. 2-1, which is a simplified diagram of FIG. 1.

Figures 1, 2:
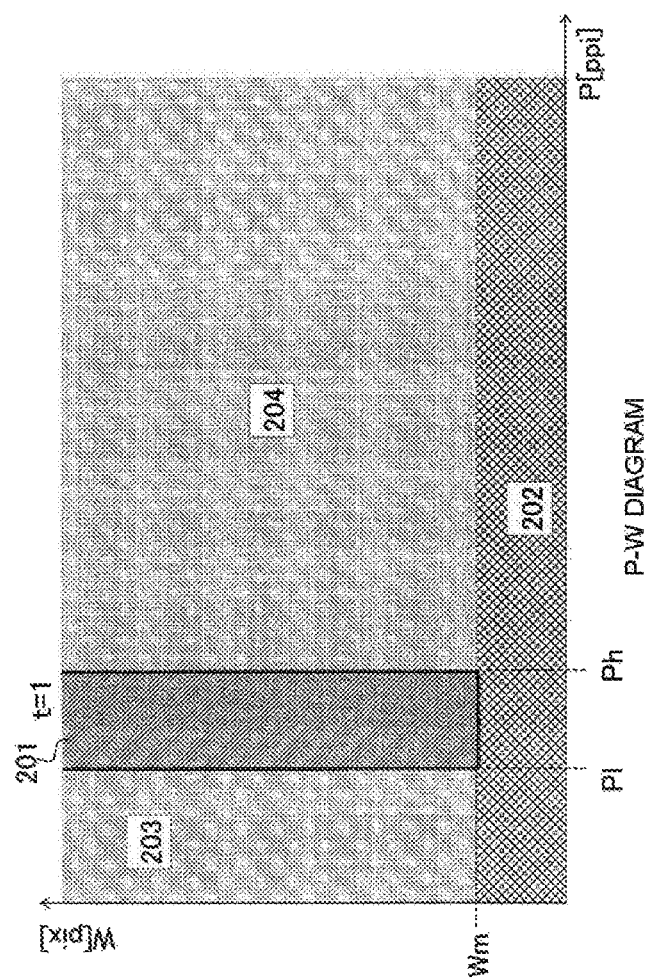
Figure 2:
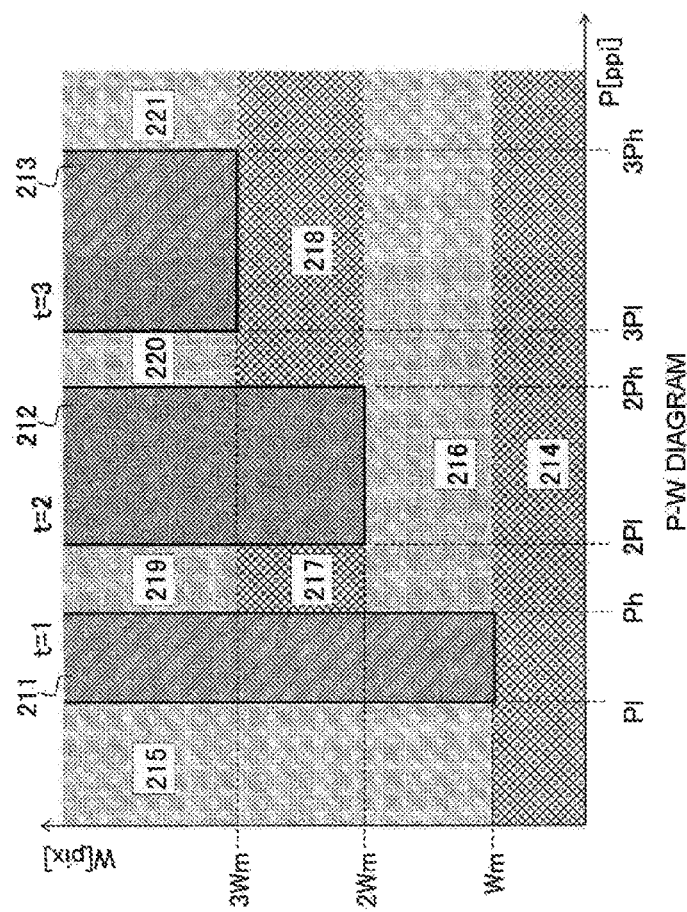

Only the "proper area" and "non-proper area" of FIG. 1 under the condition that t is 1 is are illustrated in FIG. 2-1. An area 201 of FIG. 2-1 corresponds to the area 101 of FIG. 1 and represents the "proper area". Areas of FIG. 2-1 other than the area 201, namely, an area 202, an area 203, and an area 204, are "non-proper areas" under the condition that t is 1. Respective impropriety factors of when the screen specifications of the arbitrary terminal k which are represented by $k (P_k, W_k)$ are plotted in the "non-proper areas" are as follows.

<Impropriety Factor of the Area 202 of FIG. 2-1, i.e., an Area where $W_k < W_m$ is True>

The terminal screen width $W_k$ is below the module width $W_m$ of the barcode to be displayed even under the condition that t is 1 dot/mod, and the objective barcode therefore cannot be displayed on the screen of the terminal.

<Impropriety Factor of the Area 203 of FIG. 2-1, i.e., an Area where $P_k < P$ and $W_k \geq W_m$ are True>

The barcode can be displayed on the screen of the terminal under the condition that t is 1 dot/mod. However, the pixel density is low (the pixel-to-pixel distance is long) and the width of the displayed barcode exceeds the readable width $W_s$ of the barcode scanner. The barcode consequently cannot be read with the expected specifications of the barcode scanner.

<Impropriety Factor of the Area 204 of FIG. 2-1, i.e., an Area where $P_k > P_h$ and $W_k \geq W_m$ are True>

The barcode can be displayed on the screen of the terminal under the condition that t is 1 dot/mod. However, the pixel density is high (the pixel-to-pixel distance is short) and the minimum module width of the displayed barcode is less than the minimum resolution $d_s$ of the barcode scanner. The barcode consequently cannot be read with the expected specifications of the barcode scanner.

In light of the "differences in impropriety factor", which are due to the differences in location of the "non-proper areas" and described with reference to FIG. 2-1, "impropriety factors" of "non-proper areas" in FIG. 1 where proper areas are defined under the condition that t is 1 to 3 are described with reference to FIG. 2-2.

An area 211, an area 212, and an area 213 of FIG. 2-2 correspond to the area 101, the area 102, and the area 103, respectively, which are the "proper areas" of FIG. 1.

"Non-proper areas" in this case are classified into an area 214 to an area 221, which respectively have the following "impropriety factors".

<Impropriety Factor of the Area 214 of FIG. 2-2, i.e., an Area where $W_k<W_m$ is True>

The terminal screen width $W_k$ is less than the module width $W_m$ of the barcode to be displayed even under the condition that t is 1 dot/mod, and the objective barcode therefore cannot be displayed.

<Impropriety Factor of the Area 215 of FIG. 2-2, i.e., an Area where $W_k \geq W_m$ and $P_k<P_1$ are True>

The barcode can be displayed on the screen of the terminal under the condition that t is 1 dot/mod. However, the pixel density is low (the pixel-to-pixel distance is long) and the width of the displayed barcode exceeds the readable width $W_s$ of the barcode scanner. The barcode consequently cannot be read with the barcode scanner.

<Impropriety Factor of the Area 216 of FIG. 2-2, i.e., an Area where $W_m \leq W_k<2W_m$ and $P_k>P_h$ are True>

The barcode can be displayed on the screen of the terminal under the condition that t is 1 dot/mod. However, the pixel density is high (the pixel-to-pixel distance is short) and the minimum module width of the displayed barcode is less than the minimum resolution $d_s$ of the barcode scanner. The barcode consequently cannot be read with the barcode scanner.

<Impropriety Factor of the Area 217 of FIG. 2-2, i.e., an Area where $2W_m \leq W_k<3W_m$ and $P_h<P_k<2P_1$ are True>

The barcode can be displayed on the screen of the terminal under the conditions that t is 1 dot/mod and that t is 2 dots/mod. However, when the barcode is displayed under the condition that t is 2, the width of the barcode symbol exceeds the readable width $W_s$ of the barcode scanner and, when the barcode is displayed under the condition that t is 1, the minimum module width of the barcode is less than the minimum resolution $d_s$ of the barcode scanner. The barcode is consequently unreadable with the barcode scanner in either case.

<Impropriety Factor of the Area 218 of FIG. 2-2. i.e., an Area where $2W_m \leq W_k<3W_m$ and $P_k>2P_h$ are True>

The barcode can be displayed on the screen of the terminal under the conditions that t is 1 dot/mod and that t is 2 dots/mod. However, the minimum module width of the barcode is less than the minimum resolution $d_s$ of the barcode scanner at any value of t, and the barcode is consequently unreadable with the barcode scanner.

<Impropriety Factor of the Area 219 of FIG. 2-2. i.e., an Area where $3W_m \leq W_k<4W_m$ and $P_h<P_k<2P_1$ are True>($4W_m$ is not Shown)

The barcode can be displayed on the screen of the terminal under any of the conditions that t is 1 dot/mod, that t is 2 dots/mod, and that t is 3 dots/mod. However, when the barcode is displayed under the condition that t is 2 or 3, the width of the barcode exceeds the readable width $W_s$ of the barcode scanner and, when the barcode is displayed under the condition that t is 1, the minimum module width of the barcode is less than the minimum resolution $d_s$ of the barcode scanner. The barcode is consequently unreadable with the barcode scanner in any case.

<Impropriety Factor of the Area 220 of FIG. 2-2, i.e., an Area where $3W_m \leq W_k<4W_m$ and $2P_h<P_k<3P_1$ are True> ($4W_m$ is not Shown)

The barcode can be displayed on the screen of the terminal under any of the conditions that t is 1 dot/mod, that t is 2 dots/mod, and that t is 3 dots/mod. However, when the barcode is displayed under the condition that t is 3, the width of the barcode exceeds the readable width $W_s$ of the barcode scanner and, when the barcode is displayed under the condition that t is 1 or 2, the minimum module width of the barcode is less than the minimum resolution $d_s$ of the barcode scanner. The barcode is consequently unreadable with the barcode scanner in any case.

<Impropriety Factor of the Area 221 of FIG. 2-2, i.e., an Area where $3W_m \leq W_k<4W_m$ and $P_k>3P_h$ are True>($4W_m$ is not Shown)

The barcode can be displayed on the screen of the terminal under any of the conditions that t is 1 dot/mod, that t is 2 dots/mod, and that t is 3 dots/mod. However, the minimum module width of the barcode is less than the minimum resolution $d_s$ of the barcode scanner at any value of t, and the barcode is consequently unreadable with the barcode scanner.

Returning to FIG. 1, two terminals (a terminal k1 and a terminal k2) will be considered.

A point 104 of FIG. 1 which corresponds to the screen specifications of the terminal k1 is within one of the "proper areas" described above. In other words, the terminal k1 is an example of a terminal that is within the "proper area". The terminal k1 is within a range where a barcode to be displayed can be displayed on its screen and is readable within the specification range of the barcode scanner in terms of readable width and minimum resolution when the barcode is configured under the condition that t is 2 dots/mod.

A point 105 of FIG. 1 which corresponds to the screen specifications of the terminal k2 is not within one of the "proper areas" described above. In other words, the terminal k2 is an example of a terminal that is outside the "proper area". The terminal k2 is at a point that satisfies $W_m<W_{k2}<2W_m$ in the vertical axis direction and that satisfies $2P_h<P_{k2}<3P_1$ horizontally. The terminal k2 therefore corresponds to the area 216 of FIG. 2-2 and can display on its screen a barcode to be displayed when the barcode is configured under the condition that t is 1 dot/mod. However, the minimum module width of the barcode displayed on the terminal k2 is less than the minimum resolution specification value of the barcode scanner, and the barcode is unreadable with the specifications of the barcode scanner expected to be used.

The calculation of a "propriety ratio" will be described next.

It is assumed that the "proper areas" described above are given as U and a point set of n types of terminals k1, k2, . . . kn is given as k. It is also assumed that the number of the terminals k that are within the range of the proper areas U, namely, the number of terminals that satisfy k∈U is given as m. Then a propriety ratio z of the terminals can be expressed as z=m/n (0≤z≤1). A "propriety ratio" that takes into account the barcode configuration specifications, barcode scanner specifications, and terminal screen specifications to be used can be calculated in this manner.

A quantitative value that is the "propriety ratio" can thus be calculated directly as a solution to the problem of finding out "whether a 'barcode to be used' is suitable". The calculated "propriety ratio" can also be used in an "evaluation" by comparing the "propriety ratio" with the value of another "propriety ratio" that is calculated under a different condition.

The variables and expressions described above are summarized as follows.

\<Expressions Derived from Conditions\>

[Math. 31]

$$P \geq t \cdot P_1 \left(\text{where } P_1 = \frac{25.4 \cdot W_m}{W_s}\right) \qquad \text{Expression (A')}$$

[Math. 32]

$$P \leq t \cdot P_h \left(\text{where } P_h = \frac{25.4}{d_s}\right) \qquad \text{Expression (B')}$$

$$W \geq t \cdot W_m \qquad \text{Expression (C)}$$

[Math. 33]

$$W_m \leq \frac{W_s}{d_s} \qquad \text{Expression (D)}$$

Expression (D) is an expression indicating a range of values that $W_m$ needs to take in order to establish both Expression (A') and Expression (B'). As described as a "condition that gives P an improper value" in the description of Expression (A') and Expression (B'), $P_1$ is greater than $P_h$ when $W_m$ satisfies the following expression:

[Math. 34]

$$W_m > \frac{W_s}{d_s}$$

Then Expression (A') and Expression (B') are not established. The premise for both Expression (A') and Expression (B') to be established is therefore that the module width $W_m$ is within the range of Expression (D).

\<List of Variables Used (Units Used Here are Ones Commonly Assumed for the Variables)\>

Definitions $W_m$: The lateral module width of a barcode to be displayed. The value $W_m$ is measured in units of mods and is a positive integer.

t: The constituent dot count per module of a barcode image. The value t is measured in units of dots/mod and is a positive integer.

$W_s$: An upper limit to the width of a barcode that is readable with a barcode scanner. The value $W_s$ is measured in units of mm, and is a positive integer.

$d_s$: The minimum resolution of a barcode scanner. The value $d_s$ is measured in units of mm and is a positive integer.

[Calculated Values]

[Math. 35]

$$d_h = \frac{W_s}{t \cdot W_m}$$

$d_h$: A maximum pixel-to-pixel distance mm/dot at which the width $t \cdot W_m$ of the barcode to be displayed does not exceed the readable width $W_s$ of the barcode scanner.

[Math. 36]

$$P_l(t) = \frac{25.4 \cdot t \cdot W_m}{W_s}$$

$P_l(t)$: A minimum ppi value (ppi) that corresponds to $d_h$ mm/dot. → A minimum pixel density (ppi) at which the width $t \cdot W_m$ of the barcode to be displayed does not exceed the readable width $W_s$ of the barcode scanner.

[Math. 37]

$$P_l \equiv P_l(1) = \frac{25.4 \cdot W_m}{W_s}_l$$

The value $P_1$ is defined as above, and an expression of $P_1$ is written as follows:

$$P_l(t) = t \cdot P_l \qquad \text{[Math. 38]}$$

[Math. 39]

$$P_h(t) = t \cdot \frac{25.4}{d_s}$$

$P_h(t)$: A maximum terminal screen ppi value (ppi) at which the minimum module width is no less than the minimum resolution $d_s$ mm of the barcode scanner.

[Math. 40]

$$P_h \equiv P_h(1) = \frac{25.4}{d_s}$$

The value $P_h$ is defined as above, and an expression of $P_h$ is written as follows:

$$P_h(t) = t \cdot P_h \qquad \text{[Math. 41]}$$

[Others]

d: The pixel-to-pixel distance of a(n) (arbitrary) terminal that is measured in units of mm/pix.

[Math. 42]

$$P[ppi] = \frac{25.4[\text{mm/inch}]}{d[\text{mm}/pix]}$$

P: A ppi value converted from the pixel-to-pixel distance d mm/pix of a(n) (arbitrary) terminal W: The screen width of a(n) (arbitrary) terminal that is measured in units of pix.

Those are illustrated in FIG. 1, FIG. 2-1, and FIG. 2-2, in particular. Expressions that are particularly related to this evaluation method are Expression (A'), Expression (B'), Expression (C), and Expression (D).

A specific description will be given next on example embodiments of this invention with reference to the drawings. While five example embodiments will be described in detail below, a brief description on the five embodiments is given first.

A first example embodiment of this invention relates to an evaluation device configured to evaluate an image display device and a barcode reading device.

A second example embodiment of this invention relates to an evaluation device configured to evaluate a plurality of image display devices and a plurality of barcode reading devices.

A third example embodiment of this invention relates to an evaluation device configured to determine a barcode that can be displayed on a plurality of image display devices and that is readable with a particular barcode reading device.

A fourth example embodiment of this invention relates to a barcode reading device specification determining device configured to determine the specifications of a barcode reading device configured to read a particular barcode that can be displayed on a plurality of image display devices.

A fifth example embodiment of this invention relates to a barcode image generation system configured to generate a barcode image that is displayed on an image display device.

First Example Embodiment

The first example embodiment will be described in detail. The first example embodiment relates to an evaluation device configured to determine whether a barcode to be used can be displayed on a terminal chosen for the display of the barcode and is readable with a barcode scanner expected to be used. In the following example embodiments, a barcode corresponds to a "barcode image" of this invention. A terminal corresponds to an "image display device" of the invention of this application. A barcode scanner corresponds to a "barcode reading device" of this invention. An evaluation device corresponds to a "barcode evaluation device" of the invention of this application.

Figure 3:
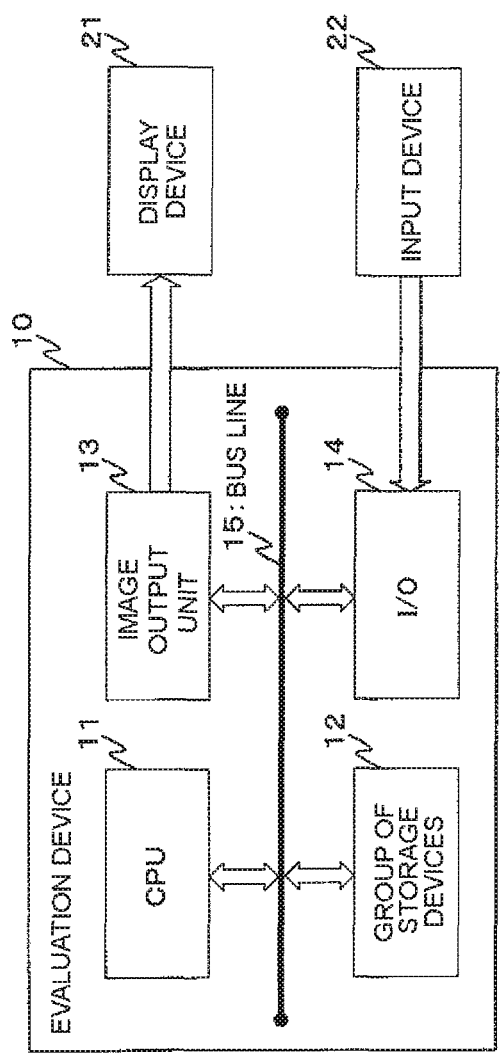
FIG. 3 is a block diagram for illustrating function blocks of an evaluation device according to example embodiments of this invention.

Referring to FIG. 3, an example of the configuration of the evaluation device will be described first. Referring to FIG. 3, an evaluation device 10, which is an example of the configuration of the evaluation device, includes a central processing unit (CPU) 11, a group of storage devices 12, an image output unit 13, and an input/output (I/O) 14. The components included in the evaluation device 10 are connected in a manner that allows communication among one another via a bus line 15, which is provided in the evaluation device 10.

A display device 21 is connected to the image output unit 13. An input device 22 is connected to the I/O 14.

The CPU 11 is configured to execute computational processing based on a program stored in the group of storage devices 12, and to perform overall control of the evaluation device 10 based on the result of the computation. The CPU 11 is also configured to determine, in a similar manner, whether or not a barcode to be used can be displayed on a terminal chosen for the display of the barcode and is readable with a barcode scanner expected to be used.

The group of storage devices includes various types of storage devices. For example, the group includes a main storage device, which is a random access memory (RAM) or the like, a read only memory (ROM), and an auxiliary storage device, which is a hard disk drive (HDD) or a solid state drive (SSD). The storage devices are configured to store variables, programs, other types of information necessary for display, and the like.

The image output unit 13 is a part configured to produce an image under an instruction from the CPU 11. An image signal produced by the image output unit 13 is supplied to the display device 21.

The display device 21 is a device with which a user looks up the result of determining whether or not a barcode to be used can be displayed on a terminal chosen for the display of the barcode and is readable with a barcode scanner expected to be used. The display device 21 is implemented by, for example, a liquid crystal display.

The I/O 14 is a part configured to connect an external device to the evaluation device 10. The input device 22, for example, is connected to the I/O 14.

The input device 22 is a device configured to receive input from the user, and is implemented by a keyboard, for example. The user uses the input device 22 to enter information, for example, the width of a barcode, the specifications of a barcode scanner, and screen specifications of a terminal. The entered information is supplied to the evaluation device 10 via the I/O 14. The pieces of information are processed by the CPU 11.

The evaluation device 10 may be implemented as a device specific to the first example embodiment, or may be implemented by incorporating a program that is specific to the first example embodiment in a general-purpose device, for example, a personal computer.

Processing executed by the evaluation device 10 to determine whether or not a certain barcode can be displayed on a certain terminal and is readable with a certain barcode scanner will be described next with reference to a flow chart of FIG. 4.

Input of information necessary for evaluation, for example, the width of the barcode, the specifications of the barcode scanner, and screen specifications of the terminal, is received in Step S401, Step S402, and Step S403, respectively.

Specifically, the user supplies the necessary information by using the input device 22 or other devices. The evaluation device 10 receives the necessary information via the I/O 14. The evaluation device 10 may further include a communication unit configured to perform data communication over a network. Some of or all of necessary pieces of information may in this case be obtained from an external device through data communication via the communication unit.

Specifically, the input received in Step S401 is of information for identifying the barcode to be used (e.g., the name of the barcode to be used), and the total module width $W_m$ mods of this barcode, which includes a barcode symbol and the left and right margins of the barcode.

The input received in Step S402 is of information for identifying the barcode scanner that is expected to be used (e.g., the name of the barcode scanner expected to be used), the minimum resolution $d_s$ mm of the barcode scanner, and the maximum readable width $W_s$ mm of the barcode scanner.

The input received in Step S403 is of information for identifying the terminal that is expected to be used (e.g., the name of the terminal expected to be used), and the screen width (in pixel count) $W_k$ pix and the pixel density $P_k$ ppi that are screen specifications of the terminal.

The module width $W_m$ of the barcode to be used depends on configuration conditions of the "barcode to be used" such as the code type of the barcode to be used, the number of digits of encoded information of the barcode to be used, and so on. This means that, in the case where the barcode type to be used, the number of digits of the encoded information, and the like are determined in advance, the module width $W_m$ of the barcode to be used can be calculated in advance.

In Table 1, an example of a calculation expression of the module width $W_m$ is shown, which varies depending on configuration conditions of the "barcode to be used", for example, the code type and the number of digits of the encoded information.

TABLE 1

Example of calculation expression of module width $W_m$

| Code type | Barcode configuration condition | Calculation expression digit count n, total width $W_m$ [mod] including margins |
|---|---|---|
| CODE128 | CODESET C, Numerical characters in units of 2 digits | $W_m = 11n/2 + 55$ |
| | CODESET A, B | $W_m = 11n + 55$ |
| GS1 - 128 | CODESET C, Numerical characters in units of 2 digits | $W_m = 11n/2 + 66$ |
| (EAN - 128) | CODESET A, B | $W_m = 11n + 66$ |
| CODABAR (NW7) | NW ratio = r, character-to-character GAP = c[mod] when data has only numerical characters | $W_m = 4 \times (3r + 4) + n \times (2r + 5) + c(n + 1)$ |
| | example) NW ratio = 3.0, character-to-character GAP = 1[mod] when data has only numerical characters | $W_m = 12n + 53$ |
| | example) NW ratio = 2.5, character-to-character GAP = 1[mod] when data has only numerical characters | $W_m = 11n + 47$ |
| CODE39 | NW ratio r, character-to-character GAP = c[mod] when data has only numerical characters | $W_m = 3(r + 2)(n + 2) + (n + 1)c + 20$ |
| | example) NW ratio = 3.0, character-to-character GAP = 1[mod] when data has only numerical characters | $W_m = 16n + 51$ |
| | example) NW ratio = 2.5, character-to-character GAP = 1[mod] when data has only numerical characters | $W_m = 14.5n + 48$ |
| EAN-13 | numerical characters fixed to 13 digits | $W_m = 113$ |
| EAN-8 | numerical characters fixed to 8 digits | $W_m = 87$ |

In Step S401, the module width $W_m$ itself may be received from the user. Specifically, the evaluation device 10 may receive the module width $W_m$ that is calculated by the user in advance based on configuration conditions of the "barcode to be used" such as the code type, the number of digits of encoded information, and so on.

Alternatively, the evaluation device 10 may calculate the module width $W_m$ by receiving, from the user, information necessary for the calculation of the module width $W_m$ such as information of configuration conditions of the "barcode to be used", for example, the code type, the number of digits of encoded information, and so on.

The evaluation device 10 in this case is equipped with a function for performing calculation based on the calculation expression that is shown in Table 1. This is accomplished by, for example, storing in the group of the storage devices 12 a program for performing calculation based on the calculation expression of Table 1. The CPU 11 executes computation based on the program, to thereby calculate the module width $W_m$.

Information necessary for the calculation of the module width $W_m$ is supplied by the user in, for example, Step S401. The code type, the number of digits of the data, and other types of necessary information dependent on the code (for example, the NW ratio of CODABAR) are received. The module width $W_m$ may be obtained through calculation based on the received pieces of information.

Processing of determining the suitability/unsuitability of the barcode based on the information received in Step S401, Step S402, and Step S403 is started next (Step S404).

In Step S404, whether or not barcode dimensions are suitable for the specifications of the barcode scanner is determined first without considering the screen specifications of the terminal.

Specifically, a barcode having the same width as the readable width $W_s$ mm of the barcode scanner is configured with the minimum resolution $d_s$ mm of the barcode scanner as the minimum module width.

[Math. 43]

$$\frac{W_s}{d_s}$$

The module width in this case is expressed by the expression of [Math. 43], and whether the module width is equal to or more than the barcode width $W_m$ mods supplied in Step S401 is determined.

[Math. 44]

$$W_m \leq \frac{W_s}{d_s}$$

Specifically, whether or not the expression of [Math. 44] is true is determined.

[Math. 45]

$$W_m \leq \frac{W_s}{d_s}$$

When it is determined as a result that the relationship of [Math. 45] is not established ("No" in Step S404), the evaluation device 10 proceeds to Step S405.

The expression of [Math. 46] represents the maximum barcode width (module width) that can be read with the barcode scanner.

[Math. 46]

$$\frac{W_s}{d_s}$$

As described above in the description of Expression (A') and Expression (B'), a barcode symbol having a module width that exceeds a value calculated by the expression of [Math. 47] may theoretically be displayed on a terminal screen.

[Math. 47]

$$\frac{W_s}{d_s}$$

However, this barcode symbol makes the total width of the barcode more than the readable width of the barcode scanner or less than the minimum resolution of the barcode scanner, and the barcode consequently cannot be read with the barcode scanner.

When the readable width $W_s$ of a certain barcode scanner is 60 mm and the minimum resolution $d_s$ of the barcode scanner is 0.15 mm, for example, the maximum readable width is as follows:

[Math. 48]

$$\frac{W_s}{d_s} = 400 [\text{mod}]$$

It is therefore understood without even considering the screen specifications of a terminal used to display a barcode that a barcode whose module width $W_m$ exceeds 400 mods cannot be read with the certain barcode scanner.

In Step S405, a message to the effect that "the barcode dimensions are incompatible with the barcode scanner specifications" is produced to the display device 21. The evaluation device 10 proceeds to Step S412, where the barcode is determined as no good (NG). In Step S413, the series of determination processing steps is ended.

On the other hand, it may be determined in Step S404 that the relationship of [Math. 49] is established.

[Math. 49]

$$W_m \leq \frac{W_s}{d_s}$$

In this case ("Yes" in Step S404), the evaluation device 10 proceeds to Step S406.

In Step S406, the evaluation device 10 determines whether or not a barcode having the module width $W_m$ supplied in Step S401 can be displayed on a screen of a terminal having the screen specifications supplied in Step S403. Specifically, the barcode is "displayable" on the terminal when the module width $W_m$ of the barcode is equal to or less than the terminal screen width $W_k$, and is "undisplayable" otherwise.

When the barcode is determined as "undisplayable" in Step S406 ("No" in Step S406), the evaluation device 10 proceeds to Step S407.

In Step S407, a message to the effect that "the barcode is undisplayable on the terminal screen" is supplied to the display device 21. The evaluation device 10 proceeds to Step S412, where the barcode is determined as NG. In Step S413, the series of determination processing steps is ended.

When it is determined in Step S406 that "the barcode is displayable on the terminal screen" ("Yes" in Step S406), on the other hand, the evaluation device 10 proceeds to Step S408.

In Step S408, the evaluation device 10 determines whether or not the minimum module width of the barcode that has the module width $W_m$ and that is displayed on the terminal screen is more than the minimum resolution of the barcode scanner and whether or not the width (mm) of the barcode displayed on the terminal screen is equal to or less than the readable width of the barcode scanner.

Specifically, the determination is made through the following calculation:

The minimum module width of the barcode to be displayed is given as t dots/mod.

[Math. 50]

$$t \leq \frac{W_k}{W_m} (\text{where } W_m \leq W_k)$$

The minimum module width t is 1 dot/mod, 2 dots/mod . . . , with an integer that satisfies the expression of [Math. 50] as a maximum value.

The evaluation device 10 determines whether or not a range of values that t can take in this case includes t with which two expressions of [Math. 51] and [Math. 52] are established simultaneously at the pixel density $P_k$ of the terminal.

[Math. 51]

$$P \geq t \cdot P_l \left( \text{where } P_l = \frac{25.4 \cdot W_m}{W_s} \right) \quad \text{Expression (A')}$$

[Math. 52]

$$P \leq t \cdot P_h \left( \text{where } P_h = \frac{25.4}{d_s} \right) \quad \text{Expression (B')}$$

When it is determined as a result that there is no value of t with which the two expressions are established simultaneously, the barcode is determined as "unreadable" ("No" in Step S408), and the evaluation device 10 proceeds to Step S409. In Step S409, a message to the effect that "the barcode is displayable but cannot be read with the barcode scanner" is supplied to the display device 21. The evaluation device 10 proceeds to Step S412, where the barcode is determined as NG. In Step S413, the series of determination processing steps is ended.

When there is at least one value of t with which Expression (A') and Expression (B') are established simultaneously, on the other hand, the barcode is "readable" ("Yes" in Step S408), and the evaluation device 10 proceeds to Step S410. In Step S410, a message to the effect that "the barcode can be displayed and is readable with the barcode scanner" is supplied to the display device 21. The number of values of t with which Expression (A') and Expression (B') are established simultaneously may additionally be displayed in this case. The evaluation device 10 then proceeds to Step S411, where the barcode is determined as OK. In Step S413, the series of determination processing steps is ended.

Figure 5:
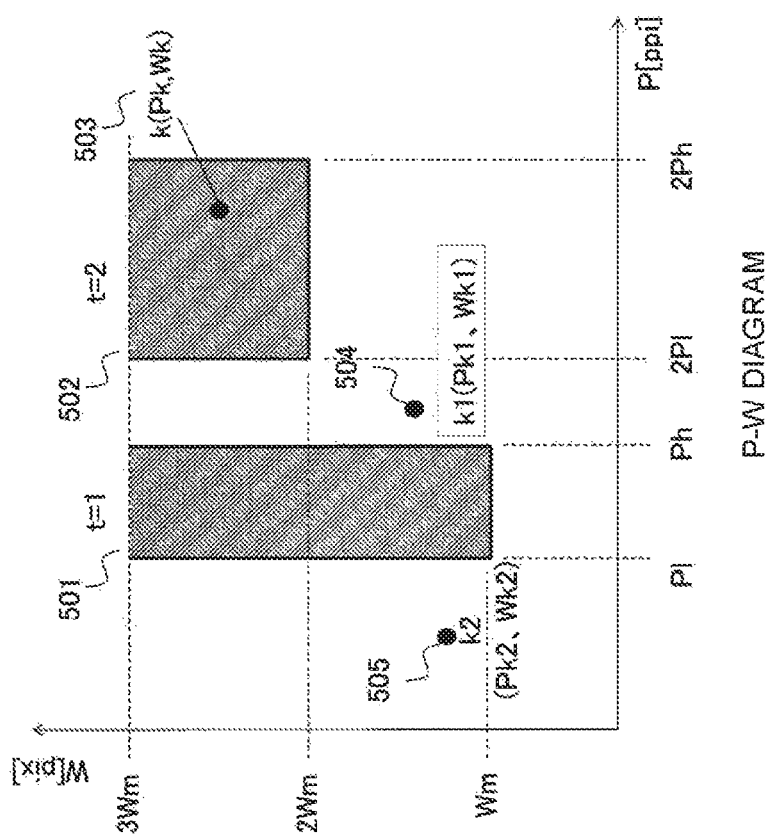
FIG. 5 is a P-W diagram for illustrating an example of the relation between a proper area and terminal screen specifications in a specific example that is described in the first example embodiment of this invention.

After the series of determination processing steps is ended in Step S413, an area where Expression (A'), Expression (B'), and $W \geq t \cdot W_m$ are all established simultaneously is mapped onto a P-W plane in which the vertical axis represents the terminal screen width W pix and the horizontal axis represents the pixel density P ppi as illustrated in FIG. 5. In this example, an area 501 and an area 502 are mapped as areas where all of the expressions are established at the same time.

A point corresponding to the pixel density $P_k$ ppi and the screen width $W_k$ pix of the terminal for which the determination is made, i.e., a point corresponding to the screen specifications of the determination target terminal, is then plotted onto the P-W plane.

The evaluation device 10 then produces the P-W plane that indicates areas where Expression (A'), Expression (B'), and $W \geq t \cdot W_m$ are all established simultaneously, with a point that corresponds to the screen specifications of the determination target terminal plotted thereon, by displaying the P-W plane on the display device 21 or other methods.

For example, a diagram on which a point 503 corresponding to the screen specifications of the determination target terminal is plotted is displayed as illustrated in FIG. 5. Whether or not a barcode having the width $W_m$ mods can be displayed on a terminal having the pixel density $P_k$ ppi and the screen width $W_k$ pix and is readable with a barcode scanner having the minimum resolution $d_s$ mm and the maximum readable width $W_s$ mm, namely, whether or not the relation among the barcode width, the terminal screen specifications, and the barcode scanner specifications is "proper", is visualized in this manner, thereby enabling a user who sees the terminal screen to check visually.

For example, a user who sees the display device 21 on which the diagram of FIG. 5 is displayed understands that the point 503 corresponding to the screen specifications of the terminal k is in a "proper area" under the condition that t is 2. In other words, the user understands that the relation among the barcode width, the terminal screen specifications, and the barcode scanner specifications is "proper" for the terminal k under the condition that t is 2.

The user also understands that some factor makes the terminal screen specifications "improper" when a point k corresponding to the terminal pixel density $P_k$ ppi and the terminal screen width $W_k$ pix is outside an area where Expression (A'), Expression (B'), and $W \geq t \cdot W_m$ are all established simultaneously. The user can further determine what "factor" makes the terminal screen specifications improper and the "degree" of impropriety of the terminal screen specifications from the positional relation between an area where Expression (A'), Expression (B'), and $W \geq t \cdot W_m$ are all established simultaneously and the point k.

For example, a point 504 illustrated in FIG. 5 and corresponding to the screen specifications of the terminal k1 is in neither the area 501 nor the area 502. This means that the screen specifications of the terminal k1 are "improper" in relation to the barcode width and the barcode scanner specifications. In this case, the point 504 corresponding to the screen specifications of the terminal k1 is at $W_{k1}$, which is located between $W_m$ and $2W_m$ on the vertical axis, and it is therefore understood that the barcode is "displayable" on the terminal k1 only under the condition that t is 1. However, the point 504 corresponding to the screen specifications of the terminal k1 is at $P_{k1}$ on the horizontal axis to the right of the area 501, which is a proper area when t is 1, and is greater than $P_h$. It is therefore understood that the "impropriety factor" in the case where the barcode is displayed on the terminal under the condition that t is 1 is that the displayed barcode has a minimum module width less than the minimum resolution of the barcode scanner and accordingly cannot be read with the barcode scanner.

[Math. 53]

$$\frac{W_{k1}}{P_h} - 1$$

In the example of FIG. 5, the "degree" of impropriety of the point 504 corresponding to the screen specifications of the terminal k can also be measured by quantifying how far the point 504 is from the border of the proper area with the use of the expression of [Math. 53].

A point 505 of FIG. 5 corresponds to the screen specifications of the terminal k2 and, similarly to the point 504, which corresponds to the screen specifications of the terminal k1, is in neither the area 501 nor the area 502. This means that the screen specifications of the terminal k2 are "improper" in relation to the barcode width and the barcode scanner specifications. In this case, the point 505 corresponding to the screen specifications of the terminal k2 is at $W_{k2}$, which is located between $W_m$ and $2W_m$ on the vertical axis, and it is therefore understood that the barcode is "displayable" on the terminal k2 only under the condition that t is 1.

However, the point 505 corresponding to the screen specifications of the terminal k2 is at $P_{k2}$ on the horizontal axis to the left of the area 501, which is a proper area when t is 1, and is less than $P_1$. It is therefore understood that the "impropriety factor" in the case where the barcode is displayed on the terminal under the condition that t is 1 is that the displayed barcode has a total width greater than the readable width of the barcode scanner and accordingly cannot be read with the barcode scanner.

[Math. 54]

$$1 - \frac{W_{k2}}{P_h}$$

In the example of FIG. 5, the "degree" of impropriety of the point 505 corresponding to the screen specifications of the terminal k2 can also be measured by quantifying how far the point 505 is from the border of the proper area with the use of the expression of [Math. 54].

According to the first example embodiment described above, whether a relation among the barcode width, the terminal screen specifications, and the barcode scanner specifications is "proper" or not can be evaluated. In the case where the relation is not proper, what "factor" makes the relation improper and the "degree" of impropriety can also be found out. Another effect of the first example embodiment is that presenting the pieces of information to a user in a visual form enables the user to grasp the pieces of information visually.

Second Example Embodiment

The second example embodiment will be described next. The second example embodiment relates to an evaluation device configured to determine whether a plurality of barcodes to be used can be displayed on a plurality of terminals chosen for the display and are readable with a plurality of barcode scanners expected to be used.

The second example embodiment is effective as a measure for comprehensively determining, for a plurality of barcodes, a plurality of barcode scanners, and a plurality of terminals, whether a barcode can be displayed on a screen of a terminal and is readable with a barcode scanner.

The evaluation device 10 in the second example embodiment has the same configuration as that in the first embodiment, which is described with reference to FIG. 3, and hence a repetitive description is omitted.

Figure 6:
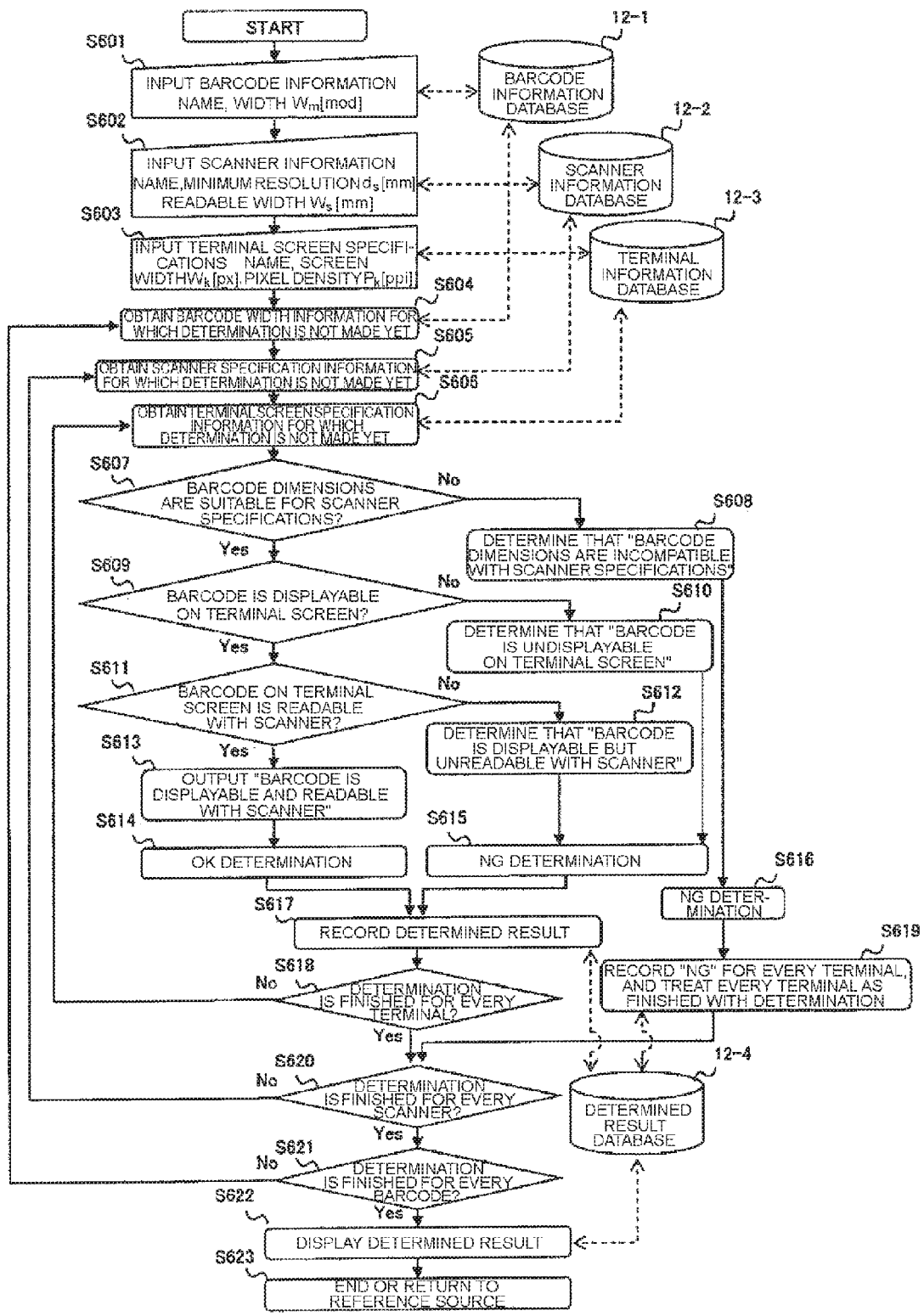
FIG. 6 is a flow chart for illustrating basic operation in a second example embodiment of this invention.

Processing executed by the evaluation device 10 to determine whether or not a certain barcode can be displayed on a certain terminal and is readable with a certain barcode scanner is described next with reference to a flow chart of FIG. 6. The processing illustrated in the flow chart of FIG. 6 is a modification of the processing in the first example embodiment which is described with reference to FIG. 4, and is designed to determine for a plurality of barcodes, a plurality of terminals, and a plurality of barcode scanners whether or not a barcode can be read on a terminal with a barcode scanner.

Input of information necessary for evaluation, for example, the widths of a plurality of barcodes, the specifications of a plurality of barcode scanners, and the screen specifications of a plurality of terminals, is received in Step S601, Step S602, and Step S603, respectively. Specifically, a user supplies the necessary information by using the input device 22 or other devices. The evaluation device 10 receives the necessary information via the I/O 14. The evaluation device 10 may further include a communication unit configured to perform data communication over a network. Some of or all of necessary pieces of information may in this case be obtained from an external device through data communication via the communication unit.

More specifically, the input received in Step S601 for each of a plurality of barcodes is of information for identifying the barcode to be used (e.g., the name of the barcode to be used), and the total module width $W_m$ mods of this barcode which includes a barcode symbol and the left and right margins of the barcode.

The input received in Step S602 for each of a plurality of barcode scanners is of information for identifying the barcode scanner that is expected to be used (e.g., the name of the barcode scanner expected to be used), the minimum resolution $d_s$ mm of the barcode scanner, and the maximum readable width $W_s$ mm of the barcode scanner.

The input received in Step S603 for each of a plurality of terminals is of information for identifying the terminal that is expected to be used (e.g., the name of the terminal expected to be used), and the screen width (in pixel count) $W_k$ pix and the pixel density $P_k$ ppi, which are screen specifications of the terminal.

The input pieces of information are stored in respectively assigned databases. Specifically, the input pieces of information are recorded in a barcode information database 12-1, a barcode scanner information database 12-2, and a terminal information database 12-3. The three databases are implemented by one of the storage devices included in the group of storage devices 12 of the evaluation device 10. Instead of supplying the information in Step S601, Step S602, and Step S603, which are executed in this processing, some of or all of the pieces of information to be supplied may be recorded in advance in the barcode information database 12-1, the barcode scanner information database 12-2, and the terminal information database 12-3.

Now, the association between the input pieces of information and the databases will be described.

The barcode information database 12-1 stores, for each of a plurality of barcodes, the barcode information supplied in Step S601, specifically, information for identifying a barcode to be used (e.g., the name of the barcode to be used), and the total module width $W_m$ mods of the barcode which includes the barcode symbol and the left and right margins of the barcode. As in the first example embodiment, the module width $W_m$ of the barcode to be used depends on the type of the barcode to be used, the number of digits of encoded information of the barcode to be used, and other configuration conditions of the "barcode to be used", and can be calculated in advance. The module width $W_m$ may also be calculated, as in the first example embodiment, by the evaluation device 10 based on the calculation expression shown in Table 1.

The barcode scanner information database 12-2 stores, for each of a plurality of barcode scanners, the barcode scanner information supplied in Step S601, specifically, information for identifying a barcode scanner expected to be used (e.g., the name of the barcode scanner expected to be used), the minimum resolution $d_s$ mm of the barcode scanner, and the maximum readable width $W_s$ mm of the barcode scanner.

The terminal information database 12-3 stores, for each of a plurality of terminals, the terminal information supplied in Step S603, specifically, information for identifying a terminal expected to be used (e.g., the name of the terminal expected to be used), and the screen width $W_k$ (in pixel count) pix and the pixel density $P_k$ ppi, which are screen specifications of the terminal.

Data in the barcode information database 12-1, data in the barcode scanner information database 12-2, and data in the terminal information database 12-3 are handled as n-th data. It is assumed that the CPU 11 of the evaluation device 10 is capable of retrieving the n-th data as the need arises. Examples of what is recorded in the barcode information database 12-1, the barcode scanner information database 12-2, and the terminal information database 12-3 are given below as Table 2, Table 3, and Table 4, respectively.

TABLE 2

Example of records of barcode information database 12-1

| Record No. | Barcode name | Barcode width $W_m$[mod] |
|---|---|---|
| 1 | aaaa | Wm1 |
| 2 | bbbb | Wm2 |
| ... | ... | ... |
| N | nnnn | Wmn |

TABLE 3

Example of records of barcode scanner information database 12-2

| Record No. | Barcode scanner name | Minimum resolution $d_s$[mm] | Readable width $W_s$[mm] |
|---|---|---|---|
| 1 | XXXX | $d_{s1}$ | $W_{s1}$ |
| 2 | YYYY | $d_{s2}$ | $W_{s2}$ |
| ... | ... | ... | ... |
| N | ZZZZ | $d_{sn}$ | $W_{sn}$ |

TABLE 4

Example of records of terminal information database 12-3

| Record No. | Terminal name | Terminal screen width $W_k$[pix] | Terminal pixel density $P_k$[ppi] |
|---|---|---|---|
| 1 | ○○○○ | $W_{k1}$ | $P_{k1}$ |
| 2 | △△△△ | $W_{k2}$ | $P_{k2}$ |
| ... | ... | ... | ... |
| N | ☐☐☐☐ | $W_{kn}$ | $P_{kn}$ |

After the pieces of information are stored in the databases, suitability/unsuitability determining processing starts in Step S604 of FIG. 6. The suitability/unsuitability determining processing will be described.

In Step S604, the barcode width information $W_m$ mods for which the determination is not made yet is retrieved from the barcode information database 12-1. In Step S605, the minimum resolution $d_s$ mm and maximum readable width $W_s$ mm of a barcode scanner, which are barcode scanner specifications for which the determination is not made yet, are retrieved. In Step S606, the pixel width (in pixel count) $W_k$ pix and the pixel density $P_k$ ppi, which are screen specifications of a terminal for which the determination is not made yet, are retrieved from the barcode scanner information database 12-3. In the second example embodiment, information for which the determination is not made yet is retrieved and targets of the determination are switched each time the determination processing is executed, to thereby determine suitability/unsuitability for every combination of a barcode, a set of barcode specifications, and a set of terminal screen specifications out of a plurality of barcodes, a plurality of sets of barcode specifications, and a plurality of sets of terminal screen specifications.

The evaluation device 10 next proceeds to Step S607 to determine whether the barcode dimensions are suitable for the barcode scanner specifications irrespective of what screen specifications the terminal has.

Figure 4:
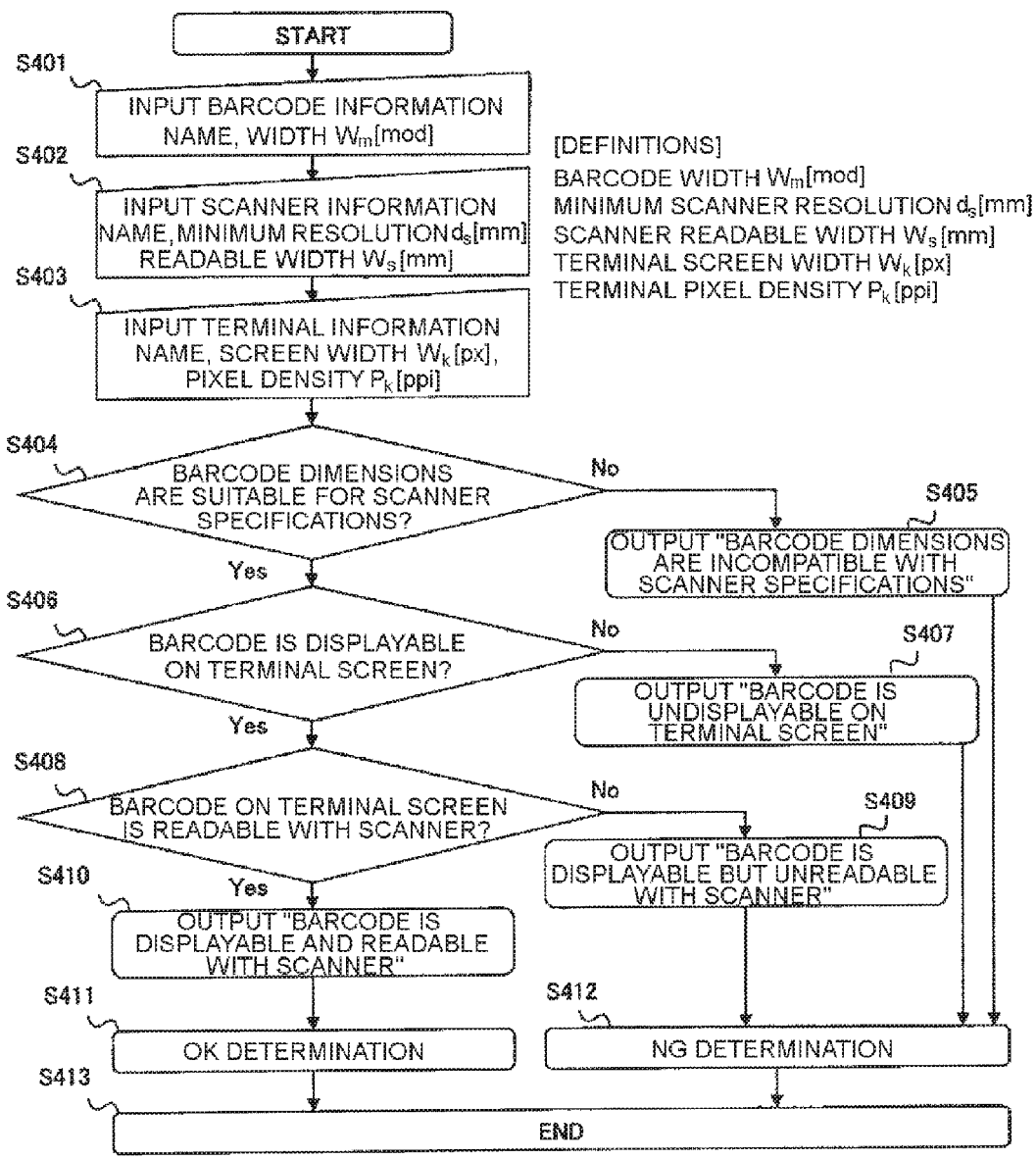
FIG. 4 is a flow chart for illustrating basic operation in a first example embodiment of this invention.

The specific method for determination is the same as the determination method of the first example embodiment that is executed in Step S404 of FIG. 4.

[Math. 55]

$$\frac{W_s}{d_s}$$

The module width in this case is expressed by the expression of [Math. 55], and whether the module width is equal to or more than the barcode width $W_m$ mods retrieved in Step S604 is determined.

[Math. 56]

$$W_m \leq \frac{W_s}{d_s}$$

Specifically, whether or not the expression of [Math. 56] is true is determined.

[Math. 57]

$$W_m \leq \frac{W_s}{d_s}$$

When it is determined as a result that the relationship of [Math. 57] is not established ("No" in Step S607), the evaluation device 10 proceeds to Step S608.

In Step S608, it is determined that "the barcode dimensions are incompatible with the barcode scanner specifications" irrespective of what the terminal screen specifications are. The evaluation device 10 proceeds to Step S616, where the barcode is determined as NG. In Step S619, processing of individually checking terminal specifications is skipped, and a determined result that the barcode having the module width $W_m$, which is the current determination target, is NG on all terminals is recorded in a determined result database 12-4. The evaluation device 10 deems that the determination is finished for all terminals, and then proceeds to Step S620, which is the next processing step. The determined result database 12-4 is a database configured to store the determined results. As is the case for the above-mentioned three databases, that is, the barcode information database 12-1, the barcode scanner information database 12-2, and the terminal information database 12-3, the determined result database 12-4 is implemented by one of the storage devices included in the group of storage devices 12 of the evaluation device 10.

On the other hand, it may be determined in Step S607 that the relationship of [Math. 58] is established.

[Math. 58]

$$W_m \leq \frac{W_s}{d_s}$$

In this case ("Yes" in Step S607), the evaluation device 10 proceeds to Step S609.

In Step S609, similarly to Step S406 of FIG. 4 in the first example embodiment, the evaluation device 10 determines whether or not the barcode that has the module width $W_m$, which is supplied in Step S604 and is the current determination target, can be displayed on a screen of a terminal having the screen specifications, which are supplied in Step S606 and are the current determination target. Specifically, the barcode is "displayable" on the terminal when the module width $W_m$ of the barcode is equal to or less than the terminal screen width $W_k$, and is "undisplayable" otherwise.

When the barcode is determined as "undisplayable" in Step S609 ("No" in Step S609), the evaluation device 10 proceeds to Step S610.

In Step S610, it is determined that "the barcode is undisplayable on the terminal screen". The evaluation device 10 proceeds to Step S615, where the barcode is determined as NG. In Step S617, the terminal information, the barcode module width information, and the barcode scanner specification information for which the determination is made, and the determined result are recorded in the determined result database 12-4. The evaluation device 10 then proceeds to Step S618, which is the next processing step.

When it is determined in Step S609 that "the barcode is displayable on the terminal screen" ("Yes" in Step S609), on the other hand, the evaluation device 10 proceeds to Step S611.

In Step S611, similarly to Step S408 of FIG. 4 in the first example embodiment, the evaluation device 10 determines whether or not the minimum module width of the barcode that has the module width $W_m$ being the current determination target and that is displayed on the terminal screen being the current determination target is more than the minimum resolution of the barcode scanner being the current determination target and whether or not the width of the barcode displayed on the terminal screen is equal to or less than the readable width $W_s$ mm of the barcode scanner being the current determination target.

Specifically, similarly to the first embodiment, the determination is made through the following calculation:

The minimum module width of the barcode to be displayed is given as t dots/mod.

[Math. 59]

$$t \leq \frac{W_k}{W_m} \text{(where } W_m \leq W_k\text{)}$$

The minimum module width t is 1 dot/mod, 2 dots/mod . . . , with an integer that satisfies the expression of [Math. 59] as a maximum value.

The evaluation device 10 determines whether or not a range of values that t can take in this case includes t with which two expressions of [Math. 60] and [Math. 61] are established simultaneously at the pixel density $P_k$ of the terminal.

[Math. 60]

$$P \geq t \cdot P_l \left( \text{where } P_l = \frac{25.4 \cdot W_m}{W_s} \right) \quad \text{Expression (A')}$$

[Math. 61]

$$P \leq t \cdot P_h \left( \text{where } P_h = \frac{25.4}{d_s} \right) \quad \text{Expression (B')}$$

When it is determined as a result that there is no value of t with which the two expressions are established simultaneously, the barcode is determined as "unreadable" ("No" in Step S611), and the evaluation device 10 proceeds to Step S612.

Data in the barcode information database 12-1, data in the barcode scanner information database 12-2, and data in the terminal information database 12-3 are handled as n-th data. It is assumed that the CPU 11 of the evaluation device 10 is capable of retrieving the n-th data as the need arises. Examples of what is recorded in the barcode information database 12-1, the barcode scanner information database 12-2, and the terminal information database 12-3 are shown in Table 2, Table 3, and Table 4, respectively.

An example of what is recorded in the determined result database 12-4 is given below as Table 5.

Values calculated in the process of determination and reasons for determining the barcode as "incompatible" in Step S608, Step S610, and Step S612 may be added to the determined results as supplementary information. In the second example embodiment, suitability/unsuitability is determined for every combination of a barcode, a set of barcode scanner specifications, and a set of terminal screen specifications that are to be used in a round robin fashion. The total number of determined result records is accordingly calculated by multiplying the number of terminals, the number of barcode scanners, and the number of barcodes by each other. While suitability/unsuitability is usually determined for every combination, the determination may be made for some of the combinations if there is a reason to do so.

TABLE 5

Example of records of determined result database 12-4
(Example in which terminal count is n, barcode scanner count is 2, and barcode count is 2)

| | Terminal information | | | Barcode scanner information | | | Barcode information | | |
| --- | --- | --- | --- | --- | --- | --- | --- | --- | --- |
| Record No. | Terminal name | Screen width $W_k$[pix] | Pixel density $P_k$[ppi] | Name | Minimum resolution $d_s$[mm] | Readable width $W_s$[mm] | Name | Width $W_m$[mod] | Determined result |
| 1 | ○○○○ | $W_{k1}$ | $P_{k1}$ | xxx | $d_{s1}$ | $W_{s1}$ | aaa | $W_{m1}$ | OK |
| 2 | △△△△ | $W_{k2}$ | $P_{k2}$ | xxx | $d_{s1}$ | $W_{s1}$ | aaa | $W_{m1}$ | OK |
| . | . | . | . | . | . | . | . | . | . |
| n | □□□□ | $W_{kn}$ | $P_{kn}$ | xxx | $d_{s1}$ | $W_{s1}$ | aaa | $W_{m1}$ | OK |
| n + 1 | ○○○○ | $W_{k1}$ | $P_{k1}$ | yyy | $d_{s2}$ | $W_{s2}$ | aaa | $W_{m1}$ | OK |
| . | . | . | . | . | . | . | . | . | . |
| 2n | □□□□ | $W_{kn}$ | $P_{kn}$ | yyy | $d_{s2}$ | $W_{s2}$ | aaa | $W_{m1}$ | NG |
| 2n + 1 | ○○○○ | $W_{k1}$ | $P_{k1}$ | xxx | $d_{s1}$ | $W_{s1}$ | bbb | $W_{m2}$ | NG |
| . | . | . | . | . | . | . | . | . | . |
| 3n | □□□□ | $W_{kn}$ | $P_{kn}$ | xxx | $d_{s1}$ | $W_{s1}$ | bbb | $W_{m2}$ | OK |
| . | . | . | . | . | . | . | . | . | . |

In Step S612, it is determined that "the barcode is displayable but cannot be read with the barcode scanner". The evaluation device 10 proceeds to Step S615, where the barcode is determined as NG. In Step S617, the terminal information, the barcode module width information, and the barcode scanner specification information for which the determination is made, and the determined result are recorded in the determined result database 12-4. The evaluation device 10 then proceeds to Step S618, which is the next processing step.

In Step S618, the evaluation device 10 checks whether or not there is a terminal for which the determination processing of Step S609 and Step S611 is not executed yet in the terminal information input in Step S603, i.e., terminals recorded in the terminal information database 12-3. When there is a terminal for which the determination is not made yet ("No" in Step S618), the evaluation device 10 returns to Step S606 to select anew the terminal for which the determination is not made yet, and to execute the determination processing. When there is no terminal for which the determination is not made yet ("Yes" in Step S618), on the other hand, the evaluation device 10 proceeds to Step S620.

In Step S620, the evaluation device 10 checks whether or not there is a barcode scanner for which the determination processing of Step S607 and Step S611 is not executed yet in the barcode scanner specification information input in Step S602, i.e., barcode scanners recorded in the barcode scanner information database 12-2. When there is a barcode scanner for which the determination is not made yet ("No" in Step S620), the evaluation device 10 returns to Step S605 to select anew the barcode scanner for which the determination is not made yet and to execute the determination processing. When there is no barcode scanner for which the determination is not made yet ("Yes" in Step S620), the evaluation device 10 proceeds to Step S621.

In Step S621, the evaluation device 10 checks whether or not there is a barcode for which the determination processing in Step S607, Step S609, and Step S611 is not executed yet in the barcode module width information input in Step S601, i.e., barcodes recorded in the barcode information database 12-1. When there is a barcode for which the determination is not made yet ("No" in Step S621), the evaluation device 10 returns to Step S604 to select anew a barcode for which the determination is not made yet, and to execute the determination processing. When there is no barcode for which the determination is not made yet ("Yes" in Step S621), on the other hand, the evaluation device 10 proceeds to Step S622. When the answer is "Yes" in Step S621, this means that the determination is finished for every combination of a barcode, a set of barcode scanner specifications, and a set of terminal specifications that are to be used. The determination processing is accordingly ended at this point.

In Step S622, determined results are produced based on the determined results recorded in the series of determination processes (information recorded in the determined result database 12-4). The determined results are produced by, for example, displaying the determined results on the display device 21.

All pieces of information recorded in the determined result database 12-4 may be produced, or the recorded information may be sorted by barcode scanner type and barcode width to be displayed in a list format. An example of this form of displaying results is given below as Table 6. At this point, the number of terminals that have "OK" as the determined result may be counted for each combination of a barcode scanner type and a barcode width separately so that a value obtained by dividing the number of "OK" terminals by the number of determination target terminals is defined and calculated as a "compatibility ratio". The calculated "compatibility ratio" may also be supplied to the user, for example.

In the case where all determination target terminals have "OK" as the determined result, the compatibility ratio is 1. As the number of terminals that do not have "OK" as the determined result increases, the compatibility ratio progressively decreases from 1. In other words, a value closer to 1 is a better "compatibility ratio". Which combination of a barcode scanner type and a barcode width is most favorable can be determined by comparing the values of the "compatibility ratio" that are obtained under different conditions.

TABLE 6

Determined result display example (following tables (1) to (4))
(1) List of results obtained when module width is $W_{m1}$ and barcode scanner model is XXX

| Record No. | Terminal name | Screen width $W_k$[pix] | Pixel Density $P_k$[ppi] | Determined result |
|---|---|---|---|---|
| 1 | ○○○○ | $W_{k1}$ | $P_{k1}$ | OK |
| 2 | △△△△ | $W_{k2}$ | $P_{k2}$ | OK |
| ... | ... | ... | ... | |
| n | ☐☐☐☐ | $W_{kn}$ | $P_{kn}$ | OK |

Compatibility Ratio 0.90

(2) List of results obtained when module width is $W_{m1}$ and barcode scanner model is YYY

| Record No. | Terminal name | Screen width $W_k$[pix] | Pixel Density $P_k$[ppi] | Determined result |
|---|---|---|---|---|
| 1 | ○○○○ | $W_{k1}$ | $P_{k1}$ | OK |
| 2 | △△△△ | $W_{k2}$ | $P_{k2}$ | NG |
| ... | ... | ... | ... | |
| n | ☐☐☐☐ | $W_{kn}$ | $P_{kn}$ | OK |

Compatibility Ratio 0.40

(3) List of results obtained when module width is $W_{m2}$ and barcode scanner model is XXX

| Record No. | Terminal name | Screen width $W_k$[pix] | Pixel Density $P_k$[ppi] | Determined result |
|---|---|---|---|---|
| 1 | ○○○○ | $W_{k1}$ | $P_{k1}$ | OK |
| 2 | △△△△ | $W_{k2}$ | $P_{k2}$ | NG |
| ... | ... | ... | ... | |
| n | ☐☐☐☐ | $W_{kn}$ | $P_{kn}$ | NG |

Compatibility Ratio 0.80

(4) List of results obtained when module width is $W_{m2}$ and barcode scanner model is YYY

| Record No. | Terminal name | Screen width $W_k$[pix] | Pixel Density $P_k$[ppi] | Determined result |
|---|---|---|---|---|
| 1 | ○○○○ | $W_{k1}$ | $P_{k1}$ | OK |
| 2 | △△△△ | $W_{k2}$ | $P_{k2}$ | NG |
| ... | ... | ... | ... | |
| n | ☐☐☐☐ | $W_{kn}$ | $P_{kn}$ | NG |

Compatibility Ratio 0.75

As described above with reference to FIG. 1 and other figures, the results of the determination processing may be visualized to be displayed visually. Specifically, a P-W plane with a horizontal axis representing the terminal screen density P and a vertical axis representing the terminal screen width W is created for each combination of a barcode scanner type and a barcode width. On each created P-W plane, a compatible area calculated by the determination process of Step S607, Step S609, and Step S611 is mapped. A point is further plotted for each terminal, with the pixel density as P and the screen width as W. The results of the determination processing may thus be visualized to be displayed visually.

Figure 7:
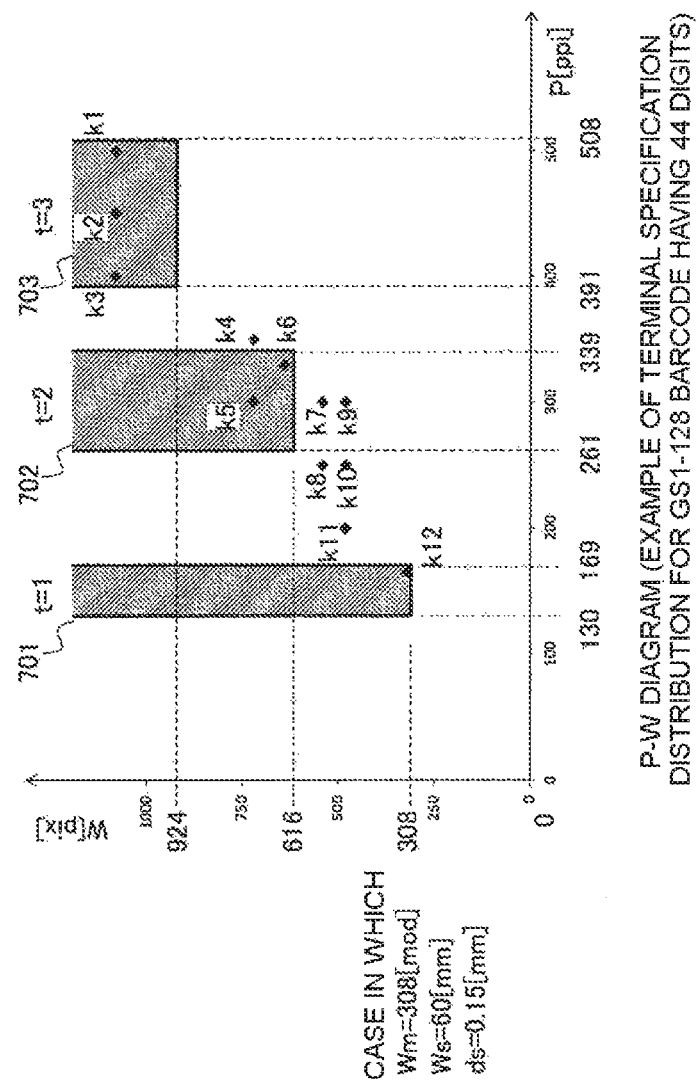
FIG. 7 is a P-W diagram for illustrating an example of the relation between a proper area and terminal screen specifications in a specific example that is described in the second example embodiment of this invention.

An example of visually displaying determined results on the P-W planes in this manner is illustrated in FIG. 7. FIG. 7 is obtained by plotting, onto the P-W plane described above, determined results that are made through processing illustrated in the flow chart of FIG. 6 for terminals k1 to k12, which have screen specifications shown in Table 7, when the module width $W_m$ is 308 mods (one type) and the barcode scanner specifications set the minimum resolution to 0.15 mm and the readable width to 60 mm (one type).

Points within areas 701, 702, and 703 of FIG. 7 (terminals corresponding to the points) are points at which the determined result is "OK" (terminals corresponding to the points). Here, six points are within the areas 701, 702, and 703, which means that six terminals have "OK" as the determined result. The "compatibility ratio", which is a value obtained by dividing 6 by the number of determination target terminals, 12, is calculated by 6/12 as 0.5.

TABLE 7

Screen specifications and presence ratio of terminal k1 to terminal k12

| Terminal | Lateral screen width [pix] | Pixel density [ppi] | Presence [ratio] |
|---|---|---|---|
| k1 | 1080 | 500 | 0.03 |
| k2 | 1080 | 450 | 0.10 |
| k3 | 1080 | 400 | 0.10 |
| k4 | 770 | 350 | 0.06 |
| k5 | 770 | 300 | 0.08 |
| k6 | 640 | 330 | 0.30 |
| k7 | 540 | 300 | 0.08 |
| k8 | 540 | 250 | 0.08 |
| k9 | 480 | 300 | 0.10 |
| k10 | 480 | 250 | 0.04 |
| k11 | 480 | 200 | 0.02 |
| k12 | 320 | 165 | 0.01 |
| | | Total | 1 |

In the case where the "presence ratio (or utilization ratio)", which indicates, for each terminal type planned to be used, the proportion of the quantity of terminals that belong to the terminal type to the quantity of all terminals planned to be used, is known, the presence ratio information can additionally be taken into account. Specifically, an "effective compatibility ratio" can be calculated by adding up the respective presence ratios (or utilization ratios) of terminal types that are determined as "OK". The calculated "effective compatibility ratio" may be output to the user, for example.

The concept of the "effective compatibility ratio" will be described. When a situation where a barcode is actually displayed on a terminal and read with a barcode scanner is imagined, a terminal type to which many terminals present (or many terminals in operation) belong is more likely to be used than a terminal type to which only a few terminals present (or only a few terminals in operation) belong.

It is therefore considered that a failure to display and read a barcode may occur in many situations when many terminal types are determined as "OK" but each have a presence ratio (or utilization ratio) that is very low. On the other hand, displaying and reading a barcode may succeed in many situations when only a few terminal types are determined as "OK" but each have a presence ratio (or utilization ratio) that is very high.

In short, there may be cases where an appropriate evaluation cannot be made from the "compatibility ratio" alone when the presence ratio (or utilization ratio) varies significantly from one terminal type to another.

For that reason, the "effective compatibility ratio", which takes into account the presence ratio (or utilization ratio) of a terminal type is calculated in addition to the compatibility ratio, by adding up the respective presence ratios (or utilization ratios) of terminal types that are determined as "OK". The "effective compatibility ratio" is high when a terminal type to which many terminals present (or many terminals in operation) belong is determined as "OK" than when a terminal type to which only a few terminals present (or only a few terminals in operation) belong is determined as "OK".

In this way, barcodes that are similar to each other in the value of the "compatibility ratio" can be evaluated from another aspect that takes into account the presence ratio (or utilization ratio) of each terminal type.

Determined results that are made for terminal types having the screen specifications of Table 7 when the barcode scanner specifications and the barcode width are as described above (the minimum resolution is 0.15 mm, the readable width is 60 mm, and the module width $W_m$ is 308 mods) are shown in Table 8, which also includes the effective compatibility ratio calculated from the determined results.

In this example, a value obtained by adding up the respective presence ratios of terminal types that are determined as OK is 0.62, and the effective compatibility ratio is therefore 0.62.

TABLE 8

Calculation of effective compatibility ratio

| Terminal | Lateral screen width [pix] | Pixel density [ppi] | Presence ratio | Determination 1:OK 0:NG | Presence ratio × determination |
|---|---|---|---|---|---|
| k1 | 1080 | 500 | 0.03 | 1 | 0.03 |
| k2 | 1080 | 450 | 0.10 | 1 | 0.10 |
| k3 | 1080 | 400 | 0.10 | 1 | 0.10 |
| k4 | 720 | 350 | 0.06 | 0 | 0 |
| k5 | 720 | 300 | 0.08 | 1 | 0.08 |
| k6 | 640 | 330 | 0.30 | 1 | 0.30 |
| k7 | 540 | 300 | 0.08 | 0 | 0 |
| k8 | 540 | 250 | 0.08 | 0 | 0 |
| k9 | 480 | 300 | 0.10 | 0 | 0 |
| k10 | 480 | 250 | 0.04 | 0 | 0 |
| k11 | 480 | 200 | 0.02 | 0 | 0 |
| k12 | 320 | 165 | 0.01 | 1 | 0.01 |
| | | Total | 1 | 6 | Effective compatibility ratio 0.62 |
| | | | Compatibility ratio | 6/12 = 0.5 | |

After the results are displayed in Step S622, the evaluation device 10 proceeds to Step S623, where the processing is ended. In the case where new pieces of data are registered in the barcode information database 12-1, the barcode scanner information database 12-2, and the terminal information database 12-3, which are reference source data (in the case where one or all of Step S601 to Step S603 are executed again), different determined results are yielded. When this is the case, referring to the reference source databases, determining suitability/unsuitability, and producing determined results may be repeated (Step S604 to Step S623 may be executed again) in order to make determination based on data that includes the new data.

According to the second example embodiment described above, whether a barcode can be displayed on a terminal screen and is readable with a barcode scanner can be determined for a plurality of barcodes, a plurality of barcode scanners, and a plurality of terminals.

Another effect of the second example embodiment, where the compatibility ratio and the effective compatibility ratio can be calculated, is that a comprehensive evaluation can be made.

For reference, mathematical expressions for identifying the areas of FIG. 7 are written below.

REFERENCE

Values calculated when the module width $W_m$ is 308 mods, and the barcode scanner specifications set the minimum resolution $d_s$ to 0.15 mm and the readable width $W_s$ to 60 mm $$P \geq t \cdot P_1 (P_1 = 25.4 \cdot W_m / W_s)$$

$$P \geq t \cdot 25.4 \times 308/60 \qquad \text{Expression(A')}$$

$$P \geq 130.387 \cdot t (P_1 = 130.387) \qquad \text{(a)}$$

$$P \leq t \cdot P_h (P_h = 25.4 d_s)$$

$$P \leq t \cdot 25.4/0.15 \qquad \text{Expression(B')}$$

$$P \leq 169.333 \cdot t (P_1 = 169.333) \qquad \text{(b)}$$

$$W \geq t \cdot W_m \qquad \text{Expression (C)}$$

$$W \geq 308 \cdot t \qquad \text{(c)}$$

An area where Expressions (a), (b), and (c) are satisfied simultaneously when t is 1 is the area 701 of FIG. 7. An area where Expressions (a), (b), and (c) are satisfied simultaneously when t is 2 is the area 702 of FIG. 7. An area where Expressions (a), (b), and (c) are satisfied simultaneously when t is 3 is the area 703 of FIG. 7.

Third Example Embodiment

The third example embodiment will be described next. The third example embodiment relates to an evaluation device configured to determine, when a particular barcode scanner and a plurality of terminals are expected to be used, an optimum module width of a barcode (or an optimum number of digits of encoded information of a barcode) at which the barcode can be displayed on the terminals and is readable with the particular barcode scanner.

The third example embodiment is effective as a measure for attaining an object to set the width of a barcode symbol (the number of digits of encoded information of a barcode) as large as possible within a range where the barcode can be displayed on a terminal and is readable with a barcode scanner.

The evaluation device 10 in the third example embodiment has the same configuration as that of the first example embodiment and the second example embodiment which are described with reference to FIG. 3, and hence a repetitive description is omitted.

Processing for determining the module width of a barcode at which the barcode is readable at least with a certain barcode scanner having certain barcode scanner specifications is described with reference to a flow chart of FIG. 8.

In later processing, a module width necessary to configure the barcode is required to be calculated from the number of digits of encoded information of the barcode. To ensure that the calculation can be performed, the evaluation device 10 first receives input of a barcode type and supplementary information, which are information necessary to calculate the module width (Step S801). The barcode type is, for example, Code 128 or CODABAR. The supplementary information is, for example, Code Set C in the case of Code 128, and the NW ratio and the character-to-character gap in the case of CODABAR. A specific calculation expression of the module width $W_m$ varies depending on the barcode type, which is identified by the code type, and on barcode configuration conditions, as described above with reference to Table 1.

In Step S802, information on the barcode scanner to be examined is received. Specifically, the evaluation device 10 receives input of information for identifying the barcode scanner (e.g., the name of the barcode scanner), and the minimum resolution $d_s$ mm and the maximum readable width $W_s$ mm, which are "the specifications of the barcode expected to be used".

The received pieces of information are stored in the barcode scanner information database 12-2, and the evaluation device 10 proceeds to Step S803. The barcode information database 12-1 and the barcode scanner information database 12-2 in the third example embodiment are equivalent to the barcode information database 12-1 and the barcode scanner information database 12-2 in the second example embodiment, respectively, and are implemented by one of the storage devices included in the group of storage devices 12 of the evaluation device 10.

Instead of supplying the information in Step S802, which is executed in this processing, some of or all of the pieces of information to be supplied may be recorded in advance in the barcode scanner information database 12-2. The evaluation device 10 may further include a communication unit configured to perform data communication over a network. Some of or all of pieces of information stored in the barcode scanner information database 12-2 may be obtained from an external device through data communication via the communication unit.

In Step S803, a maximum value $W_b$ of the module width of the barcode to be examined is calculated based on the specification information of the barcode scanner.

Specifically, $W_b$ is the maximum value of $W_m$ which fulfills at least a condition for avoiding the determination that the barcode scanner specifications and the barcode width are "unsuitable irrespective of the specifications of the terminal". The condition is expressed as follows:

[Math. 62]

$$W_m \leq \frac{W_s}{d_s} \qquad \text{Expression (D)}$$

In other words, the maximum value $W_b$ of the barcode module width can be calculated by the following expression:

[Math. 63]

$$W_b = \frac{W_s}{d_s}$$

The value $W_b$ is the maximum value of the module width of the barcode to be examined.

For example, $W_b$ in the case where the readable width $W_s$ of the barcode scanner is 60 mm and the minimum resolution $d_s$ of the barcode scanner is 0.15 mm is calculated by the expression given above as follows:

[Math. 64]

$$W_b = \frac{60}{0.15} = 400$$

The value $W_b$ is thus calculated as 400.

In Step S804, a minimum value $W_a$ of the module width of the barcode to be examined is calculated from the specification information of the barcode scanner. Specifically, the concept of the calculation is as follows.

An area where the barcode is compatible can be mapped on a P-W plane based on the barcode module width and the barcode scanner specifications as illustrated in FIG. 1. In the case where the screen specifications of a terminal fall in, for example, a gap area between the right edge of the area 101 ($P=P_h$), which is a compatible area when the per-module constituent dot count t is 1, and the left edge of the area 102 ($P=2P_1$), which is a compatible area when t is 2, the derived result is that "the barcode and the barcode scanner are incompatible with the current terminal". Therefore, the gap between the right edge of the area 101 ($P=P_h$), which is a compatible area when t is 1, and the left edge of the area 102 ($P=2P_1$), which is a compatible area when t is 2, are taken into consideration. Ideally, the "compatible range" can be expanded when the gap is 0 or less. The gap is specifically calculated as follows.

A gap width g of the gap that is observed between the left compatible area and the right compatible area when the per-module dot count is t dots/mod is expressed as follows:

$$g=(t+1) \cdot P_1 - t \cdot P_h$$

From Expression (A') and Expression (B') described as a premise of the description of the example embodiments, the following expressions are obtained:

[Math. 65]

$$P_l = \frac{25.4 \cdot W_m}{W_s}$$

[Math. 66]

$$P_h = \frac{25.4}{d_s}$$

[Math. 67]

$$g = \frac{25.4 \cdot W_m}{W_s}(t+1) - \frac{25.4}{d_s} t$$

The value g is accordingly calculated by the expression of [Math. 67].

When the gap g is 0 or less, g<0 is expressed as follows:

[Math. 68]

$$\frac{25.4 \cdot W_m}{W_s}(t+1) - \frac{25.4}{d_s} t \leq 0$$

The expression of [Math. 68] is solved for $W_m$ to obtain the following expression:

[Math. 69]

$$W_m \leq \frac{t}{t+1} \cdot \frac{W_s}{d_s}$$

The gap between the proper area when t is 1 and the proper area when t is 2 is taken into consideration by substituting t with 1.

[Math. 70]

$$W_m \leq \frac{1}{2} \cdot \frac{W_s}{d_s} \qquad \text{Expression (E)}$$

The maximum value of $W_m$, which satisfies this equation, is $W_a$.

In other words, the minimum value $W_a$ of the barcode module width can be calculated by the expression of [Math. 71].

[Math. 71]

$$W_a = \frac{1}{2} \cdot \frac{W_s}{d_s}$$

The value $W_a$ is a maximum value at which the width of the "gap" described above is 0 or less and, as $W_m$ increases from the value $W_a$, "incompatible" terminals increase in number.

For example, $W_b$ in the case where the readable width $W_s$ of the barcode scanner is 60 mm and the minimum resolution $d_s$ of the barcode scanner is 0.15 mm is calculated by the expression given above as follows:

[Math. 72]

$$W_a \leq \frac{1}{2} \cdot \frac{60}{0.15} = 200$$

The value $W_a$ is thus calculated as 200.

The value $W_a$ calculated in Step S803 and the value $W_b$ calculated in Step S804 are used in the following expression:

$$W_a \leq W \leq W_b \qquad \text{[Math. 73]}$$

The barcode module width W that is within the range of [Math. 73] is determined as an examination target (Step S805).

In the case where the readable width $W_s$ of the barcode scanner is 60 mm and the minimum resolution $d_s$ of the barcode scanner is 0.15 mm, for example, $W_b$ is calculated, as described above, as 400 by the expression of [Math. 74] based on Expression (D).

[Math. 74]
$$W_b = \frac{60}{0.15} = 400$$

The value $W_a$ in this case is calculated as 200 by the expression of [Math. 75] based on Expression (E).

[Math. 75]
$$W_a \leq \frac{1}{2} \cdot \frac{60}{0.15} = 200$$

$$200 \leq W \leq 400 \quad \text{[Math. 76]}$$

The barcode module width W that is within the range of the expression of [Math. 76] is verified.

At this time, an expression for calculating the total module width W of the barcode with respect to a digit count n (an integer) is obtained by referring to a barcode type-based calculation expression storage unit 12-5. The expression for calculating the total module width W of the barcode with respect to the digit count n (an integer) varies depending on the code type information and the supplementary information. The obtained expression is therefore an expression associated with the code type information and the supplementary information that are supplied in Step S801. The barcode type-based calculation expression storage unit 12-5 is a portion configured to store, for each of various pieces of code type information and supplementary information, an expression for calculating the total module width W of a barcode with respect to the digit count n (an integer) that is associated with the piece of code type information and the piece of supplementary information. Specifically, the barcode type-based calculation expression storage unit 12-5 stores expressions such as the ones shown in Table 1. The barcode type-based calculation expression storage unit 12-5 is implemented by a storage device included in the group of storage devices 12 of the evaluation device 10.

The obtained expression is then used to obtain a maximum digit count $n_a$ at which the barcode module width W does not exceed $W_a$ and a maximum digit count $n_b$ at which the barcode module width W does not exceed $W_b$. In short, the barcode module width W to be obtained is within a range of the number of digits of encoded information of the barcode between the $n_a$ digits and $n_b$ digits.

For example, when the readable width $W_s$ of the barcode scanner is 60 mm, the minimum resolution $d_s$ of the barcode scanner is 0.15 mm, and the barcode type information of the target barcode and the supplementary information indicate Code Set C of GS1-128 (EAN-128). W=11n/2+66 is calculated by the calculation expression of Table 1.

Expressions $W_a = 11n_a/2+66$ and $W_b = 11n_b/2+66$ are solved for $n_a$ and $n_b$, respectively.

As a result, $n_a$ is obtained as an integer that does not exceed 24.36 (an even number because Code Set C applies) and accordingly indicates 24 digits, and $n_b$ is obtained as an integer that does not exceed 60.73 (an even number because Code Set C applies) and accordingly indicates 60 digits. The digit count range of the barcode to be examined is thus determined as a range between 24 digits and 60 digits.

In Step S806, the barcode module width is calculated within the digit count range of the barcode to be examined which is determined in Step S805, that is, the range between $n_a$ digits and $n_b$ digits. The calculation uses the expression obtained from the barcode type-based calculation expression storage unit 12-5 as described above.

The calculated barcode module width that corresponds to each digit count of from $n_a$ digits to $n_b$ digits is stored in the barcode information database 12-1. As described above, the barcode information database 12-1 in the third example embodiment is equivalent to the barcode information database 12-1 in the second example embodiment, and is implemented by one of the storage devices included in the group of storage devices 12 of the evaluation device 10.

For example, when the readable width $W_s$ of the barcode scanner is 60 mm, the minimum resolution $d_s$ of the barcode scanner is 0.15 mm, and the barcode type information of the target barcode is Code Set C of GS1-128 (EAN-128), digit counts to be examined are 24 digits to 60 digits (even-number digits). From the digit counts, barcode widths are calculated as shown in Table 9, which yields nineteen types of barcodes that are expected to be used. Pieces of information on the barcodes are recorded in the "barcode information database 12-1" in Step S806 of FIG. 8.

TABLE 9

Digit counts and barcode module widths in Code Set C of GS1-128

| No | Digit count n | Module width W |
|---|---|---|
| 1 | 24 | 198 |
| 2 | 26 | 209 |
| 3 | 28 | 220 |
| ... | | |
| 17 | 56 | 374 |
| 18 | 58 | 385 |
| 19 | 60 | 396 |

In Step S807, Step S603 of FIG. 6 is called in order to utilize the processing illustrated in the flow chart of FIG. 6, which is used in the second example embodiment. Step S603 and subsequent steps of the processing illustrated in the flow chart of FIG. 6 are then executed to conduct evaluation processing through a method similar to the one in the second example embodiment, by supplying expected terminal specification information.

The barcode scanner specification information used at this point is information that is supplied in Step S802 and stored in the barcode scanner information database 12-2. The barcode module width information used here is information stored in the barcode information database 12-1 in Step S806.

Figure 8:
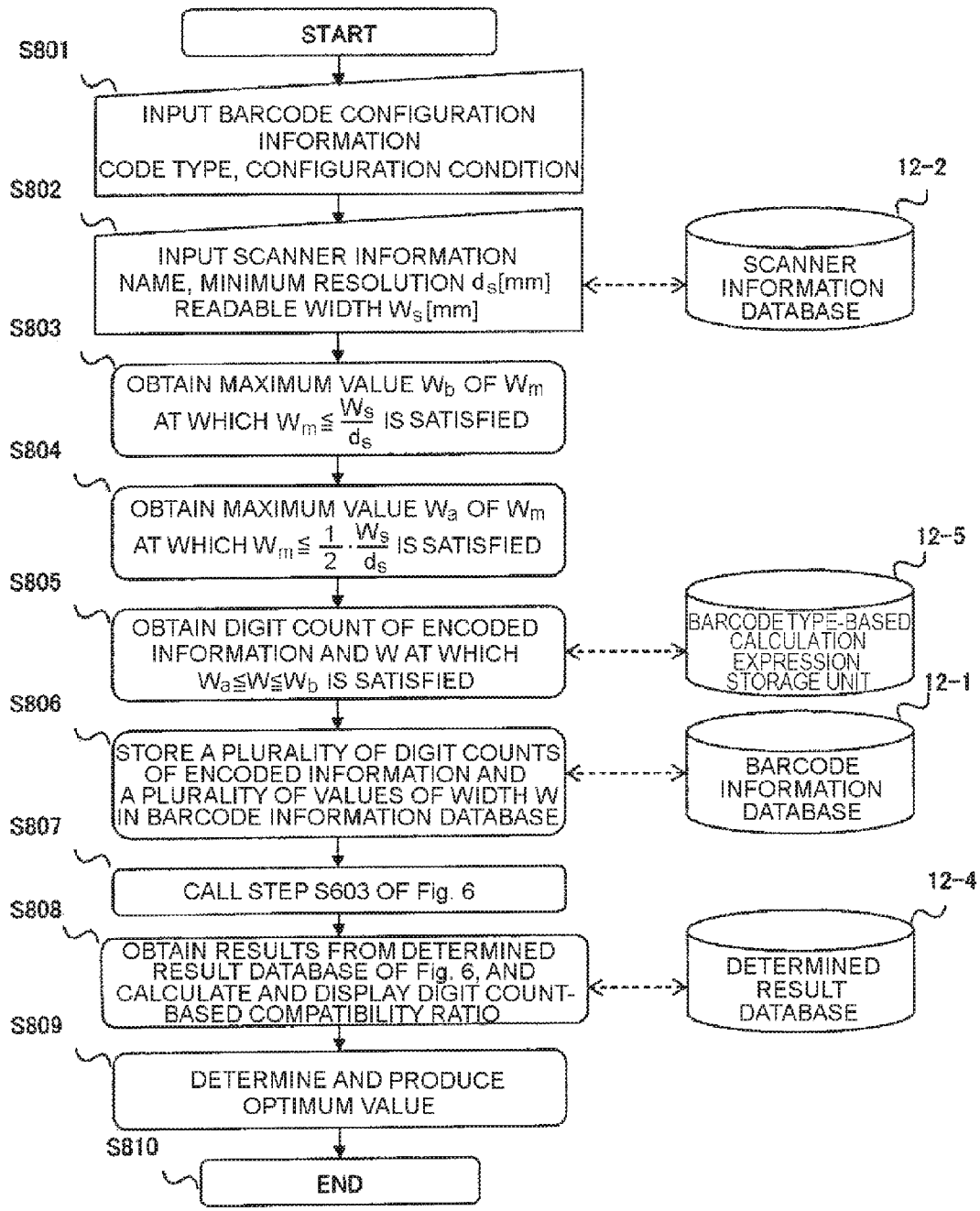
FIG. 8 is a flow chart for illustrating basic operation in a third example embodiment of this invention.

After the processing illustrated in the flow chart of FIG. 6 is executed and determined results are obtained, the evaluation device 10 returns to Step S808 of FIG. 8 to analyze the results. Similarly to the second example embodiment, the compatibility ratio is calculated for each barcode module width from the processed results illustrated in the flow chart of FIG. 6, and the calculated result is displayed on the display device 21.

An example is discussed in which the readable width $W_s$ of the barcode scanner is 60 mm, the minimum resolution $d_s$ of the barcode scanner is 0.15 mm, and the barcode type information of the target barcode and the supplementary information indicate Code Set C of GS1-128 (EAN-128). Further, the digit counts to be examined are 24 digits to 60 digits (even-number digits). The specifications of terminals expected to be used to display the barcode are the specifications of the terminal k1 to terminal k12 of Table 7. The verified results in this case are as shown in Table 10.

Figure 9:
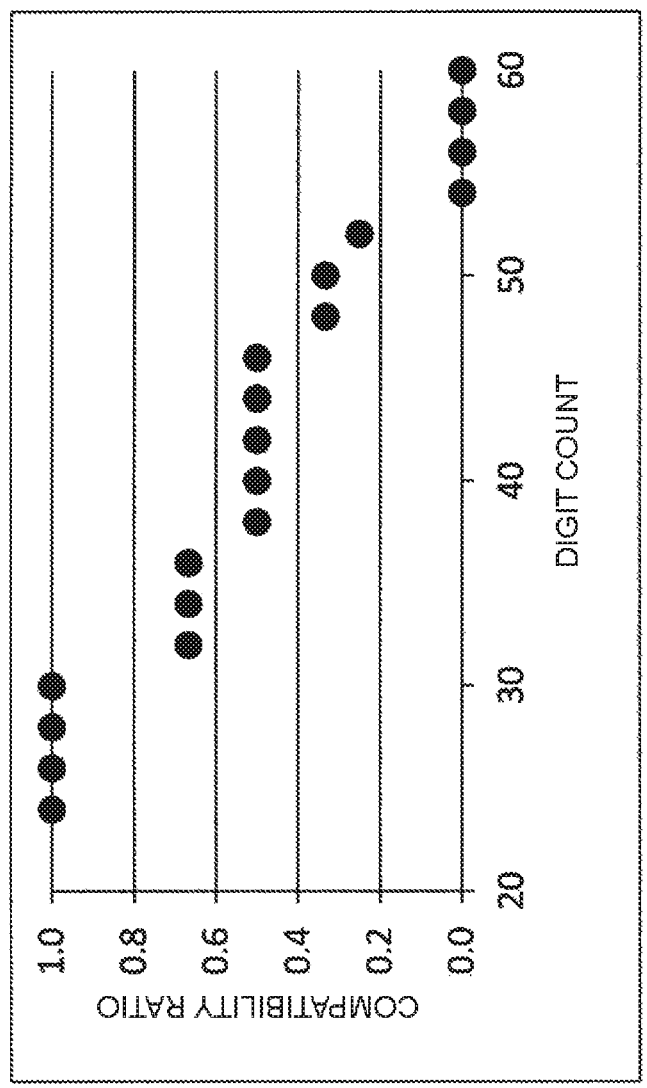
FIG. 9 is a graph of a specific example in the third example embodiment of this invention, with a horizontal axis representing the number of digits and a vertical axis representing a compatibility ratio.

FIG. 9 is a graph of this example, with the horizontal axis representing the digit count and the vertical axis representing the compatibility ratio.

TABLE 10

Digit count-based compatibility ratio in Code Set C of GS1-128

| | Digital count n | Module width W | Compatibility ratio |
|---|---|---|---|
| 1 | 24 | 198 | 1.00 |
| 2 | 26 | 209 | 1.00 |
| 3 | 28 | 220 | 1.00 |
| 4 | 30 | 231 | 1.00 |
| 5 | 32 | 242 | 0.67 |
| 6 | 34 | 253 | 0.67 |
| 7 | 36 | 264 | 0.67 |
| 8 | 38 | 275 | 0.50 |
| 9 | 40 | 286 | 0.50 |
| 10 | 42 | 297 | 0.50 |
| 11 | 44 | 308 | 0.50 |
| 12 | 46 | 319 | 0.42 |
| 13 | 48 | 330 | 0.25 |
| 14 | 50 | 341 | 0.25 |
| 15 | 52 | 352 | 0.25 |
| 16 | 54 | 363 | 0.00 |
| 17 | 56 | 374 | 0.00 |
| 18 | 58 | 385 | 0.00 |
| 19 | 60 | 396 | 0.00 |

The evaluation device 10 then proceeds to Step S809 to derive an optimum value from the relation between the number of digits of encoded information of a barcode and the compatibility ratio, which are revealed in Step S808. Specifically, the optimum value is determined by searching for a condition that yields the highest compatibility ratio. In the case where the highest compatibility ratio is obtained under a plurality of conditions, the optimum value is determined by searching for a condition that has the highest digit count.

In the examples of Table 10 and FIG. 9 described above, out of conditions that yield the highest compatibility ratio, 1.0, a condition that has the highest digit count is one where the digit count is 30 digits. The optimum value in this case is a condition in which the digit count is 30 digits and the barcode module width is 231 mods.

After the optimum condition for the barcode is determined in this manner and the result is produced in Step S809, the processing is ended in Step S810.

Figure 10:
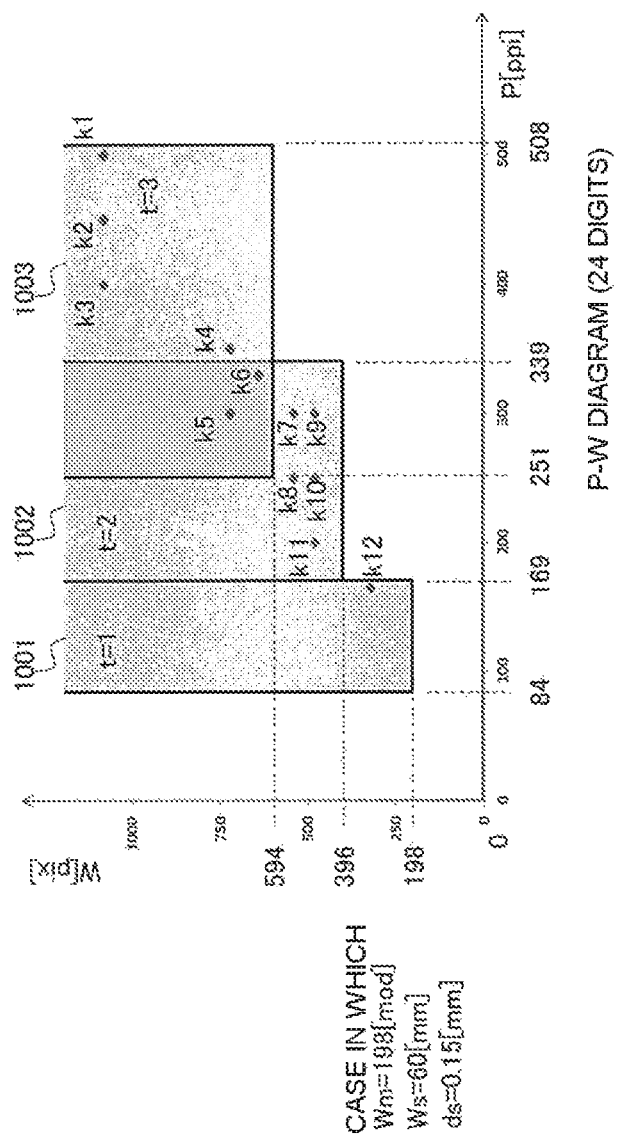
FIG. 10 is a P-W diagram (1/2) for illustrating an example of the relation between a proper area and terminal screen specifications in the specific example that is described in the third example embodiment of this invention.
Figure 11:
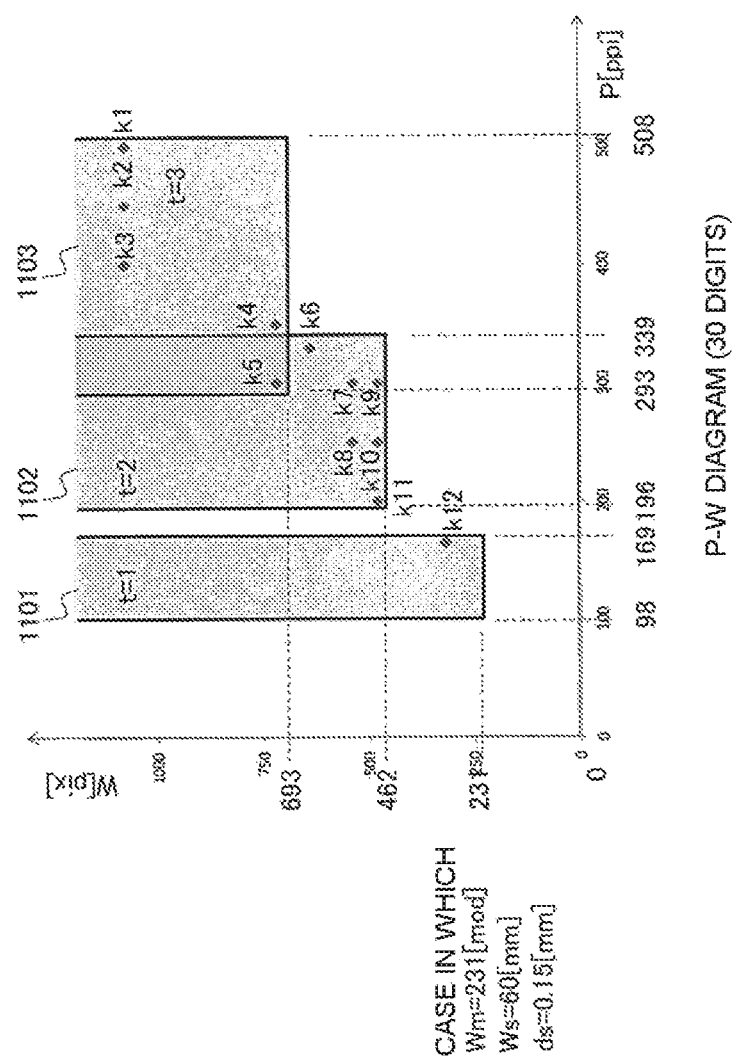
FIG. 11 is a P-W diagram (2/2) for illustrating an example of the relation between a proper area and terminal screen specifications in the specific example that is described in the third example embodiment of this invention.

FIG. 10 and FIG. 11 are P-W diagrams that indicate terminals and compatible ranges in the example where the readable width $W_s$ of the barcode scanner is 60 mm, the minimum resolution $d_s$ of the barcode scanner is 0.15 mm, the barcode type of the target barcode and the supplementary information indicate Code Set C of GS1-128 (EAN-128), and terminals expected to be used to display the barcode are the terminal k1 to terminal k12 of Table 7. Specifically, FIG. 10 is a P-W diagram that indicates terminals and compatible ranges in this example when the barcode has 24 digits, which is the smallest digit count to be examined. FIG. 11 is a P-W diagram that indicates terminals and compatible ranges in this example when the barcode has 30 digits, which is determined as the optimum digit count.

When the barcode has 30 digits, areas where the terminal specifications are compatible (an area 1101, an area 1102, and an area 1103) are smaller in dimensions than when the barcode has 24 digits, but all points representing the expected terminal specifications are contained inside "compatible areas".

In this case, "24 digits" is a digit count derived so that the ranges of compatible areas calculated from the barcode scanner specifications and the barcode module width without considering the terminal specifications, namely, the borders of a compatible area when t is 1 (an area 1001 of FIG. 10) and a compatible area when t is 2 (an area 1002 of FIG. 10), are in close contact with each other. On the other hand, "30 digits" is the highest digit count possible when the terminal specifications are further taken into consideration, that is, a digit count derived so that points representing the terminal specifications in FIG. 11 are inside the area 1101 of FIG. 11 and the area 1102 of FIG. 11.

In the case of the thus derived "30 digits", the terminal k11 is located in FIG. 11 at the left edge of the compatible area when t is 2 (the area 1102 of FIG. 11). The terminal k12 is located at the right edge of the compatible area of when t is 1 (the area 1101 of FIG. 11). This indicates that, by taking the terminal specifications into account, a barcode having six more digits than "24 digits", which is derived only from the barcode scanner specifications and the barcode module width, can be configured while "maintaining the compatibility ratio".

Referring to FIG. 7 in which the condition is the same as in FIG. 11 and the digit count is 44 digits ($W_m$=308 mods), six terminal types (k4, k7, k8, k9, k10, and k11) out of twelve terminal types are outside the "compatible areas" under this condition, and the compatibility ratio is accordingly lower (the compatibility ratio under this condition is 0.5).

The third example embodiment may be implemented as a stand-alone device that includes the functions of the third example embodiment, or as one of functions of a device that includes the functions of the first example embodiment or the second example embodiment. In short, the third example embodiment may be combined with the first example embodiment or the second example embodiment.

In cases other than the case where the third example embodiment is combined with the second example embodiment, namely, in the case where the third example embodiment is implemented as a stand-alone device or combined with the first example embodiment, the processing of Step S603 of FIG. 6 is executed based on, for example, a program that is installed in the device to accomplish processing equivalent to Step S807, instead of calling the processing of Step S603 and subsequent steps of FIG. 6 in Step S807.

According to the third example embodiment described above, an optimum value for the digit count can be determined while taking the compatibility ratio into consideration. The resultant effect is that a barcode can have as wide a barcode symbol width as possible (as high a digit count of encoded information as possible) within a range where the barcode can be displayed on a terminal and is readable with a barcode scanner.

Fourth Example Embodiment

The fourth example embodiment will be described next. The fourth example embodiment relates to a barcode scanner specification identifying device configured to determine, when a barcode having a particular module width is displayable on a plurality of terminals expected to be used to display the barcode, the specifications of a barcode scanner with which the barcode can be read.

The fourth example embodiment is effective as a measure for attaining an object to find out, when a barcode having a particular module width is displayable on a plurality of terminals expected to be used to display the barcode, what barcode scanner specifications are required to read the barcode.

A barcode scanner specification identifying device 10' according to the fourth example embodiment includes a CPU 11', a group of storage devices 12', an image output unit 13', and an I/O 14'. The components included in the barcode scanner specification identifying device 10' are connected to one another via a bus line 15', which is provided in the barcode scanner specification identifying device 10'. The display device 21 is connected to the image output unit 13', and the input device 22 is connected to the I/O 14'. The configuration of the barcode scanner specification identifying device 10' is not shown but is the same as the configuration of the evaluation device 10 of FIG. 3. The CPU 11', the group of storage devices 12', the image output unit 13', the I/O 14', and the bus line 15' in the barcode scanner specification identifying device 10' correspond to the CPU 11, the group of storage devices 12, the image output unit 13, the I/O 14, and the bus line 15, respectively, in the evaluation device 10.

The functions of the components of the barcode scanner specification identifying device 10' are the same as the functions of the components having the same names that are included in the evaluation device 10 of the first example embodiment, the second example embodiment, and the third example embodiment, which is described with reference to FIG. 3. A repetitive description is therefore omitted.

A description will be given next with reference to a flow chart of FIG. 12 on processing for determining suitable barcode scanner specifications (minimum resolution and readable width) from a predetermined module width of a barcode and from a plurality of terminals expected to be used to display the barcode.

In Step S1201, input of information for identifying a "barcode having a predetermined module width" (e.g., the name of the barcode) and the module width $W_m$ is received first. The received pieces of information are stored in the barcode information database 12-1, and the barcode scanner specification identifying device 10' proceeds to Step S1202. The barcode information database 12-1 and the terminal information database 12-3 in the fourth example embodiment are equivalent to the barcode information database 12-1 and the terminal information database 12-3 in the second example embodiment and the third example embodiment, and are implemented by one of the storage devices included in the group of storage devices 12' of the barcode scanner specification identifying device 10'.

Next, input of information on terminals expected to be used, specifically, information for identifying the terminals (e.g., the names of the terminals) and the screen width $W_k$ pix and pixel density $P_k$ ppi of each terminal, is received in Step S1202. The received pieces of information are stored in the terminal information database 12-3, and the barcode scanner specification identifying device 10' proceeds to Step S1203. The input in one of or both of Step S1201 and Step S1202 may be received in advance so that the pieces of information are recorded in the respective databases in advance. The barcode scanner specification identifying device 10' may further include a communication unit configured to perform data communication over a network. Some of or all of pieces of information stored in the databases may be obtained from an external device through data communication via the communication unit.

In Step S1203, the terminal information database 12-3 is searched to retrieve a maximum value $W_{kmax}$ of the terminal screen width. The maximum value $W_{kmax}$ is used to obtain a maximum value $t_{max}$ of an integer t that satisfies, with respect to the predetermined module width $W_m$ of the barcode, the following expression:

[Math. 77]

$$t \leq \frac{W_{kmax}}{W_m}$$

The value $t_{max}$ is used in later processing. The barcode scanner specification identifying device 10' next proceeds to Step S1204.

In the case where the barcode module width $W_m$ is 308 mods and the terminal k1 to terminal k12 of Table 7 are used, for example, the maximum value $W_{kmax}$ of the terminal screen width is 1,080 pix, which is the screen width of the terminal k1.

[Math. 78]

$$t \leq \frac{W_{kmax}}{W_m}$$

$$t \leq 1080/308 \quad \text{[Math. 79]}$$

The maximum value $t_{max}$ of the integer t that satisfies the expression of [Math. 78], namely, the expression of [Math. 79], is therefore determined as 3.

A specific analysis is started in Step S1204. In Step S1204, t is provided as a repeat parameter, and is set to 1. The barcode scanner specification identifying device 10' then proceeds to Step S1205.

In Step S1205, a terminal that satisfies $tW_m \leq W_k \leq (t+1)W_m$ with respect to the terminal screen width $W_k$ is extracted from the terminal information database 12-3. The barcode scanner specification identifying device 10' then proceeds to Step S1206.

For example, when the barcode module width $W_m$ is 308 mods, the terminals used are k1 to k12 of Table 7, and t is 1, a "terminal that satisfies $tW_m \leq W_k \leq (t+1)W_m$", which is a terminal to be extracted in Step S1205, is a terminal that satisfies $308 \leq W_k \leq 616$. Specifically, six types of terminals, namely, the terminal k7 to the terminal k12, qualify.

In Step S1206, the smallest value of the pixel density $P_k$ among pixel density values of the terminals extracted in Step S1205 is searched for and set as $P_{ka}$. The barcode scanner specification identifying device 10' then proceeds to Step S1207.

In Step S1207, the largest value of the pixel density $P_k$ among pixel density values of the terminals extracted in Step S1205 is searched for and set as $P_{kb}$. The barcode scanner specification identifying device 10' then proceeds to Step S1208.

For example, when the barcode module width $W_m$ is 308 mods, the terminals used are k1 to k12 of Table 7, and t is 1, the pixel density $P_k$ is checked for the six types of terminals extracted in Step S1205, namely, the terminal k7 to the terminal k12.

It is found out as a result that the smallest value of the pixel density is 165 ppi ($\rightarrow P_{ka}$), which is the pixel density of the terminal k12, and that the largest value of the pixel density is 300 ppi ($\rightarrow P_{kb}$), which is the pixel density of the terminal k7.

In Step S1208, the smallest pixel density value Pb retrieved in Step S1206 is used in the following expression:

[Math. 80]

$$P \geq t \cdot P_l \left( \text{where } P_l = \frac{25.4 \cdot W_m}{W_s} \right) \quad \text{Expression (A')}$$

The readable width $W_s$ of a barcode scanner at the constituent dot count t of the minimum module width when P is $P_{ka}$ is given as $W_{st}$. The expression of [Math. 80] is solved for $W_{st}$ as follows:

[Math. 81]

$$W_s \geq \frac{25.4 \cdot W_m \cdot t}{P_{ka}}$$

The minimum value $W_{st}$ of $W_s$ in this case is obtained by the following expression:

[Math. 82]

$$W_{st} = \frac{25.4 \cdot W_m \cdot t}{P_{ka}}$$

When t is 1, $W_{st}$ is written as $W_1$.

In Step S1209, the largest pixel density value $P_{kb}$ retrieved in Step S1207 is used in the following expression:

[Math. 83]

$$P \leq t \cdot P_h \left( \text{where } P_h = \frac{25.4}{d_s} \right) \quad \text{Expression (B')}$$

The minimum resolution $d_s$ of the barcode scanner at the constituent dot count t of the minimum module width when P is $P_{kb}$ is given as $d_{st}$. The expression of [Math. 83] is solved for $d_{st}$ as follows:

[Math. 84]

$$d_s \leq \frac{25.4 \cdot t}{P_{kb}}$$

The maximum value $d_{st}$ of $d_s$ in this case is obtained by the following expression:

[Math. 85]

$$d_{st} = \frac{25.4 \cdot t}{P_{kb}}$$

When t is 1, $d_{st}$ is written as $d_{s1}$.

For example, when the barcode module width $W_m$ is 308 mods, the terminals used are k1 to k12 of Table 7, and t is 1, the minimum pixel density among the six types of terminals extracted in Step S1205, namely, the terminal k7 to the terminal k12, is 165 ppi (→$P_{ka}$), which is the pixel density of k12, and the maximum pixel density among the extracted terminals is 300 ppi (→$P_{kb}$), which is the pixel density of k7.

[Math. 86]

$$W_s \geq \frac{25.4 \cdot W_m \cdot t}{P_{ka}}$$

The smallest value $W_{s1}$ of $W_s$ is therefore calculated by 25.4×308/165 as 47.4 mm by using the expression of [Math. 86].

$$W_s \geq \frac{25.4 \cdot W_m \cdot t}{P_{ka}}$$

[Math. 87]

$$d_s \leq \frac{25.4 \cdot t}{P_{kb}}$$

The largest value $d_{s1}$ of $d_s$ is calculated by 25.4/300 as 0.0847 mm by using the expression of [Math. 87].

The barcode scanner specification identifying device 10' proceeds to Step S1210, where $W_{st}$ and $d_{st}$ calculated in Step S1208 and Step S1209, respectively, are recorded in a calculated result recording database 12-6 along with the value of t. The barcode scanner specification identifying device 10' then proceeds to Step S1211. The calculated result recording database 12-6 is a database configured to store calculated results in the fourth example embodiment, and is implemented by one of the storage devices included in the group of storage devices 12' of the barcode scanner specification identifying device 10'.

In Step S1211, whether or not the current value of t is equal to or more than $t_{max}$ calculated in Step S1203 is determined.

When the current value of t is less than $t_{max}$ ("No" in Step S1211), the barcode scanner specification identifying device 10' proceeds to Step S1212, where 1 is added to the current value of t to use the result as a new value of t. The barcode scanner specification identifying device 10' returns to Step S1205 to execute Step S1205 to Step S1210 again with the use of the new value of t.

When the current value of t is equal to or more than $t_{max}$ ("Yes" in Step S1211), on the other hand, the barcode scanner specification identifying device 10' proceeds to Step S1213.

In Step S1213, the calculated result recording database 12-6 is referred to in order to retrieve the largest value out of the values of $W_{st}$ ($W_{s1}$, $W_{s2}$ . . . ) that are calculated when t is 1 to $t_{max}$.

In Step S1214, the calculated result recording database 12-6 is referred to in order to retrieve the smallest value out of the values of $d_{st}$ ($d_{s1}$, $d_{s2}$ . . . ) that are calculated when t is 1 to $t_{max}$.

In Step S1215, the value of $W_{st}$ retrieved in Step S1213 and the value of $d_{st}$ retrieved in Step S1214 are displayed on the display device 21. The values displayed at this point indicate "ideal barcode scanner specifications (the readable width: the largest value of $W_{st}$, the minimum resolution: the smallest value of $d_{st}$) when a barcode has a predetermined module width $W_m$ and a plurality of terminals (the screen width $W_k$, the pixel density $P_k$) are expected to be used to display the barcode".

After the value of $W_{st}$ and the value of $d_{st}$ are displayed on the display device 21 in Step S1215, the barcode scanner specification identifying device 10' proceeds to Step S1216, where the processing is ended.

Figure 12:
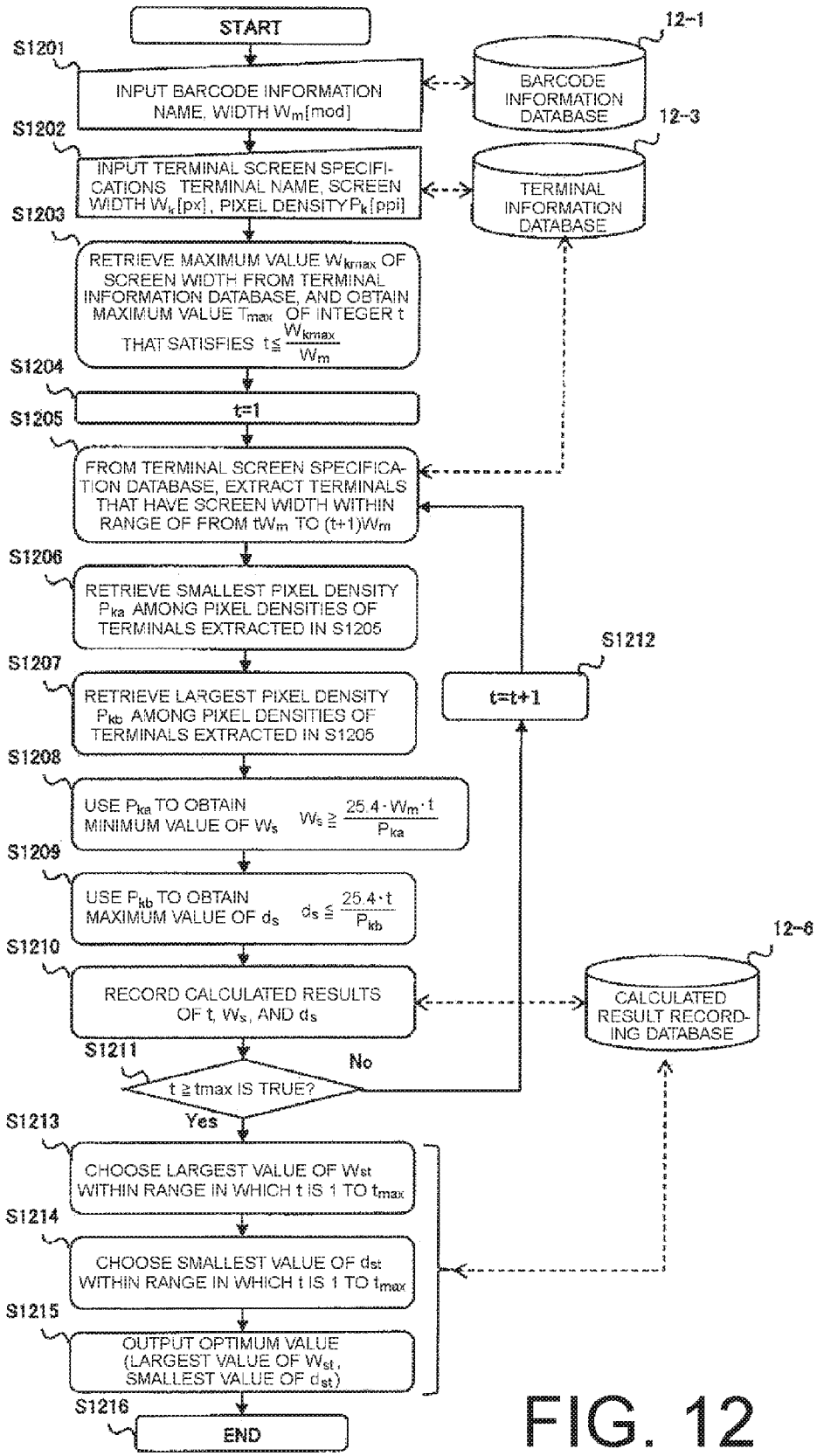
FIG. 12 is a flow chart for illustrating basic operation in a fourth example embodiment of this invention.

For example, when the barcode module width $W_m$ is 308 mods and the terminals used are k1 to k12 of Table 7, $t_{max}$ is determined as 3 by the calculation in Step S1203 of FIG. 12, and data shown in Table 11 are recorded in the calculated result recording database 12-6.

TABLE 11

Case of the fourth example embodiment (when $W_m$ is 308 mods and terminals of Table 7 are used)

| t | $W_{st}$ [mm] | $d_{st}$ [mm] | Reference information $P_{ka}$ | $P_{kb}$ |
|---|---|---|---|---|
| 1 | 47.4 | 0.0847 | 165 | 300 |
| 2 | 52.2 | 0.145 | 300 | 350 |
| 3 | 58.67 | 0.169 | 400 | 450 |

*$t_{max}$ = 3

It is determined from Table 11 that the largest value of $W_{st}$, namely, $W_{s3}$, which is the value of $W_{st}$ when t is 3 and which is 58.67 mm, is an ideal readable width of the barcode scanner, and that the smallest value of $d_{st}$, namely, $d_{s1}$, which is the value of $d_{st}$ when t is 1 and which is 0.0847 mm, is an ideal minimum resolution of the barcode scanner.

[Math. 88]

$$P \geq t \cdot P_1 \left( \text{where...} \; P_1 = \frac{25.4 \cdot W_m}{W_s} \right) \quad \text{Expression (A')}$$

In this case, $P_1$ is calculated by the expression of [Math. 88] as 133.3 ppi.

[Math. 89]

$$P \leq t \cdot P_h \left( \text{where...} \; P_h = \frac{25.4}{d_s} \right) \quad \text{Expression (B')}$$

The value $P_h$ is calculated by the expression of [Math. 89] as 300 ppi. A P-W diagram that indicates the terminals and compatible ranges is therefore as illustrated in FIG. 13.

Figure 13:
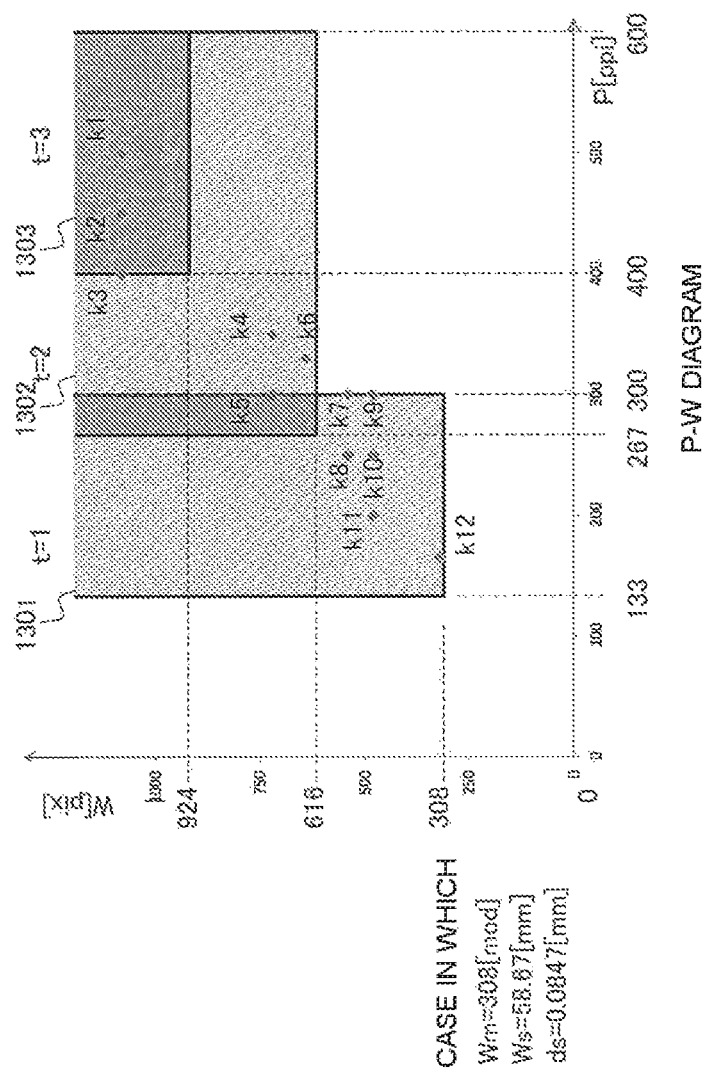
FIG. 13 is a P-W diagram for illustrating an example of the relation between a proper area and terminal screen specifications in a specific example that is described in the fourth example embodiment of this invention.

Referring to FIG. 13, every one of points corresponding to the respective screen specifications of the terminal k1 to terminal k12 shown in Table. 7 is within one of an area 1301, an area 1302, and an area 1303, which are a compatible range of when t is 1, a compatible range of when t is 2, and a compatible range of when t is 3, respectively. This indicates that, with the barcode scanner specifications calculated in the fourth example embodiment, the barcode can be displayed and read on the screen of all expected terminals (the terminal k1 to terminal k12 of Table 7).

In the case where the barcode scanner specifications (readable width and minimum resolution) calculated as a result are found to be values difficult to achieve in terms of barcode scanner manufacturing technology or cost, reduction of the width (reduction of the number of digits) of the barcode, decrease of the number of types of terminals expected to be used to display the barcode, or the like needs to be considered.

The fourth example embodiment may be implemented as a stand-alone device that includes the functions of the fourth example embodiment, or as one of functions of a device that includes the functions of the first example embodiment to the third example embodiment. In short, the fourth example embodiment may be combined with each of the first example embodiment to the third example embodiment.

According to the fourth example embodiment described above, barcode scanner specifications are determined by taking into account a particular module width of a barcode and screen specifications of a plurality of terminals expected to be used to display the barcode. The resultant effect of the fourth example embodiment is that barcode scanner specifications required to read a barcode that has a particular module width can be known when the barcode is displayable on a plurality of terminals expected to be used to display the barcode.

Fifth Example Embodiment

The fifth example embodiment will be described next. The fifth example embodiment relates to a system configured to actually display a barcode on a terminal screen. In the fifth example embodiment, generating a barcode means generating barcode image data.

Figure 14:
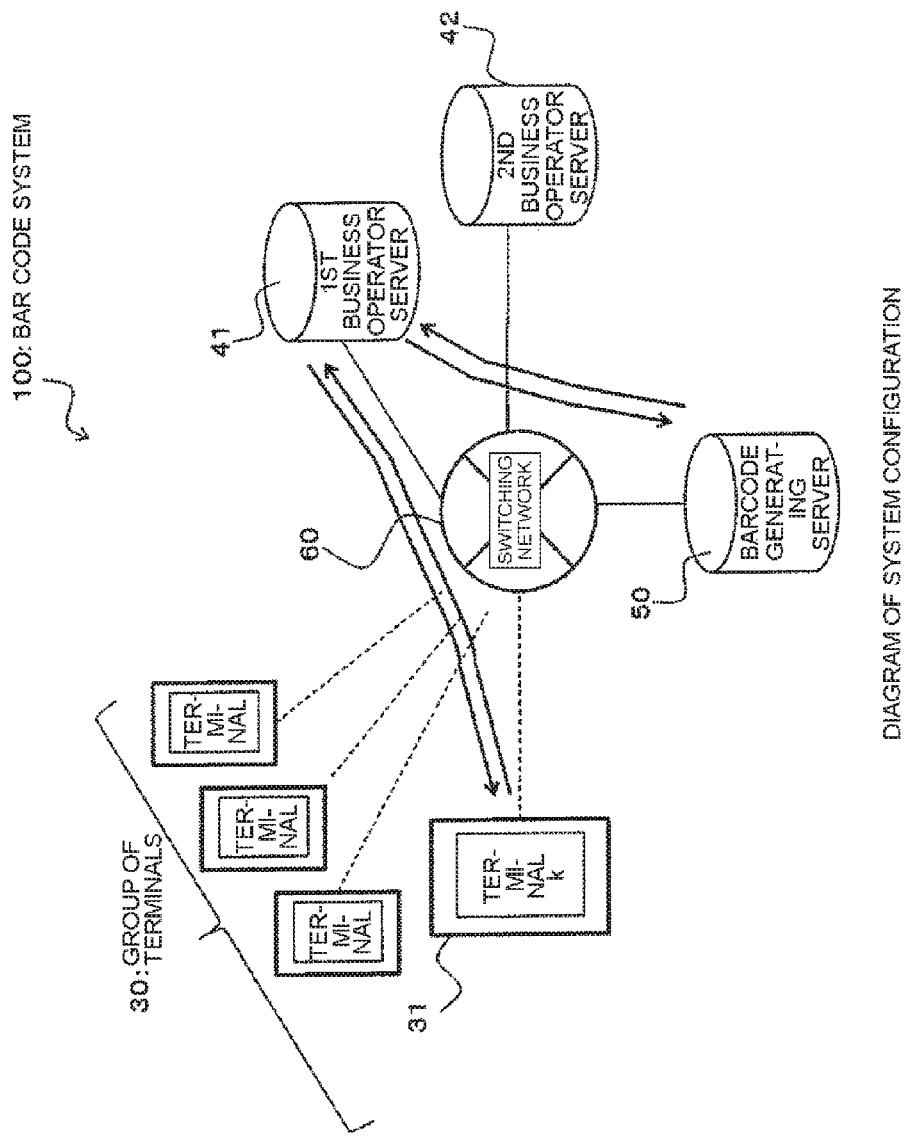
FIG. 14 is a block diagram for illustrating the overall basic configuration of a barcode system in a fifth example embodiment of this invention.

Referring to FIG. 14, an example of the overall configuration of a barcode system 100 according to the fourth example embodiment will be described first.

Referring to FIG. 14, the barcode system 100 includes a group of terminals 30, a terminal k 31, a first business operator server 41, a second business operator server 42, a barcode generating server 50, and a switching network 60.

In the fifth example embodiment, the terminal k 31 and other terminals are included in the group of terminals 30 as terminals used by users. While the terminals are similar to one another in that the terminals are used by users, the terminals are classified into various models and accordingly have various screen specifications.

The following description takes as an example a case where a user uses the terminal k 31.

The first business operator server 41 and the second business operator server 42 are each a server device used by a business operator that provides a service using a barcode. In the fifth example embodiment, a business operator A uses the first business operator server 41 and a business operator B uses the second business operator server 42. The service provided by the business operator A and the service provided by the business operator B have different purposes, and differ from each other in the type of the barcode used to provide the service and in the number of digits of encoded information of the barcode. The first business operator server 41 and the second business operator server 42 each correspond to a "requesting device" of this invention.

The barcode generating server 50 is a server device configured to generate a barcode by utilizing a feature of the fifth example embodiment.

The terminals and servers included in this system are connected via the switching network 60 in a manner that allows communication among one another.

Specifically, the terminal k 31 can access via the switching network 60 the first business operator server 41 and the second business operator server 42, which provide services using barcodes.

The first business operator server 41 and the second business operator server 42, which provide services using barcodes, access the barcode generating server 50, which generates a barcode that uses a feature of the fifth example embodiment, to obtain barcode images.

The switching circuit 60 is implemented by, for example, one of or a combination of a cellular phone network, a public network of the Internet, and a leased line.

A description is given below on a case where, in the configuration of the barcode system 100 described above, the terminal k 31 accesses the first business operator server 41 of the business operator A to display a barcode on the terminal k 31 via the first business operator server 41 of the business operator A.

The business operator A determines, in advance, as a premise for running the business, the type of barcode to be used, the number of digits of encoded information of the barcode, and other pieces of supplementary information (for example, the NW ratio and others in the case of NW7) necessary to configure the barcode, which vary depending on what barcode type is selected, and the specifics of an encoded character string to be displayed when accessed by the terminal k 31. The business operator A also determines in advance the readable width $W_s$ mm and minimum resolution $d_s$ mm of a barcode reading device (barcode scanner) that is expected to be used.

When the first business operator server 41 is accessed (through HTTP access) by the terminal k 31, information called a user agent which includes a terminal name, an OS type, a browser type, and other pieces of information is notified to the first business operator server 41 as basic information of the terminal k 31. The first business operator server 41 can obtain screen information of the terminal k 31 through a Web API, by using "window.screen.width" for the screen width and "windowscreen.height" for the screen height. In other words, access from the terminal k 31 provides the first business operator server 41 with user agent information and screen width/height information. Alternatively, a service user may log into the first business operator server 41 to obtain the user's management number and to identify information that qualifies as user agent information and screen width/height information based on the management number.

In some terminals, physical rotation of the screen causes a switch between "window.screen.width" and "windowscreen.heights". The fifth example embodiment addresses this by treating "window.screen.width" as less than "windowscreen.height" ("window.screen.width"<"windowscreen.height"). In other words, it is assumed in the fifth example embodiment that the "screen width" of a terminal screen is always in the direction of the shorter side of the screen and the "screen height" is always in the direction of the longer side of the screen.

The first business operator server 41 transmits, to the barcode generating server 50, the user agent information and the "screen width" and "screen height" information of the terminal screen, which are described above, the type of a barcode that the business operator A wishes to use (and supplementary information, e.g., a related parameter), the number of digits of the barcode, an encoded character string, and also the readable width $W_s$ mm and the minimum resolution $d_s$ mm as the specifications of a barcode scanner that the business operator A is expecting to use.

The barcode generating server 50 uses the various types of information transmitted from the first business operator server 41 and a terminal information database, which is provided in the barcode generating server 50, to evaluate a barcode image and evaluate compatibility, and transmits the results thereof to the first business operator server 41.

Based on the barcode image prepared by the barcode generating server 50 and the compatibility information, the first business operator server 41 determines whether or not the barcode image prepared by the barcode generating server 50 is to be displayed on a screen of the terminal k 31. When there is no issue regarding display, the barcode image prepared by the barcode generating server 50 is displayed on the screen of the terminal k 31. When it is determined from the compatibility information that there are issues regarding display, the first business operator server 41 can choose not to display the barcode image, or choose to transmit to the barcode generating server 50 new information that includes a different parameter in an attempt to obtain a new barcode image.

The barcode generating server 50 is also capable of preparing a requested barcode under a condition set by the requester. This enables the barcode generating server 50 to meet a data request that is made from the second business operator server 42 used by the business operator B, which is a business operator different from the business operator A, and that has a different barcode type and a different digit count. Thus, the barcode type and the number of digits of encoded information of the barcode are not fixed to a particular barcode type and a particular digit count, which is a feature of the fifth example embodiment.

Processing of the barcode generating server 50 will be described with reference to flow charts of FIG. 15-1, FIG. 15-2, and FIG. 15-3, which are illustrations of this processing.

Figures 1, 15:
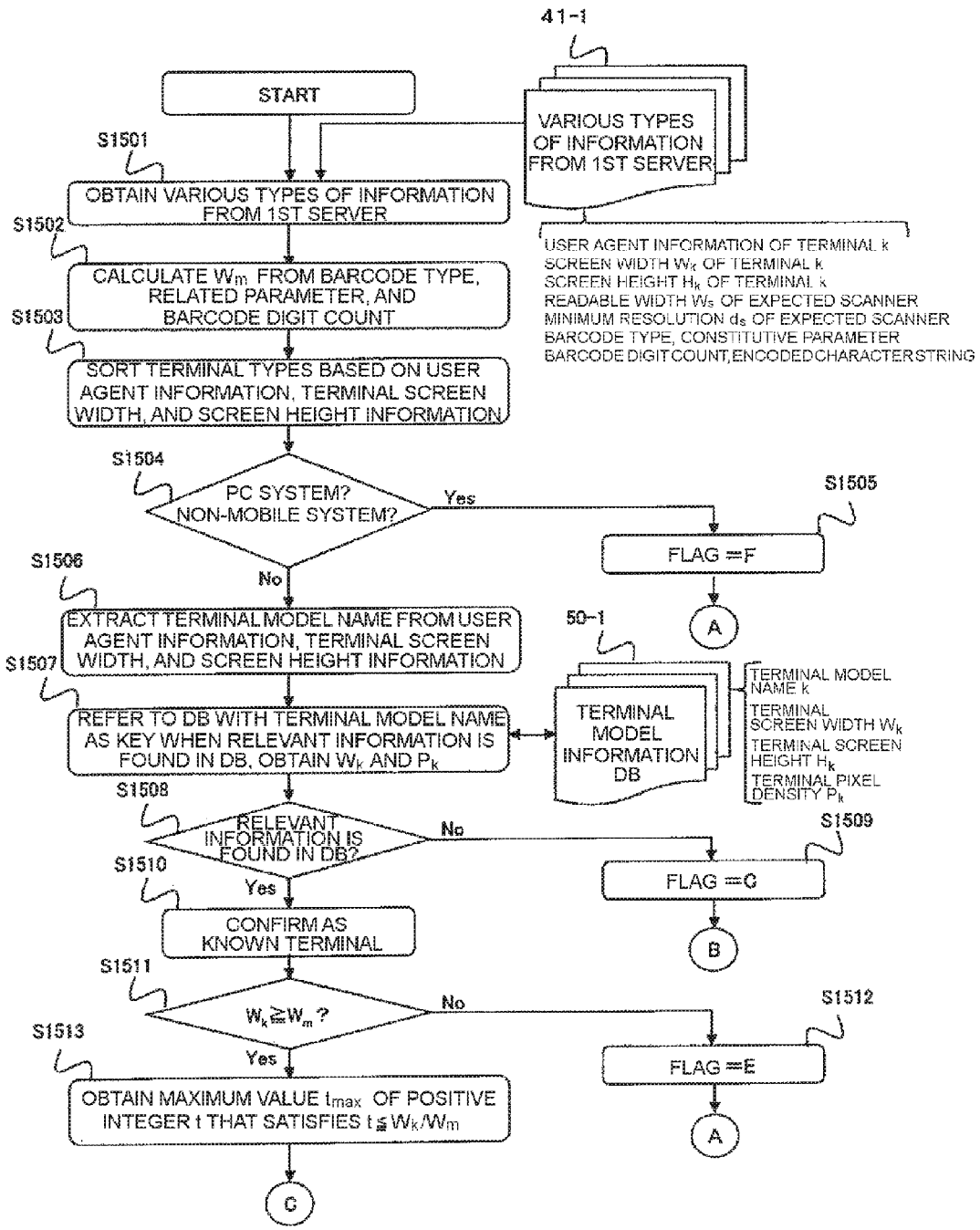
Figures 2, 15:
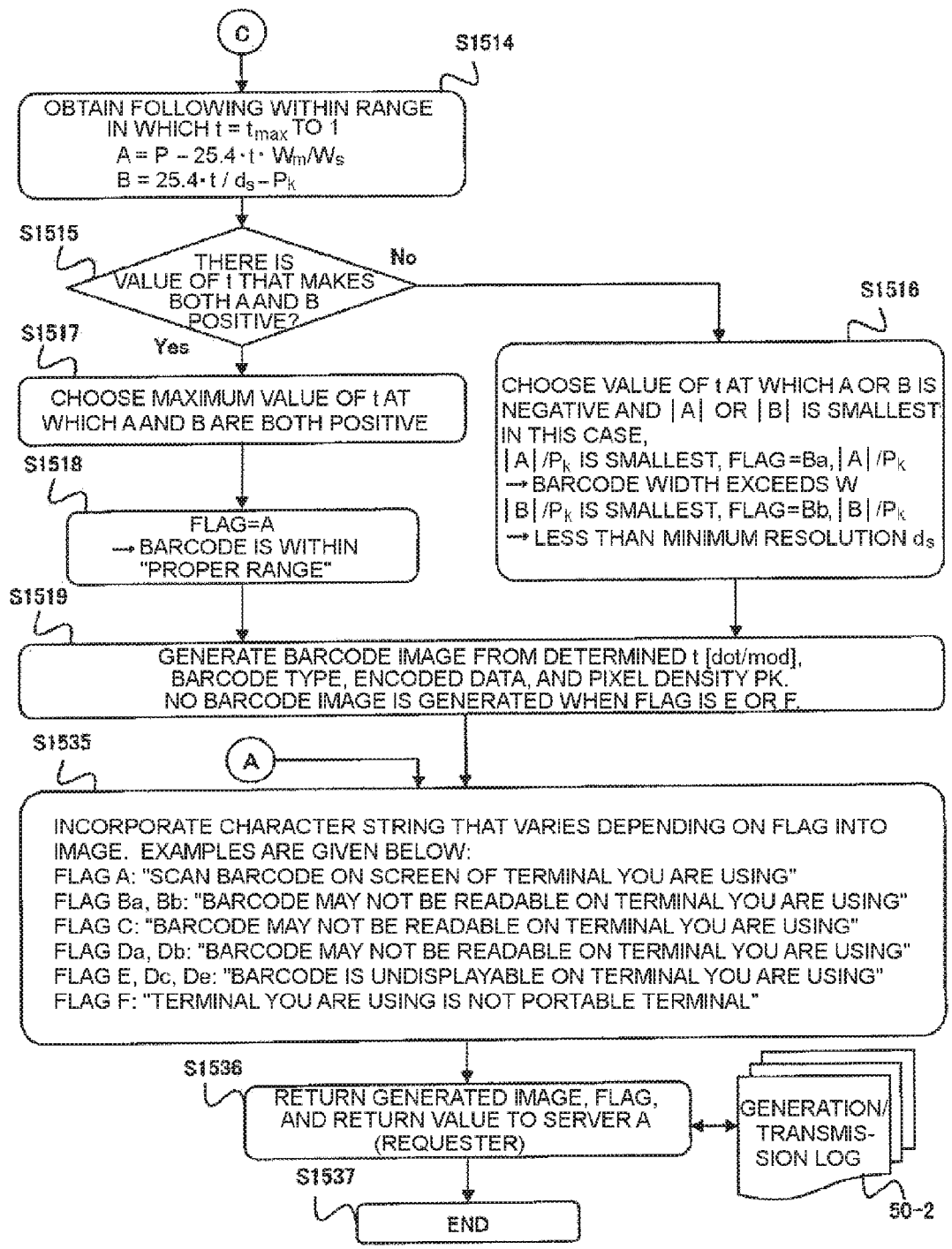
Figures 3, 15:
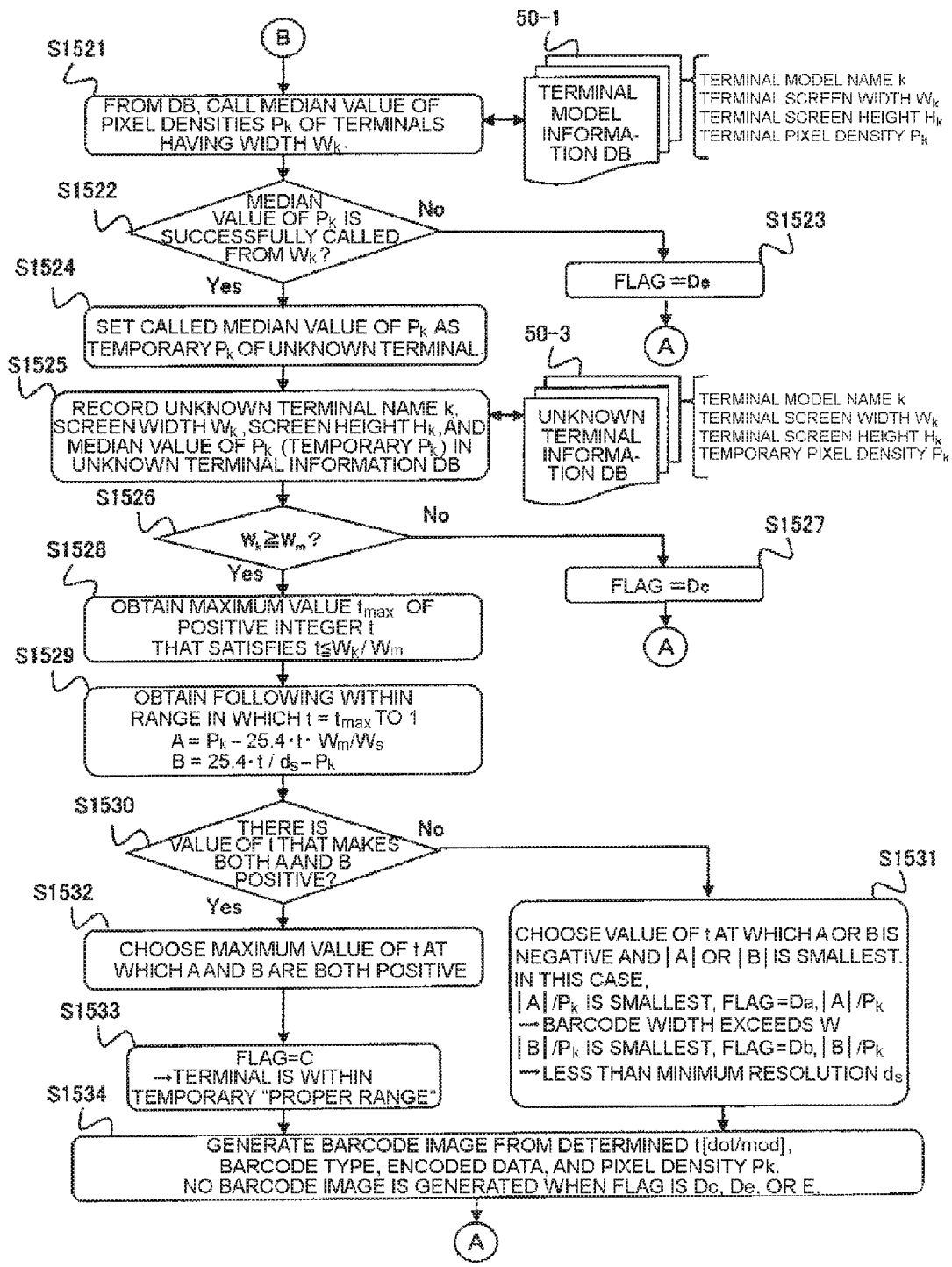

The processing of the barcode generating server starts in Step S1501 of FIG. 15-1. The barcode generating server receives various types of information (denoted by 41-1 in FIG. 15-1) from the first business operator server 41 in this step, and proceeds to Step S1502. The various types of information are:

"user agent information of terminal k
screen width $W_k$ of terminal k
screen height $H_k$ of terminal k
readable width $W_s$ of expected barcode scanner
minimum resolution $d_s$ of expected barcode scanner
barcode type and supplementary information, which includes a constitutive parameter
barcode digit count and encoded character string"

In Step S1502, the module width $W_m$ of the barcode is calculated from the information obtained in Step S1501. The module width $W_m$ of the barcode is uniquely determined based on the type of the barcode symbol, the constitutive parameter, the barcode digit count, and the encoded character string, as in Table 1, which is referred to in the description of the first example embodiment.

The barcode generating server 50 proceeds to Step S1503, where the user agent information, the terminal screen width information, and the terminal screen height information obtained in Step S1501 are used to sort terminal types. A case of sorting a portable terminal that uses an android (trademark) OS and a portable terminal that uses an iOS (trademark) as compatibility determination targets is discussed as an example. In this case, when character strings of the user agent information include a character string "android" and a character string "mobile" at the same time, the terminal k is determined as a portable terminal that uses an android OS. When character strings of the user agent information include a character string "iPhone (trademark)" and do not include a character string "iPad (trademark)" and a character string "iPod (trademark)", the terminal k is deduced to be a portable terminal that uses an iOS. Once the terminal k is found to be a portable terminal that uses an iOS, it is deduced that the terminal k is an iPhone 3GS when the screen width $W_k$ of the terminal k is 320 pix, and that the terminal k is an iPhone 4/4S/5/5C/5S when $W_k$ is 640 pix. The terminal k that is found out to be an iPhone 4/4S/5/5C/5S can further be sorted into finer categories by determining the terminal k as one of an iPhone 4 and iPhone 4S when the screen height $H_k$ of the terminal k is 960 pix, and determining the terminal k as one of an iPhone 5, an iPhone 5C, and an iPhone 5S when $H_k$ is 1,136 pix.

Next, whether or not the type of the terminal k is personal computer (PC) or tablet terminal is determined based on the result of the sorting in Step S1503 (Step S1504). When the type of the terminal k is personal computer (PC), tablet terminal, or other types that are not included in the sorting of Step S1503 ("Yes" in Step S1504), a flag is set to "F" in Step S1505. The barcode generating server 50 then proceeds to (A), which is Step S1535. In FIG. 15-1, FIG. 15-2, and FIG. 15-3, (A) is notated as a circled alphabet letter. The same applies to (B) and (C).

When the determination based on the result of the sorting in Step S1503 concludes that the terminal k is not a PC or a tablet terminal ("No" in Step S1504), on the other hand, the barcode generating server 50 proceeds to Step S1506.

In Step S1506, the user agent information is analyzed again to extract the terminal model name of the terminal k from character strings of the user agent information. The barcode generating server 50 then proceeds to Step S1507.

In Step S1507, a terminal model information database 50-1 is searched with the terminal model name obtained in Step S1506 as a search key, to thereby obtain the terminal's screen width $W_k$, the screen height $H_k$, and the pixel density $P_k$ anew from the terminal model information database 50-1. The terminal model information database 50-1 is a database prepared by compiling, in advance, open information published by manufacturers of terminals and other similar pieces of known information. The terminal model information database 50-1, a generation/transmission log 50-2, and an unknown terminal information database 50-3 are each stored in a location inside the barcode generating server 50 or an external storage device, both of which are accessible by the barcode generating server 50. In the accompanying drawings, a database is notated as DB as necessary.

Whether or not a terminal model name corresponding to the terminal model name of the terminal k is found in the terminal model information database 50-1 is determined next (Step S1508).

When a terminal model name corresponding to the terminal model name of the terminal k is not found in the terminal model information database 50-1 ("No" in Step S1508), the barcode generating server 50 proceeds to Step S1509, where the flag is set to "C", indicating an "unknown terminal". The barcode generating server 50 then proceeds to (B), which is Step S1521 of FIG. 15-3. When a terminal model name corresponding to the terminal model name of the terminal k is found in the terminal model information database 50-1 ("Yes" in Step S1508), on the other hand, the terminal k is confirmed as a "known terminal" (Step S1510). The barcode generating server 50 then proceeds to Step S1511.

In Step S1511, $W_m$ calculated in Step S1502 and $W_k$ obtained in Step S1507 are compared. When $W_k < W_m$ is true ("No" in Step S1511), this means that the terminal screen width is narrower than the width of the barcode to be displayed. The barcode generating server 50 therefore determines that "the barcode cannot be displayed on the terminal", and proceeds to Step S1512, where the flag is set to "E". The barcode generating server 50 then proceeds to (A), which is Step S1535.

When $W_s \geq W_m$ is true ("Yes" in Step S1511), on the other hand, the barcode generating server 50 proceeds to Step S1513.

The comparison in Step S1511 corresponds to Expression (C) described above as the premise of the description of the example embodiments.

$$W \geq t \cdot W_m \qquad \text{Expression (C)}$$

In Step S1513, the constituent dot count per module is given as t dots/mod, and the maximum value $t_{max}$ of the positive integer t which satisfies $t \leq W_k/W_m$ is obtained. The barcode generating server 50 then proceeds to Step S1514.

When the barcode module width $W_m$ is 300 mods and the terminal screen width $W_k$ is 720 dots, for example, t is obtained as $t \leq 720/300 \rightarrow t \leq 2.4$, and $t_{max}$ is 2.

The value $t_{max}$ obtained here is the maximum constituent dot count per module that can be displayed on the terminal screen, and the barcode width in this case can be expressed as $t_{max} \cdot W_m$.

A reference is made to FIG. 15-2. In Step S1514, the barcode generating server 50 determines whether or not the barcode has, within a range of from $t_{max}$ to 1, a minimum module width greater than the minimum resolution of the barcode scanner and has a width equal to or less than the readable width of the barcode scanner, when displayed on the terminal screen.

Specifically, the following calculations are performed:

[Math. 90]

$$P \geq t \cdot P_l \left( \text{where } P_l = \frac{25.4 \cdot W_m}{W_s} \right) \qquad \text{Expression (A')}$$

[Math. 91]

$$P \leq t \cdot P_h \left( \text{where } P_h = \frac{25.4}{d_s} \right) \qquad \text{Expression (B')}$$

Based on the two relational expressions of [Math. 90] and [Math. 91], $A = P_k - 25.4 \cdot t \cdot W_m/W_s$ is calculated from Expression (A').

When the relational expression of Expression (A') is established, A takes a positive value.

Next, $B = 25.4 \cdot t/d_s - P_k$ is calculated from Expression (B').

When the relational expression of Expression (B') is established, B takes a positive value.

For example, when $t_{max}$ is 2, the barcode module width $W_m$ is 300 mods, the terminal pixel density $P_k$ is 300 dpi, the readable width $W_s$ of the barcode scanner is 60 mm, and the minimum resolution $d_s$ of the barcode scanner is 0.15 mm, the following table (Table 12) can be created.

TABLE 12

| | | |
|---|---|---|
| Example of calculating A and B Wm = 300 [mod] Pk = 300 [dpi], Ws = 60 [mm], ds = 0.15 [mm] | | |
| t | A = $P_k$ −25.4 · t · $W_m$/$W_s$ | B = −25.4 · t/$d_s$ − $P_k$ |
| 2(= $t_{max}$) | 46 | 38.7 |
| 1 | 173 | −130.7 |

In Step S1515, values of A and B obtained in Step S1514 are checked to determine whether there is a value of t that makes both of A and B positive. When "there is a value of t that makes both of A and B positive" ("Yes" in Step S1515), the barcode generating server 50 proceeds to Step S1517.

"There is a value of t that makes both of A and B positive" means that there is a value of t at which Expression (A') and Expression (B') are established simultaneously, i.e., that the barcode, the terminal screen specifications, and the barcode scanner specifications are compatible with one another.

In the example of Table 12, "both A and B are positive" when t is 2 ("Yes" in Step S1515). The barcode generating server 50 can therefore proceed to Step S1517.

In Step S1517, a maximum value of t at which "both A and B are positive" (this maximum value of t is 2 in the example of Table 12) is chosen as the value of t. The barcode generating server 50 then proceeds to Step S1518.

In Step S1518, the flag is set to "A", which means that a barcode image can be prepared in a "proper range". The barcode generating server 50 then proceeds to Step S1519.

When no value of t makes both A and B obtained in Step S1514 positive, that is, when there is no value of t at which Expression (A') and Expression (B') are established simultaneously ("No" in Step S1515), on the other hand, the barcode generating server 50 proceeds to Step S1516. That there is no value of t at which Expression (A') and Expression (B') are established simultaneously means that the barcode, the terminal screen specifications, and the barcode scanner specifications are incompatible with one another.

In an example of Table 13 ($t_{max}$ is 2, the barcode module width $W_m$ is 300 mods, the terminal pixel density $P_k$ is 250 dpi, the readable width $W_s$ of the barcode scanner is 60 mm, and the minimum resolution $d_s$ of the barcode scanner is 0.15 mm), B takes a negative value when t is 1, and A takes a negative value when t is 2. In short, no value of t makes both A and B positive ("No" in Step S1515). The barcode generating server 50 accordingly proceeds to Step S1516.

TABLE 13

Example of calculating A and B $W_m$ = 300 [mod]
$P_k$ = 250 [dpi], $W_s$ = 60 [mm], $d_s$ = 0.15 [mm]

| t | $A = P_k - 25.4 \cdot t \cdot W_m/W_s$ | $B = -25.4 \cdot t/d_s - P_k$ |
|---|---|---|
| 2(= $t_{max}$) | −4 | 88.7 |
| 1 | 123 | −140.7 |

In Step S1516, a value of t that minimizes the absolute value of the negative value of A or the negative value of B is chosen as the value of t.

When the value that takes the negative value at the chosen value of t is A, the flag is set to "Ba", and a value ($|A|/P_k$) obtained by dividing the absolute value of A by $P_k$ is set as a return value.

When the value that takes the negative value at the chosen value of t is B, on the other hand, the flag is set to "Bb", and a value ($|B|/P_k$) obtained by dividing the absolute value of B by $P_k$ is set as a return value. The barcode generating server 50 then proceeds to Step S1519.

The values $|A|/P_k$ and $|B|/P_k$ serve as indices that quantitatively indicate how far off the barcode is from a "proper range".

In the example of Table 13 described above, the value of A is negative when t is 2 and the value of B is negative when t is 1. A comparison between the absolute value of A when t is 2 and the absolute value of B when t is 1 reveals that the absolute value of A is smallest when t is 2, and t is therefore determined as 2. An index that quantitatively indicates how far off the barcode is from a "proper range" in this case is $|A|/P_k$=0.16 (1.6%). A larger value of the index means a higher chance of the barcode displayed on the terminal being unreadable.

In Step S1519, a barcode image is generated with the use of the value of t determined in Step S1517 or Step S1516, the information obtained in Step S1502 from the first business operator server 41, and the terminal pixel density $P_k$. The information obtained from the first business operator server 41 includes the barcode type, supplementary information, which is a constitutive parameter and the like, and encoded data.

In this step, the barcode is configured at t dots per module, and the width of the barcode image is $t \cdot W_m$. When the target barcode is of a type that is called a one-dimensional barcode, the dot count (a positive numerical value) is calculated from $25.4/P_k \times 10$ mm so that the height of the barcode is 10 mm on the terminal screen. After the barcode image is completed, the barcode generating server 50 proceeds to Step S1535. A barcode image that is displayable on the terminal k cannot be generated in the case described above where the flag is "E". The terminal k is not a portable terminal in the case described above where the flag is "F". The barcode generating server 50 accordingly proceeds to Step S1535 without generating a barcode image in the case where the flag is "E" and in the case where the flag is "F".

In Step S1535, a comment that varies depending on the flag is incorporated in the prepared barcode image. Step S1535 is processing of embedding a comment in the form of a character string in the image in order to clarify the degree of propriety of the configured barcode. The processing of Step S1535 can be omitted when the text comment is unnecessary.

The character string that is incorporated in the image in Step S1535 and that varies depending on the comment is, for example, as follows:

Flag A: "Scan the barcode on the screen of the terminal you are using."

Flag Ba, Flag Bb: "The barcode may not be readable on the terminal you are using."

Flag C: "The barcode may not be readable on the terminal you are using."

Flag Da, Flag Db: "The barcode may not be readable on the terminal you are using."

Flag E, Flag Dc, Flag De: "The barcode cannot be displayed on the terminal you are using."

Flag F: "The terminal you are using is not a portable terminal."

The character strings given above are merely an example, and other phrases may be used.

After an image containing the barcode is completed in Step S1535, the barcode generating server 50 proceeds to Step S1536. The prepared image does not contain a barcode in the cases described above where the flag is "E" and where the flag is "F" and in cases described later where the flag is "E", where the flag is "Dc", where the flag is "De", and where the flag is "F" because the barcode cannot be configured in those cases.

In Step S1536, the generated image, the flag, and the return value are recorded in the generation/transmission log 50-2. The generated image, the flag, and the return value are also returned to the first business operator server 41 in Step S1536. The processing is then ended (Step S1537).

Thereafter, the generated image is transmitted from the first business operator server 41 to the portable terminal k 31. In the case where the generated image contains a barcode, the barcode is displayed on the screen of the portable terminal k 31. This enables the user to read the barcode with the barcode scanner.

The transmission of the image also enables the portable terminal k to display, on its screen, the character string incorporated in Step S1535, regardless of whether a barcode has been generated or not. The user can determine in advance whether or not the barcode is readable by referring to the displayed character string.

Next, a description will be given on processing that is executed when it is determined in Step S1508 that the terminal model information database 50-1 does not have information on the terminal k ("No" in Step S1508).

In this case, the flag is set to "C", which indicates an "unknown terminal", in Step S1509 as described above, and the barcode generating server 50 proceeds to (B), which is Step S1521 of FIG. 15-3.

In Step S1521 of FIG. 15-3, the terminal model information database 50-1 is referred to again in order to call a value of the pixel density $P_k$ that is most frequently found among terminals where the image width is the same as $W_k$, namely, a median value. The purpose of this step is to call a value of $P_k$ that is most likely to be found among terminals where the image width is the same as $W_k$, which is the screen width of the terminal k, because the pixel density of the unknown terminal k is not known.

The barcode generating server 50 then checks whether or not another terminal in which the image width is the same as $W_k$ is found in the terminal model information database 50-1 (Step S1522). In other words, the barcode generating server 50 checks whether or not a median value of $P_k$ is successfully called in Step S1521 from among terminals where the image width is $W_k$.

When a median value is successfully called for the pixel densities $P_k$ of terminals where the image width is the same as $W_k$ ("Yes" in Step S1522), the barcode generating server 50 proceeds to Step S1524 to set the called value as the temporary pixel density $P_k$ of the unknown terminal k. The barcode generating server 50 then proceeds to Step S1525.

When a median value is not successfully called in Step S1522 for the pixel densities $P_k$ of terminals where the image width is the same as $W_k$, on the other hand, the barcode generating server 50 proceeds to Step S1523 to set the flag to "De", which means that "the terminal is unknown and the screen width is unknown". The barcode generating server 50 then proceeds to (A), which is Step S1535 of FIG. 15-2. Processing of Step S1535 and subsequent steps is as described above.

In Step S1525, the model name k of the terminal k, the screen width $W_k$ of the terminal k, the screen height $H_k$ of the terminal k, and the temporary pixel density $P_k$, which is determined in Step S1524, are recorded in the unknown terminal information database 50-3. The barcode generating server 50 then proceeds to Step S1526.

The unknown terminal information database 50-3 can be used to check later what unknown terminals have been examined, and for other uses. The unknown terminal information database 50-3 can be utilized as one of information sources for the maintenance of the terminal model information database 50-1.

In Step S1526, $W_m$ calculated in Step S1502 and $W_k$ obtained in Step S1507 are compared.

When $W_k < W_m$ is true ("No" in Step S1526), this means that the terminal screen width is narrower than the width of the barcode to be displayed. The barcode generating server 50 therefore determines that "the terminal cannot display the barcode", and proceeds to Step S1527, where the flag is set to "Dc". The barcode generating server 50 then proceeds to (A), which is Step S1535 of FIG. 15-2. Processing of Step S1535 and subsequent steps is as described above.

When $W_k \geq W_m$ is true in Step S1526 ("Yes" in Step S1526), on the other hand, the barcode generating server 50 proceeds to Step S1528.

In Step S1528, the per-module constituent dot count is given as t dots/mod and the maximum value $t_{max}$ of the positive integer t which satisfies $t \leq W_k/W_m$ is obtained. The barcode generating server 50 then proceeds to Step S1529.

In Step S1529, $A=P_k-25.4 \cdot t \cdot W_m/W_s$ and $B=25.4 \cdot t/d_s-P_k$ are calculated within a range of from $t_{max}$ to 1. The barcode generating server 50 then proceeds to Step S1530. The specifics of processing in Step S1528 and Step S1529 and the reason for executing the processing are the same as the specifics of processing in Step S1513 of FIG. 15-1 and Step S1514 of FIG. 15-2 and the reason for executing that processing.

In Step S1530, values of A and B obtained in Step S1529 are checked to determine whether there is a value of t that makes both A and B positive. When "there is a value of t that makes both A and B positive" ("Yes" in Step S1530), the barcode generating server 50 proceeds to Step S1532.

In Step S1532, a maximum value of t at which "A and B are both positive" is chosen as the value of t. The barcode generating server 50 then proceeds to Step S1533.

In Step S1533, the flag is set to "C", which means that the terminal k is an unknown terminal, but a barcode can be prepared in a "proper range" with the temporary pixel density $P_k$. The barcode generating server 50 then proceeds to Step S1534.

When no value of t makes "both of A and B" obtained in Step S1529 "positive" ("No" in Step S1530), on the other hand, the barcode generating server 50 proceeds to Step S1531. This means that, as in the case where the answer is "No" in Step S1515, the barcode, the terminal screen specifications, and the barcode scanner specifications are incompatible with one another.

In Step S1531, one of A and B takes a negative value, and a value of t that minimizes the absolute value of the negative value of A or the negative value of B is therefore chosen as the value of t as in the processing of Step S1516 of FIG. 15-2.

When the value that takes the negative value at the chosen value of t is A, the flag is set to "Ca", and a value ($|A|/P_k$) obtained by dividing the absolute value of A by $P_k$ is set as a return value. When the value that takes the negative value at the chosen value of t is B, on the other hand, the flag is set to "Cb", and a value ($|B|/P_k$) obtained by dividing the absolute value of B by $P_k$ is set as a return value. In either case, the barcode generating server 50 proceeds to Step S1534 after the flag and the return value are set.

Step S1534 corresponds to Step S1519 of FIG. 15-2. In Step S1534, a barcode image is generated with the use of the determined value of t, the information obtained in Step S1502 of FIG. 15-1 from the first business operator server 41, and the terminal pixel density $P_k$. The information obtained from the first business operator server 41 includes the barcode type, supplementary information, which is a constitutive parameter and the like, and encoded data.

In this step, the barcode symbol is configured at t dots per module, and the width of the barcode image is $t \cdot W_m$. When the target barcode is of a type that is called a one-dimensional barcode, the dot count (a positive numerical value) is calculated from $25.4/P_k \times 10$ mm so that the height of the barcode is 10 mm on the terminal screen. After the barcode image is completed, the barcode generating server 50 proceeds to (A), which is Step S1535 of FIG. 15-2. In the cases described above where the flag is "Dc", where the flag is "De", and where the flag is "E", a barcode image that is displayable on the terminal k cannot be generated. The barcode generating server 50 in such cases proceeds to Step S1535 without generating a barcode image. Processing of Step S1535 and subsequent steps is as described above.

This concludes the description on the processing flow of the barcode generating server 50.

An effect of the fifth example embodiment described above is that a barcode varying in specifics from one business operator to another can be generated while taking into consideration the screen specifics of a terminal expected to be used to display the barcode and the specifications of a barcode scanner expected to be used to read the barcode.

The fifth example embodiment also enables a terminal that is displaying a generated barcode on its screen to additionally display information on whether or not the barcode is readable, which varies depending on the flag. The resultant effect is that a user who refers to a character string in this information can determine in advance whether or not the barcode is readable.

The example embodiments described above are preferred embodiments of this invention, but are not to limit the scope of this invention solely to the example embodiments. Various modifications can be made to the example embodiments without departing from the spirit of this invention.

For instance, while a barcode generating server separate from a plurality of business operator servers is provided in the fifth example embodiment described above, a barcode generating server may be provided for each business operator server. In other words, barcode generating servers and business operator servers may have a one-to-many relationship or a one-to-one relationship. This invention may also give each business operator server a function of generating a barcode, instead of providing a barcode generating server and a business operator server separately.

In the first example embodiment to the fifth example embodiment described above, the per-module dot count t is selected with the total module width of a barcode to be configured as a reference. In other words, the premise of each of the first example embodiment to the fifth example embodiment is that barcodes having the same number of digits of encoded information are each expressed in a single row.

(One-dimensional) barcodes called GS1 Databar Expanded are not limited to expressing each of barcodes having the same number of digits of encoded information in a single row, and barcodes having the same number of digits of encoded information can be expressed so that one of the barcodes is expressed in a plurality of rows. This point may be taken into consideration in the selection of a suitable lateral width of a barcode.

Figure 16:
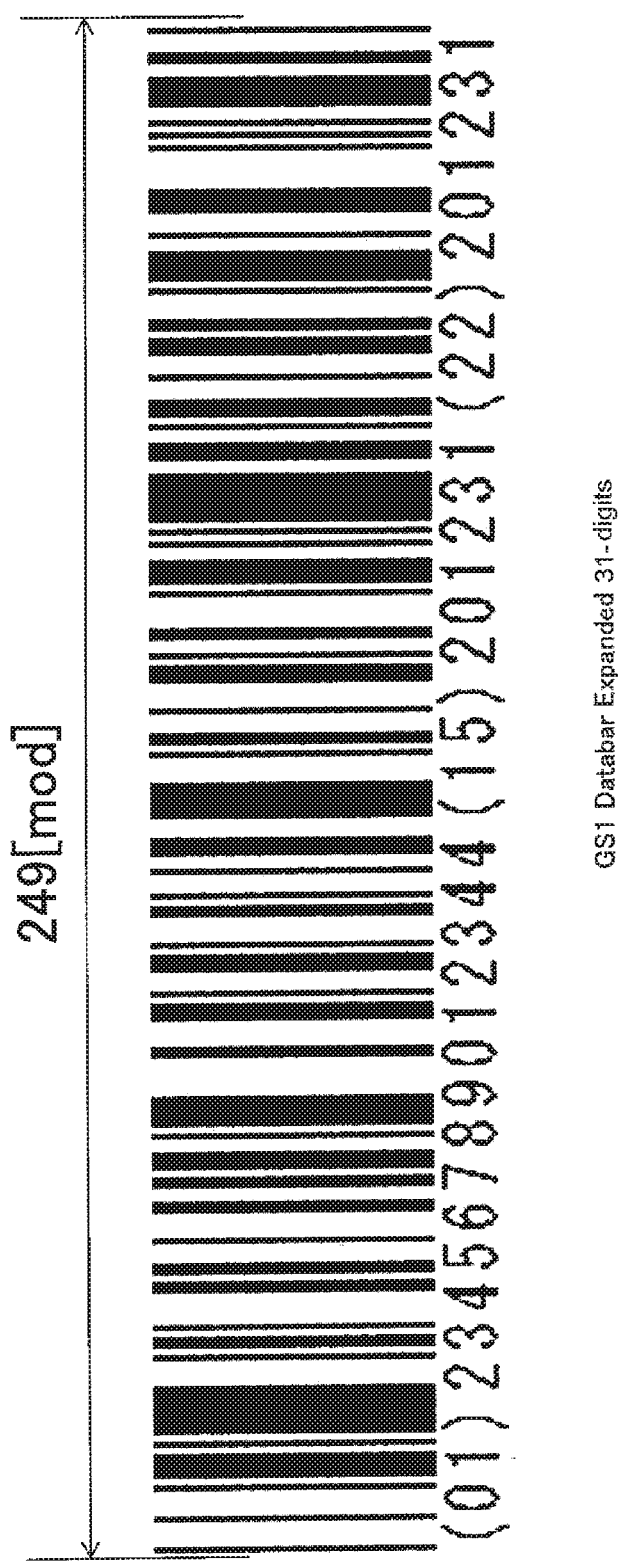
FIG. 16 is a diagram for illustrating an example in which a 31-digit number is configured as a barcode in a single row in conformity with GS1 Databar Expanded.
Figure 17:
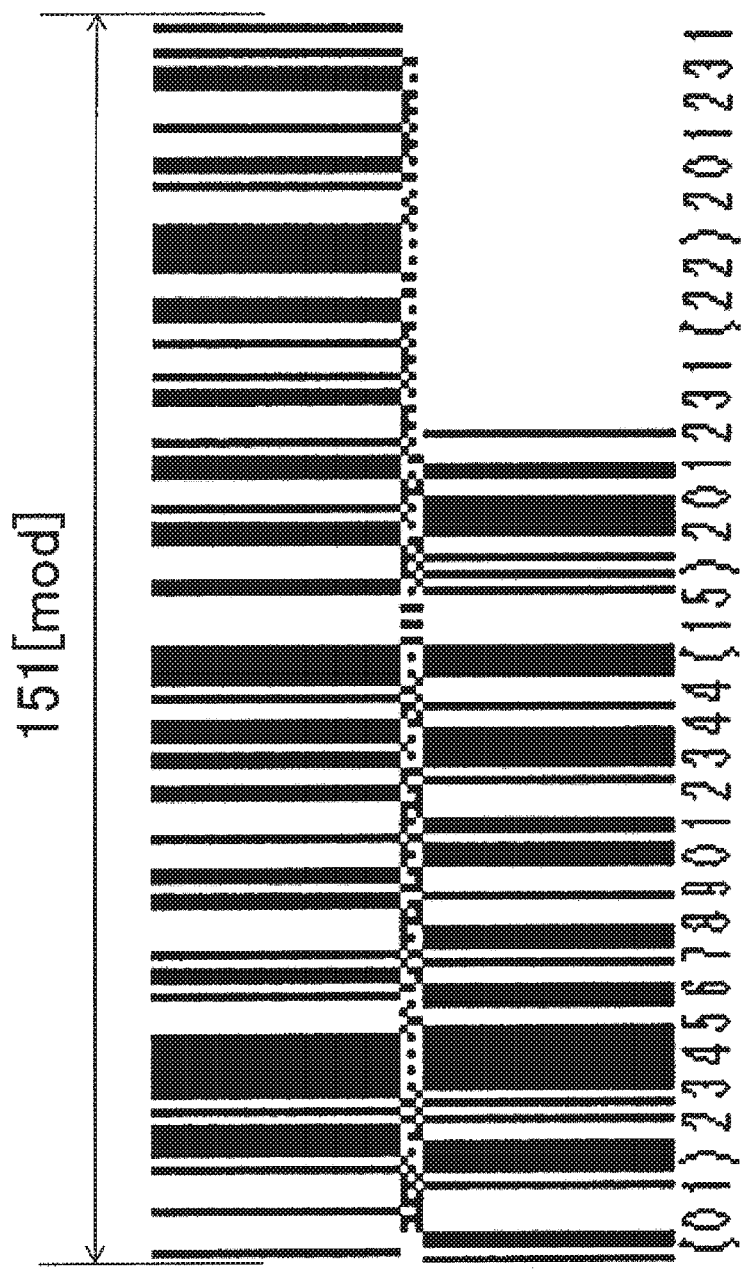
FIG. 17 is a diagram for illustrating an example in which the same encoded information as that of FIG. 16 is configured as a barcode in two rows.

This manner of selecting a suitable lateral width of a barcode is described with reference to specific examples illustrated in FIG. 16 and FIG. 17. FIG. 16 is a diagram for illustrating an example in which a 31-digit number is configured as a GS1 Databar Expanded barcode in one row. FIG. 17 is a diagram for illustrating an example in which the same encoded information as in FIG. 16 is configured in two rows. A GS1 Databar Expanded barcode in which encoded information is expressed in a plurality of rows is called a GS1 Databar Expanded Stacked barcode.

While the effective total width of the barcode is 249 mods in FIG. 16, a barcode having the same information can have a width of 151 mods when displayed, by configuring the barcode in two rows as in FIG. 17. When it comes to reading the barcode with a barcode scanner, however, the barcode in the example of FIG. 16 and the barcode in the example of FIG. 17 are treated equally as the same data.

Thus, when there is a measure for reducing the total barcode width without changing the barcode type, this invention may involve using that measure. For example, in the case of a GS1 Databar Expanded barcode as in FIG. 16, the process of selecting a suitable lateral width of the barcode may include determining the number of rows in which the barcode is expressed, in addition to selecting the per-module dot count t.

The evaluation device, terminal, barcode scanner, and servers described above can each be implemented by hardware, software, or a combination of hardware and software. Methods executed by the evaluation device, the terminal, the barcode scanner, and the servers can also be implemented by hardware, software, or a combination of hardware and software. Being implemented by software means being implemented by a computer reading and executing a program.

The program can be stored on various types of non-transitory computer-readable media to be supplied to the computer. Non-transitory computer-readable media include various types of tangible storage media. Examples of non-transitory computer-readable media include magnetic recording media (e.g., flexible disks, magnetic tape, and hard disk drives), magneto-optical recording media (e.g., magneto-optical discs), CD-ROMs (ROM stands for Read Only Memory), CD-Rs, CD-R/Ws, and semiconductor memories (e.g., mask ROMs, programmable ROMs (PROMs), erasable PROMs (EPROMs), flash ROMs, and random access memories (RAMs)). The program may also be supplied to the computer via various types of transitory computer-readable media. Examples of transitory computer-readable media include electric signals, optical signals, and electromagnetic waves. The program on a transitory computer-readable medium can be supplied to the computer through power lines, optical fibers, and other wired communication paths, or through wireless communication paths.

This application is based on Japanese patent application No. 2014-240881 (filed on Nov. 28, 2014), and claims priority to Japanese patent application No. 2014-240881 under the Paris convention. The disclosed contents of Japanese patent application No. 2014-240881 are incorporated herein in its entirety by reference.

While a detailed description on exemplary embodiments of this invention is given above, it is to be understood that various changes, substitutions, and alternative choices can be made without departing from the spirit and scope of this invention set forth in Claims. The inventor of this invention intends for an equivalent scope of the claimed invention to remain even when Claims are amended in the application procedure.

The whole or part of the example embodiments disclosed above can also be described by, but are not limited to, the following supplementary notes.

(Supplementary Note 1) A barcode evaluation device, which is configured to conduct an evaluation, which involves determining whether or not a barcode image is displayable on an image display device and determining whether or not the barcode image is readable with a barcode reading device, the evaluation being conducted based on specifics of the barcode image, specifications of the image display device, and specifications of the barcode reading device without actually displaying and reading the barcode image.

(Supplementary Note 2) The barcode evaluation device according to Supplementary Note 1, wherein the barcode evaluation device is configured to conduct the evaluation for a given barcode image, a given image display device, and a given barcode reading device to produce a result of the evaluation.

(Supplementary Note 3) The barcode evaluation device according to Supplementary Note 1 or 2, wherein the barcode evaluation device is configured to:

generate a coordinate system that has, as coordinate axes, values representing the specifications of the image display device;

map, onto the coordinate system, as an area, a range of specifications required for the image display device in order to display a given barcode image so that the given barcode image is readable with a given barcode reading device, and plot, on the coordinate system, as a point, coordinates that correspond to the specifications of the image display device to be evaluated; and produce, by mapping the area and plotting the point, in a visible manner, whether or not the specifications of the image display device to be evaluated are within the required specification range, and, when the image display device specifications are outside the required specification range, how far off the image display device specifications are from the required specification range.

(Supplementary Note 4) The barcode evaluation device according to Supplementary Note 1, wherein the barcode evaluation device is configured to conduct the evaluation for a plurality of combinations of one or more given barcode images, one or more given image display devices, and a plurality of given barcode reading devices, to produce results of the evaluation.

(Supplementary Note 5) The barcode evaluation device according to Supplementary Note 4, wherein the barcode evaluation device is configured to obtain, based on a plurality of results of the evaluation conducted for a given pair of a given barcode image and a given barcode reading device, and for each of the plurality of given image display devices, a number of image display devices that are capable of displaying the given barcode image so that the given barcode image is readable with the given barcode reading device, and to produce a proportion of the obtained number of image display devices to a total number of the plurality of given image display devices.

(Supplementary Note 6) The barcode evaluation device according to Supplementary Note 4, wherein the barcode evaluation device is configured to produce, based on a plurality of results of the evaluation conducted for a given pair of a given barcode image and a given barcode reading device, and for each of the plurality of given image display devices, one of or both of:

a proportion of a number of image display devices present that are capable of displaying the given barcode image so that the given barcode image is readable with the given barcode reading device, to a total number of a plurality of given image display devices present; and a proportion of a number of image display devices in operation that are capable of displaying the given barcode image so that the given barcode image is readable with the given barcode reading device, to a total number of a plurality of given image display devices in operation.

(Supplementary Note 7) The barcode evaluation device according to any one of Supplementary Notes 1 to 6, wherein the barcode evaluation device is configured to identify, based on a result of the evaluation, specifics of a barcode image that is readable with the given barcode reading device when displayed on the given image display device.

(Supplementary Note 8) The barcode evaluation device according to any one of Supplementary Notes 1 to 7, wherein the barcode evaluation device is configured to identify, when the given barcode image is displayed on the given image display device, specifications of a barcode reading device capable of reading the given displayed barcode image, based on a result of the evaluation.

(Supplementary Note 9) The barcode evaluation device according to any one of Supplementary Notes 1 to 8, wherein the barcode evaluation device is configured to generate, based on a result of the evaluation, a barcode image that is displayable on the given image display device and readable with the given barcode reading device.

(Supplementary Note 10) The barcode evaluation device according to any one of Supplementary Notes 1 to 9, wherein, when some specifications of an image display device that are used for the evaluation are known and other specifications of the image display device are unknown, the barcode evaluation device estimates the unknown specifications from all specifications of known image display devices that have the same specifications as, or similar specifications to, the known specifications, to thereby conduct the evaluation based on the estimated specifications and the known specifications.

(Supplementary Note 11) A barcode image generation system, comprising:

a barcode image generation requesting device; and the barcode evaluation device of any one of Supplementary Notes 1 to 10, wherein the barcode image generation requesting device is configured to request the barcode evaluation device to generate a barcode image that has given specifics, and wherein the barcode evaluation device is configured to generate, based on the given specifics of the barcode image requested to be generated and on a result of the evaluation, a barcode image that is displayable on a given image display device and that is readable with a given barcode reading device.

(Supplementary Note 12) The barcode image generation system according to Supplementary Note 11, wherein, when it is determined from specifics of the request and from a result of the evaluation that a barcode image generated to have the given specifics that are requested by the barcode image generation requesting device is undisplayable on the given image display device, or that the barcode image having the given specifics that are requested by the barcode image generation requesting device is unreadable with the given barcode reading device when displayed, the barcode evaluation device notifies the fact to the barcode image generation requesting device.

(Supplementary Note 13) A barcode evaluation method, which is executed by a barcode evaluation device, the method comprising conducting an evaluation, which involves determining whether or not a barcode image is displayable on an image display device and determining whether or not the displayed barcode image is readable with a barcode reading device, the evaluation being conducted based on specifics of the barcode image, specifications of the image display device, and specifications of the barcode reading device without actually displaying and reading the barcode image.

(Supplementary Note 14) The barcode evaluation method according to Supplementary Note 13, further comprising conducting the evaluation for a given barcode image, a given image display device, and a given barcode reading device to output a result of the evaluation.

(Supplementary Note 15) The barcode evaluation method according to Supplementary Note 13 or 14, further comprising:

generating a coordinate system that has, as coordinate axes, values representing the specifications of the image display device;

mapping, onto the coordinate system, as an area, a range of specifications required for the image display device in order to display a given barcode image so that the given barcode image is readable with a given barcode reading device, and plotting, on coordinate system, as a point, coordinates that correspond to the specifications of the image display device to be evaluated; and producing, by mapping the area and plotting the point, in a visible manner, whether or not the specifications of the image display device to be evaluated are within the required specification range, and, when the image display device specifications are outside the required specification range, how far off the image display device specifications are from the required specification range.

(Supplementary Note 16) The barcode evaluation method according to Supplementary Note 13, further comprising conducting the evaluation for a plurality of combinations of one or more given barcode images, one or more given image display devices, and a plurality of given barcode reading devices, to produce a result of the evaluation.

(Supplementary Note 17) The barcode evaluation method according to Supplementary Note 16, further comprising:

obtaining, based on a plurality of results of the evaluation conducted for a given pair of a given barcode image and a given barcode reading device, and for each of the plurality of given image display devices, a number of image display devices that are capable of displaying the given barcode image so that the given barcode image is readable with the given barcode reading device: and producing a proportion of the obtained number of image display devices to a total number of the plurality of given image display devices.

(Supplementary Note 18) The barcode evaluation method according to Supplementary Note 16, further comprising producing, based on a plurality of results of the evaluation conducted for a given pair of a given barcode image and a given barcode reading device, and for each of the plurality of given image display devices, one of or both of:

a proportion of a number of image display devices present that are capable of displaying the given barcode image so that the given barcode image is readable with the given barcode reading device, to a total number of a plurality of given image display devices present; and a proportion of a number of image display devices in operation that are capable of displaying the given barcode image so that the given barcode image is readable with the given barcode reading device, to a total number of a plurality of given image display devices in operation.

(Supplementary Note 19) The barcode evaluation method according to any one of Supplementary Notes 13 to 18, further comprising identifying, based on a result of the evaluation, specifics of a barcode image that is readable with the given barcode reading device when displayed on the given image display device.

(Supplementary Note 20) The barcode evaluation method according to any one of Supplementary Notes 13 to 19, further comprising identifying, when the given barcode image is displayed on the given image display device, specifications of a barcode reading device capable of reading the displayed given barcode image, based on a result of the evaluation.

(Supplementary Note 21) The barcode evaluation method according to any one of Supplementary Notes 13 to 20, further comprising generating, based on a result of the evaluation, a barcode image that is displayable on the given image display device and that is readable with the given barcode reading device.

(Supplementary Note 22) The barcode evaluation method according to any one of Supplementary Notes 13 to 21, further comprising estimating, when some specifications of an image display device that are used for the evaluation are known and other specifications of the image display device are unknown, the unknown specifications from all specifications of known image display devices that have the same specifications as, or similar specifications to, the known specifications, to thereby conduct the evaluation based on the estimated specifications and the known specifications.

(Supplementary Note 23) A barcode evaluation program for causing a computer to function as a barcode evaluation device configured to conduct an evaluation, which involves determining whether or not a barcode image is displayable on an image display device and determining whether or not the displayed barcode image is readable with a barcode reading device, the evaluation being conducted based on specifics of the barcode image, specifications of the image display device, and specifications of the barcode reading device without actually displaying and reading the barcode image.

(Supplementary Note 24) The barcode evaluation program according to Supplementary Note 23, wherein the barcode evaluation program causes the computer to function as the barcode evaluation device configured to conduct the evaluation for a given barcode image, a given image display device, and a given barcode reading device to produce a result of the evaluation.

(Supplementary Note 25) The barcode evaluation program according to Supplementary Note 23 or 24, wherein the barcode evaluation program causes the computer to function as the barcode evaluation device configured to:

generate a coordinate system that has, as coordinate axes, values representing the specifications of the image display device;

map, onto the coordinate system, as an area, a range of specifications required for the image display device in order to display a given barcode image so that the given barcode image is readable with a given barcode reading device, and plot, on coordinate system, as a point, coordinates that correspond to the specifications of the image display device to be evaluated; and produce, by mapping the area and plotting the point, in a visible manner, whether or not the specifications of the image display device to be evaluated are within the required specification range, and, when the image display device specifications are outside the required specification range, how far off the image display device specifications are from the required specification range.

(Supplementary Note 26) The barcode evaluation program according to Supplementary Note 23, wherein the barcode evaluation program causes the computer to function as the barcode evaluation device configured to conduct the evaluation for a plurality of combinations of one or more given barcode images, one or more given image display devices, and a plurality of given barcode reading devices, to produce a result of the evaluation.

(Supplementary Note 27) The barcode evaluation program according to Supplementary Note 26, wherein the barcode evaluation program causes the computer to function as the barcode evaluation device configured to obtain, based on a plurality of results of the evaluation conducted for a given pair of a given barcode image and a given barcode reading device, and for each of the plurality of given image display devices, a number of image display devices that are capable of displaying the given barcode image so that the given barcode image is readable with the given barcode reading device, and to produce a proportion of the obtained number of image display devices to a total number of the plurality of given image display devices.

(Supplementary Note 28) The barcode evaluation program according to Supplementary Note 26, wherein the barcode evaluation program causes the computer to function as the barcode evaluation device configured to output, based on a plurality of results of the evaluation conducted for a given pair of a given barcode image and a given barcode reading device, and for each of the plurality of given image display devices, one of or both of:

a proportion of a number of image display devices present that are capable of displaying the given barcode image so that the given barcode image is readable with the given barcode reading device, to a total number of a plurality of given image display devices present: and a proportion of a number of image display devices in operation that are capable of displaying the given barcode image so that the given barcode image is readable with the given barcode reading device, to a total number of a plurality of given image display devices in operation.

(Supplementary Note 29) The barcode evaluation program according to any one of Supplementary Notes 23 to 28, wherein the barcode evaluation program causes the computer to function as the barcode evaluation device configured to identify, based on a result of the evaluation, specifics of a barcode image that is readable with the given barcode reading device when displayed on the given image display device.

(Supplementary Note 30) The barcode evaluation program according to any one of Supplementary notes 23 to 29, wherein the barcode evaluation program causes the computer to function as the barcode evaluation device configured to identify, when the given barcode image is displayed on the given image display device, specifications of a barcode reading device capable of reading the given displayed barcode image based on a result of the evaluation.

(Supplementary Note 31) A barcode evaluation program according to any one of Supplementary Notes 23 to 30, wherein the barcode evaluation program causes the computer to function as the barcode evaluation device configured to generate, based on a result of the evaluation, a barcode image that is displayable on the given image display device and readable with the given barcode reading device.

(Supplementary Note 32) The barcode evaluation program according to any one of Supplementary Notes 23 to 31, wherein the barcode evaluation program causes the computer to function as the barcode evaluation device configured to estimate, when some specifications of an image display device that are used for the evaluation are known and other specifications of the image display device are unknown, the unknown specifications from all specifications of known image display devices that have the same specifications as, or similar specifications to, the known specifications, to thereby conduct the evaluation based on the estimated specifications and the known specifications.

(Supplementary Note 33) A barcode image generation method, which is executed by a system comprising a barcode image generation requesting device and a barcode evaluation device, the barcode image generation method comprising:

requesting, by the barcode image generation requesting device, the barcode evaluation device to generate a barcode image that has given specifics;

conducting, by the barcode evaluation device, an evaluation, which involves determining whether or not a barcode image is displayable on an image display device and determining whether or not the displayed barcode image is readable with a barcode reading device, the evaluation being conducted based on specifics of the barcode image, specifications of the image display device, and specifications of the barcode reading device without actually displaying and reading the barcode image; and generating, by the barcode evaluation device, based on the given specifics of the barcode image requested to be generated and on a result of the evaluation, a barcode image that is displayable on a given image display device and that is readable with a given barcode reading device.

(Supplementary Note 34) The barcode image generation method according to Supplementary Note 33, which is executed by a system comprising a barcode image generation requesting device and a barcode evaluation device, the barcode image generation method further comprising notifying, when it is determined from specifics of the request and from a result of the evaluation that a barcode image generated to have the given specifics that are requested by the barcode image generation requesting device is undisplayable on the given image display device, or that the barcode image having the given specifics that are requested by the barcode image generation requesting device is unreadable with the given barcode reading device when displayed, the fact to the barcode image generation requesting device by the barcode evaluation device.

(Supplementary Note 35) An evaluation device, which is configured to determine whether a terminal k is within a "proper range" when a constituent dot count per module (mod) is given as t and t is set to 1, 2, 3 . . . , by mapping, onto a pixel density P-terminal screen width W diagram, where P is measured in units of ppi and W is measured in units of pix, the "proper range", which is calculated from a module width $W_m$ mods of a barcode to be used, and from a readable width $W_s$ mm and a minimum resolution $d_s$ mm of a barcode scanner, and by plotting onto the P-W plane a pixel density Pk and a screen width Wk, which are screen specifications of the terminal k.

(Supplementary Note 36) An evaluation device according to Supplementary Note 35, in which the evaluation device is configured to obtain a "proper-terminal ratio" by dividing a number of terminals k that are determined as being within the "proper range" by a total number of terminals, and to use a value of the "proper-terminal ratio" itself, or a result of a comparison to a "proper-terminal ratio" that is obtained under a different condition, to indicate a quantitative degree of propriety.

(Supplementary Note 37) An evaluation device according to Supplementary Note 35, in which the evaluation device is configured to obtain an "effective proper-terminal ratio" by multiplying, for each terminal k, a quantity of the terminal k by a presence ratio of the terminal k to obtain an effective number of terminals that are determined as being within the "proper range" and dividing the effective number of terminals that are within the "proper range" by a total number of terminals, and to use a value of the "effective proper-terminal ratio" itself, or a result of a comparison to a "proper-terminal ratio" that is obtained under a different condition, to indicate a quantitative degree of propriety.

(Supplementary Note 38) An evaluation device for evaluating an image display device and a barcode reading device, the evaluation device being configured to determine, from a type and digit count of a barcode, a minimum resolution and readable width of the barcode reading device, and a screen width and pixel density of the image display device, whether or not the barcode is displayable on the image display device, and whether or not the barcode displayed on the image display device is readable with the barcode reading device.

(Supplementary Note 39) An evaluation device, which is configured to determine, from a minimum resolution and readable width of a barcode reading device and from a screen width and pixel density of an image display device, whether or not a type and digit count of a barcode are a type and a digit count that enable the barcode to be displayed on the image display device and to be read with the barcode reading device.

(Supplementary Note 40) A barcode identifying device, which is configured to identify, from a minimum resolution and readable width of a barcode reading device and from a screen width and pixel density of an image display device, a type and digit count of a barcode that is displayable on the image display device and is readable with the barcode reading device.

(Supplementary Note 41) A barcode reading device specification identifying device, which is configured to identify, from a type and digit count of a barcode and from a screen width and pixel density of an image display device, a minimum resolution and readable width of a barcode reading device that is capable of reading the barcode displayed on the image display device.

(Supplementary Note 42) A barcode image creating system, which is configured to create, from a type and digit count of a barcode, a minimum resolution and readable width of a barcode reading device, and a screen width and pixel density of an image display device, a barcode image (data) that is displayable on the image display device and is readable with the barcode reading device.

INDUSTRIAL APPLICABILITY

This invention is favorable as a measure for conducting an advance verification and designing a proper barcode in a system that provides some kind of service by displaying a barcode on a portable terminal and reading the barcode with a bar code scanner.

This invention can also be made use of in a particular system where a barcode is displayed on a portable terminal and is read with a barcode scanner, by applying this invention to the estimation of barcode scanner specifications suitable for reading the displayed barcode.

This invention can also be used to build a system capable of providing, with the use of the mechanism of the barcode generating server described in the fifth embodiment, or a similar mechanism, a barcode image that includes a barcode which is displayable on arbitrary terminals including unknown terminals, and is readable with a barcode scanner, and capable of presenting, even when the barcode included in the barcode image is unreadable with the barcode scanner, an index for determining the "degree" of impropriety of the barcode image.

The invention claimed is:

1. A barcode evaluation device, which is configured to:
conduct an evaluation, which involves determining whether or not a barcode image is displayable on an image display device and determining whether or not the barcode image is readable with a barcode reading device, the evaluation being conducted based on specifics of the barcode image, specifications of the image display device, and specifications of the barcode reading device without actually displaying and reading the barcode image;
generate a coordinate system that has, as coordinate axes, values representing the specifications of the image display device;
map, onto the coordinate system, as an area, a range of specifications required for the image display device in order to display a given barcode image so that the given barcode image is readable with a given barcode reading device, and plot, on the coordinate system, as a point, coordinates that correspond to the specifications of the image display device to be evaluated; and
produce, by mapping the area and plotting the point, in a visible manner, whether or not the specifications of the image display device to be evaluated are within the required specification range, and, when the image display device specifications are outside the required specification range, how far off the image display device specifications are from the required specification range.

2. The barcode evaluation device according to claim 1, wherein the barcode evaluation device is configured to conduct the evaluation for a given barcode image, a given image display device, and a given barcode reading device to produce a result of the evaluation.

3. The barcode evaluation device according to claim 1, wherein the barcode evaluation device is configured to identify, based on a result of the evaluation, specifics of a barcode image that is readable with the given barcode reading device when displayed on the given image display device.

4. The barcode evaluation device according to claim 1, wherein the barcode evaluation device is configured to identify, when the given barcode image is displayed on the given image display device, specifications of a barcode reading device capable of reading the given displayed barcode image, based on a result of the evaluation.

5. The barcode evaluation device according to claim 1, wherein the barcode evaluation device is configured to generate, based on a result of the evaluation, a barcode image that is displayable on the given image display device and readable with the given barcode reading device.

6. A barcode image generation system, comprising:
a barcode image generation requesting device; and
the barcode evaluation device of claim 1,
wherein the barcode image generation requesting device is configured to request the barcode evaluation device to generate a barcode image that has given specifics, and
wherein the barcode evaluation device is configured to generate, based on the given specifics of the barcode image requested to be generated and on a result of the evaluation, a barcode image that is displayable on a given image display device and that is readable with a given barcode reading device.

7. The barcode image generation system according to claim 6, wherein, when it is determined from specifics of the request and from a result of the evaluation that a barcode image generated to have the given specifics that are requested by the barcode image generation requesting device is undisplayable on the given image display device, or that the barcode image having the given specifics that are requested by the barcode image generation requesting device is unreadable with the given barcode reading device when displayed, the barcode evaluation device notifies the fact to the barcode image generation requesting device.

8. The barcode evaluation device according to claim 1, wherein the specifications of the barcode reading device for conducting the evaluation includes at least upper limit of length of a physical width of the barcode which is readable with the barcode reading device.

9. A barcode evaluation device, which is configured to:
conduct an evaluation, which involves determining whether or not a barcode image is displayable on an image display device and determining whether or not the barcode image is readable with a barcode reading device, the evaluation being conducted based on specifics of the barcode image, specifications of the image display device, and specifications of the barcode reading device without actually displaying and reading the barcode image;
obtain, based on a plurality of results of the evaluation conducted for a given pair of a given barcode image and a given barcode reading device, and for each of a plurality of given image display devices, a number of image display devices that are capable of displaying the given barcode image so that the given barcode image is readable with the given barcode reading device to produce a proportion of the obtained number of image display devices to a total number of the plurality of given image display devices.

10. A barcode evaluation device, which is configured to:
conduct an evaluation, which involves determining whether or not a barcode image is displayable on an image display device and determining whether or not the barcode image is readable with a barcode reading device, the evaluation being conducted based on specifics of the barcode image, specifications of the image display device, and specifications of the barcode reading device without actually displaying and reading the barcode image; and
produce, based on a plurality of results of the evaluation conducted for a given pair of a given barcode image and a given barcode reading device, and for each of a plurality of given image display devices, one of or both of:
a proportion of a number of image display devices present that are capable of displaying the given barcode image so that the given barcode image is readable with the given barcode reading device, to a total number of a plurality of given image display devices present; and
a proportion of a number of image display devices in operation that are capable of displaying the given barcode image so that the given barcode image is readable with the given barcode reading device, to a total number of a plurality of given image display devices in operation.

11. A barcode evaluation device, which is configured to conduct an evaluation, which involves determining whether or not a barcode image is displayable on an image display device and determining whether or not the barcode image is readable with a barcode reading device, the evaluation being conducted based on specifics of the barcode image, specifications of the image display device, and specifications of the barcode reading device without actually displaying and reading the barcode image,
wherein, when some specifications of an image display device that are used for the evaluation are known and other specifications of the image display device are unknown, the barcode evaluation device estimates the unknown specifications from all specifications of known image display devices that have the same specifications as, or similar specifications to, the known specifications, to thereby conduct the evaluation based on the estimated specifications and the known specifications.

12. A barcode evaluation method, which is executed by a barcode evaluation device, the method comprising:
conducting an evaluation, which involves determining whether or not a barcode image is displayable on an image display device and determining whether or not the displayed barcode image is readable with a barcode reading device, the evaluation being conducted based on specifics of the barcode image, specifications of the image display device, and specifications of the barcode reading device without actually displaying and reading the barcode image;
generating a coordinate system that has, as coordinate axes, values representing the specifications of the image display device;
mapping, onto the coordinate system, as an area, a range of specifications required for the image display device in order to display a given barcode image so that the given barcode image is readable with a given barcode reading device, and plotting, on the coordinate system, as a point, coordinates that correspond to the specifications of the image display device to be evaluated; and
producing, by mapping the area and plotting the point, in a visible manner, whether or not the specifications of the image display device to be evaluated are within the required specification range, and, when the image display device specifications are outside the required specification range, how far off the image display device specifications are from the required specification range.

13. A barcode evaluation program for causing a computer to function as a barcode evaluation device configured to:
conduct an evaluation, which involves determining whether or not a barcode image is displayable on an image display device and determining whether or not the displayed barcode image is readable with a barcode reading device, the evaluation being conducted based on specifics of the barcode image, specifications of the image display device, and specifications of the barcode reading device without actually displaying and reading the barcode image;
generate a coordinate system that has, as coordinate axes, values representing the specifications of the image display device;
map, onto the coordinate system, as an area, a range of specifications required for the image display device in order to display a given barcode image so that the given barcode image is readable with a given barcode reading device, and plot, on the coordinate system, as a point, coordinates that correspond to the specifications of the image display device to be evaluated; and
produce, by mapping the area and plotting the point, in a visible manner, whether or not the specifications of the image display device to be evaluated are within the required specification range, and, when the image display device specifications are outside the required specification range, how far off the image display device specifications are from the required specification range.

14. A barcode image generation method, which is executed by a system comprising a barcode image generation requesting device and a barcode evaluation device, the barcode image generation method comprising:

requesting, by the barcode image generation requesting device, the barcode evaluation device to generate a barcode image that has given specifics;

conducting, by the barcode evaluation device, an evaluation, which involves determining whether or not a barcode image is displayable on an image display device and determining whether or not the displayed barcode image is readable with a barcode reading device, the evaluation being conducted based on specifics of the barcode image, specifications of the image display device, and specifications of the barcode reading device without actually displaying and reading the barcode image;

generating, by the barcode evaluation device, a coordinate system that has, as coordinate axes, values representing the specifications of the image display device;

mapping, by the barcode evaluation device, onto the coordinate system, as an area, a range of specifications required for the image display device in order to display a given barcode image so that the given barcode image is readable with a given barcode reading device, and plotting, on the coordinate system, as a point, coordinates that correspond to the specifications of the image display device to be evaluated;

producing, by the barcode evaluation device, by mapping the area and plotting the point, in a visible manner, whether or not the specifications of the image display device to be evaluated are within the required specification range, and, when the image display device specifications are outside the required specification range, how far off the image display device specifications are from the required specification range; and generating, by the barcode evaluation device, based on the given specifics of the barcode image requested to be generated and on a result of the evaluation, a barcode image that is displayable on a given image display device and that is readable with a given barcode reading device.

* * * * *

UNITED STATES PATENT AND TRADEMARK OFFICE
CERTIFICATE OF CORRECTION

PATENT NO. : 9,870,526 B2
APPLICATION NO. : 15/528340
DATED : January 16, 2018
INVENTOR(S) : Osamu Ashiura It is certified that error appears in the above-identified patent and that said Letters Patent is hereby corrected as shown below:

In the Specification

Column 12, Math 27, Lines 8-9; " $\frac{W_s}{d_2}$ " has been replaced with -- $\frac{W_s}{d_s}$ -- therefor Column 12, Math 28, Lines 22-23; " $\frac{W_s}{d_2}$ " has been replaced with -- $\frac{W_s}{d_s}$ -- therefor Column 12, Math 29, Lines 50-51; " $\frac{W_s}{d_2}$ " has been replaced with -- $\frac{W_s}{d_s}$ -- therefor Column 12, Math 30, Lines 64-65; " $W_m = \frac{W_s}{d_2}$ " has been replaced with -- $W_m = \frac{W_s}{d_s}$ -- therefor Column 14, Line 47; "$P_k<P$ and $W_L \geq W_m$" has been replaced with --$P_k<P_l$ and $W_k \geq W_m$-- therefor Column 15, Line 44; "2-2." has been replaced with --2-2,-- therefor Column 15, Line 52; "2-2." has been replaced with --2-2,-- therefor Column 37, Line 25; "$P \leq t \cdot P_h (P_h = 25.4 d_s)$" has been replaced with --$P \leq t \cdot P_h (P_h = 25.4/d_s)$-- therefor Column 40, Line 1; "g<0" has been replaced with --g≤0-- therefor Column 40, Math 73, Line 59; " $W_a \leq W \leq W_b$ " has been replaced with Signed and Sealed this
Eighth Day of January, 2019

Andrei Iancu
*Director of the United States Patent and Trademark Office*

CERTIFICATE OF CORRECTION (continued)
U.S. Pat. No. 9,870,526 B2

--$W_a \leqq W \leqq W_b$-- therefor

Column 41, Math 76, Line 17; "200≦W≦400" has been replaced with --$200 \leqq W \leqq 400$-- therefor Column 41, Line 53; "(EAN-128)." has been replaced with --(EAN-128),-- therefor Column 44, Line 63; "ofa" has been replaced with --of a-- therefor Column 46, Math 79, Line 27; "$t \leq 1080/308$" has been replaced with --$t \leqq \dfrac{1080}{308}$-- therefor Column 46, Line 66; "Pb" has been replaced with --$P_{ka}$-- therefor Column 47, Line 28; "$W_1$." has been replaced with --$W_{s1}$.-- therefor Column 54, Line 4; "$W_5 \geq W_m$" has been replaced with --$W_k \geq W_m$-- therefor Column 56, Line 4; "|A|/$P_k$=0.16 (1.6%)." has been replaced with --|A|/$P_k$=0.016 (1.6%).-- therefor Column 64, Line 1; "ofa" has been replaced with --of a-- therefor